(12) United States Patent
Kuroki et al.

(10) Patent No.: US 9,969,836 B2
(45) Date of Patent: May 15, 2018

(54) RADICAL-POLYMERIZABLE RESIN COMPOSITION, CURING METHOD THEREOF, METHOD OF PRODUCING SAME, USE OF RADICAL-POLYMERIZABLE RESIN COMPOSITION, AND USE METHOD OF THEREOF

(71) Applicant: SHOWA DENKO K.K., Tokyo (JP)

(72) Inventors: Kunihiro Kuroki, Isesaki (JP); Kenji Miura, Isesaki (JP); Yoichiro Sakaguchi, Kumagaya (JP); Kohei Saito, Honjo (JP)

(73) Assignee: SHOWA DENKO K.K., Tokyo (JP)

( * ) Notice: Subject to any disclaimer, the term of this patent is extended or adjusted under 35 U.S.C. 154(b) by 0 days. days.

(21) Appl. No.: 15/543,284

(22) PCT Filed: Apr. 19, 2016

(86) PCT No.: PCT/JP2016/062448
§ 371 (c)(1),
(2) Date: Jul. 13, 2017

(87) PCT Pub. No.: WO2016/171151
PCT Pub. Date: Oct. 27, 2016

(65) Prior Publication Data
US 2018/0009926 A1 Jan. 11, 2018

(30) Foreign Application Priority Data

| Apr. 21, 2015 | (JP) | 2015-087055 |
| Oct. 15, 2015 | (JP) | 2015-203990 |
| Nov. 20, 2015 | (JP) | 2015-227706 |
| Dec. 9, 2015 | (JP) | 2015-240437 |
| Jan. 5, 2016 | (JP) | 2016-000614 |
| Feb. 24, 2016 | (JP) | 2016-033646 |
| Mar. 3, 2016 | (JP) | 2016-040829 |

(51) Int. Cl.
| C08F 2/46 | (2006.01) |
| C08G 61/04 | (2006.01) |
| C08F 299/04 | (2006.01) |
| C08F 299/02 | (2006.01) |
| C08J 5/24 | (2006.01) |
| C09D 5/00 | (2006.01) |
| C09D 153/00 | (2006.01) |
| C04B 41/48 | (2006.01) |
| C08K 7/14 | (2006.01) |
| C04B 111/72 | (2006.01) |

(52) U.S. Cl.
CPC .... *C08F 299/0464* (2013.01); *C04B 41/4857* (2013.01); *C08F 299/028* (2013.01); *C08F 299/045* (2013.01); *C08F 299/0471* (2013.01); *C08J 5/24* (2013.01); *C08K 7/14* (2013.01); *C09D 5/002* (2013.01); *C09D 153/00* (2013.01); *C04B 2111/72* (2013.01); *C08J 2353/00* (2013.01)

(58) Field of Classification Search
USPC ............................. 522/153, 150, 1; 520/1
See application file for complete search history.

(56) References Cited

U.S. PATENT DOCUMENTS

| 2005/0153231 | A1* | 7/2005 | Katoh | C07C 323/52 |
| | | | | 430/281.1 |
| 2010/0029876 | A1 | 2/2010 | Miyata et al. | |
| 2010/0047713 | A1* | 2/2010 | Murofushi | G03F 7/0007 |
| | | | | 430/281.1 |
| 2010/0160557 | A1* | 6/2010 | Murofushi | C08G 18/3206 |
| | | | | 525/55 |
| 2010/0227949 | A1* | 9/2010 | Tamai | C08F 299/00 |
| | | | | 523/400 |
| 2011/0136942 | A1 | 6/2011 | Pfeil | |
| 2016/0145392 | A1* | 5/2016 | Toda | C08G 75/04 |
| | | | | 522/42 |

FOREIGN PATENT DOCUMENTS

| CA | 1296480 C | 2/1992 |
| JP | 54-27390 B2 | 9/1979 |
| JP | 62-91508 A | 4/1987 |
| JP | 6-199952 A | 7/1994 |
| JP | 2001-011422 A | 1/2001 |
| JP | 2002-220409 A | 8/2002 |

(Continued)

OTHER PUBLICATIONS

Kato et al, JP 2004-149755 Machine Translation, May 27, 2004 (Year: 2004).*
"Industrial Material," Nikkan Koygyo Shimbun Ltd., Japan, 1983, pp. 35-41; vol. 31, No. 4.
"Blushing of Pure Epoxy Coating Film," Nippon Paint Co., Ltd. Technical Data, DS. No. 006-90-03 (date unknown).
Matsunaga Shigeki, "The Relationship of Electron State and Curing Performance of Cobalt-amine Complex Dryer," DIC Technical Review, Japan, 1999, pp. 51-56; No. 5.
Eiichiro Takiyama, "Polyester Resin Handbook", 1st Ed., Nikkan Kogyo Shimbun Ltd., Japan, Jun. 30, 1988, 11 pgs.

(Continued)

*Primary Examiner* — Jessica Whiteley
(74) *Attorney, Agent, or Firm* — Sughrue Mion, PLLC

(57) ABSTRACT

A radical-polymerizable resin composition comprising one or more metal-containing compounds (A) selected from a metal soap (A1) and a β-diketone skeleton-containing metal complex (A2); one or more thiol compounds (B) selected from a secondary thiol compound (B1) and a tertiary thiol compound (B2); and a radical-polymerizable compound (C) can stably cure under a dry condition, in water and in seawater and further on a wet substrate. The radical-polymerizable resin composition is useful as a repairing material for inorganic structure, a radical-polymerizable coating composition, a concrete spall preventing curable material, a reinforcing fiber-containing composite material, etc.

32 Claims, 2 Drawing Sheets

(56) References Cited

FOREIGN PATENT DOCUMENTS

| | | | |
|---|---|---|---|
| JP | 2004-018719 A | 1/2004 | |
| JP | 2004-075819 A | 3/2004 | |
| JP | 2004-149755 * | 5/2004 | |
| JP | 2004-149755 A | 5/2004 | |
| JP | 2005-213844 A | 8/2005 | |
| JP | 2009-084394 A | 4/2009 | |
| JP | 2010-101033 A | 5/2010 | |
| JP | 4469484 B2 | 5/2010 | |
| JP | 2010-138324 A | 6/2010 | |
| JP | 4518773 B2 | 8/2010 | |
| JP | 2011-137141 A | 7/2011 | |
| JP | 2014-218958 A | 11/2014 | |
| JP | 2015-059195 A | 3/2015 | |
| WO | 99/62977 A1 | 12/1999 | |
| WO | 2008/062707 A1 | 5/2008 | |
| WO | WO -2014203779 A1 * | 12/2014 | ............. C08G 75/04 |

OTHER PUBLICATIONS

International Search Report for PCT/JP2016/062448, dated Aug. 2, 2016 (PCT/ISA/210).
Written Opinion of the International Searching Authority for PCT/JP2016/062448, dated Aug. 2, 2016 (PCT/ISA/237).
Communication dated Nov. 7, 2017 issued by the European Patent Office in counterpart application No. 16783172.6.

* cited by examiner

RADICAL-POLYMERIZABLE RESIN COMPOSITION, CURING METHOD THEREOF, METHOD OF PRODUCING SAME, USE OF RADICAL-POLYMERIZABLE RESIN COMPOSITION, AND USE METHOD OF THEREOF

CROSS REFERENCE TO RELATED APPLICATIONS

This application is a National Stage of International Application No. PCT/JP2016/062448 filed Apr. 19, 2016 (claiming priority based on Japanese Patent Application No. 2015-087055, filed Apr. 21, 2015, Japanese Patent Application No. 2015-203990, filed Oct. 15, 2015, Japanese Patent Application No. 2015-227706, filed Nov. 20, 2015, Japanese Patent Application No. 2015-240437, filed Dec. 9, 2015, Japanese Patent Application No. 2016-000614 filed Jan. 5, 2016, Japanese Patent Application No. 2016-033646, filed Feb. 24, 2016, and Japanese Patent Application No. 2016-040829, filed Mar. 3, 2016), the disclosure of which is incorporated herein by reference.

TECHNICAL FIELD

The present invention relates to a radical-polymerizable resin composition that can radially cure in a dry condition, in water and in seawater, and further on a wet substrate, that is, on a dry surface, on the surface in water and in seawater, and on a wet surface, and further relates to a method for curing the composition, a method for producing the composition, its use, and a method of using the radical-polymerizable resin composition.

BACKGROUND ART

A metal soap has good solubility in resin and solvent, and has various functions and is used in a wide range of application: a curing accelerator for unsaturated polyester resins, etc., a drier for coating material and printing ink, an adhesive for rubber and tires, an extreme-pressure agent for lubricant oil, a combustion improver, a polymerization catalyst, etc.

However, when a metal soap is used as a curing accelerator under the condition where water exists, the metal soap cannot sufficiently express the function thereof (Non Patent Literature 1).

As a method of solving the problem, a method of using an accelerator aid has been proposed. Examples of the accelerator aid include β-diketones, aromatic tertiary amines, mercaptans (thiol compounds), phosphorus compounds, etc. As a technique using such an accelerator aid, for example, Patent Literature 1 describes the use of a chain transfer agent, such as a thiol compound having a hydrocarbon group with 3 or more carbon atoms, as an accelerator aid in the production of a copolymer for use in a cement admixture that comprises the copolymer as an indispensable component.

Patent Literature 2 describes the use of an accelerator aid, such as aniline derivatives, toluidine derivatives, metal soaps, and thiourea derivatives, in an aqueous resin composition for automotive interior materials, etc.

Further, Non Patent Literature 2 describes the use of a complex of an aromatic tertiary amine and a cobalt salt as an accelerator aid.

Patent Literature 3 discloses a two-component mortar composition suitable for building use, which comprises a resin component containing a norbornene group-containing resin and a methacrylate-containing compound, and a curing agent component containing a peroxide and a thiol.

Since inorganic structures such as concrete structures are deteriorated with the lapse of time after construction owing to neutralization of concrete, brine damage, and freezing damage, maintenance and repair may be required. Concrete structures existing not only in water or seawater but also in tidal area where submerging and drying are repeated by tides is increasingly deteriorated by chlorides in seawater and must be repaired immediately.

As a method for repairing such inorganic structures, the replacement of concrete is general, but in repairing wetted or submerged structures, the part to be replaced must be completely shut out water by covering with a steel sheet pile and then water must be removed from the part, and consequently, the structures are difficult to be repaired.

In the case where concrete or a so-called polymer cement is used for replacing the surface of a structure, an insufficient strength or cracking may be caused at the joint part owing to the difference in the ages of materials. In a more serious case, the part around the repaired part would be rapidly deteriorated because of the flaking of the entire part of the repaired part or the shrinking of the material in the repaired part. In particular, in the case where such repairing is carried out directly in water or seawater without removing water, the water remaining in the joint part would give a fatal risk to structures.

As a method for solving the problem, for example, Non Patent Literature 3 proposes a method of incorporating a filler such as a water-absorbing cement in an adhesive composition serving as a repairing material, or a method of incorporating an amine salt-type surfactant in an adhesive composition to hold water in the surfactant by emulsification.

Patent Literature 4 proposes a method of incorporating a hardly water-soluble organic amine, cement or surfactant in an adhesive composition serving as a repairing material.

Further, Patent Literature 5 proposes a repairing material produced by incorporating a modified silicone resin and an anionic surfactant having a specific structure into an adhesive composition.

Patent Literature 3 proposes a two-component mortar composition suitable for building use, which comprises a resin component containing a norbornene group-containing resin and a methacrylate-containing compound and a curing agent component containing a peroxide and a thiol.

Since concrete structures around seashore, rivers, lakes and the like are in a wet environment in many cases, coating materials applicable even to wet surfaces have been desired. In repairing or constructing indoor structures such as bath rooms, wet areas, water supply systems, and sewerage systems, coating materials to be used are further required to be excellent in showing a certain level of strength even on the surface wetted with dew. In addition, in outdoor structures to be exposed to rain in a heavy daytime traffic area, coating materials that may cure quickly to show a certain level of strength in both dry and wet conditions are desired.

For example, Non Patent Literature 4 describes the cause and phenomenon of discoloration of a coating material comprising an epoxy resin and an amine curing agent and proposes a solution thereof. Non Patent Literature 4 merely describes the method for reducing the discoloration and merely emphasizes that the phenomenon does not influence the long-term properties and that the phenomenon may occur in the surface layer possibly in contact with water. However, it can be easily expected that the blushing phenomenon occurs between the substrate and the coating film when such a coating material is applied on a wet substrate. It would appear from Non Patent Literature 4 that there is no method for thoroughly solving the problem in a coating composition for use on a wet substrate.

Accordingly, just as taught by Non Patent Literature 4, the problem of a blushing phenomenon is enevitable for the adhesion in a wet environment or in a humid environment. This phenomenon occurs when the unreacted amine or the hydrophilic solvent in the composition (coating film) absorbs water to form a hydrate, resulting in the blushing of the coating film surface. This phenomenon detracts from the appearance of cured product and reduced the adhesive properties, and in addition, adversely affect the curing mechanism itself.

As a method of solving these problems, Patent Literature 6 discloses an epoxy resin composition applicable even to a wet surface. Patent Literature 7 discloses a viscous primer composition for sheet lining, which exhibits good curability on a wet surface.

As described above, concrete structures deteriorate through neutralization, brine damage, freezing damage, overaging, etc. In addition, concrete structures may also be damaged by earthquake, collision accident, etc. These deteriorations and damages may cause the spalling of the surface of concrete structures. The spalling of concrete structures has been prevented by a method of applying a curable composition such as a repairing material or the like and curing it and a method of bonding a fibrous sheet to the concrete surface with a curable resin (Patent Literatures 8 and 9).

Metal pipes have bee used in digging a well at the bottom of sea. However, it is expensive and inefficient to transport linear metal pipes to workplaces on the sea. It is also inconvenient and inefficient to remove, store, and transport the metal pipes after the work. Accordingly, the use of fiber-reinforced resin pipes has been considered in place of metal pipes.

In addition, the use of fiber-reinforced resin materials has been considered in the float structures for offshore wind power disclosed in Patent Literature 10, in the floating structures to be constructed according to the method disclosed in Patent Literature 11, and in the underwater structures of the deep sea city project now developing.

CITATION LIST

Patent Literature

Patent Literature 1: JP-B 4518773
Patent Literature 2: JP-B 4469484
Patent Literature 3: JP-A 2011-137141
Patent Literature 4: JP-B 54-27390
Patent Literature 5: JP-A 2001-11422
Patent Literature 6: JP-A 2015-59195
Patent Literature 7: JP-A 2010-138324
Patent Literature 8: JP-A 2004-018719
Patent Literature 9: JP-A 2005-213844
Patent Literature 10: JP-A 2014-218958
Patent Literature 11: JP-A 2010-101033

Non-Patent Literature

Non Patent Literature 1: Eiichiro Takiyama, "Polyester Resin Handbook", 1st Ed., Japan, Nikkan Kogyo Shimbun Ltd., Jun. 30, 1988, p. 119

Non Patent Literature 2: Shigeki Matsunaga, "The Relationship of Electron State and Curing Performance of Cobaltamine Complex Dryer", DIC Technical Review, Japan, 1999, No. 5, pp. 51-56

Non Patent Literature 3: "Industrial Material", Nikkan Kogyo Shimbun Ltd., Japan, 1983, Vol. 31, No. 4, pp. 35-41

Non Patent Literature 4: Nippon Paint Co., Ltd. Technical Data DS. No. 006-90-03 "Blushing of Pure Epoxy Coating Film"

SUMMARY OF INVENTION

Technical Problem

The accelerator aid described in Patent Literature 1, which has been used generally in the art, is difficult to sufficiently cure in water. The metal (cobalt) salt or the metal complex described in Patent Literature 2 and Non Patent Literature 2 readily forms a complex (hydrate) together with water to interfere with the oxidation-reduction of cobalt, and therefore, difficult to sufficiently cure in water.

Patent Literature 2 discloses use of rongalite or a thiourea derivative but does not consider the use of a secondary thiol compound. All the thiol compounds exemplified as a curing agent in Patent Literature 3 are primary thiol compounds, and nothing is disclosed therein relating to the superiority of secondary and tertiary thiol compounds to primary thiol compounds.

In the repairing methods for inorganic structures described in Patent Literatures 4 and 5 and Non Patent Literature 3, a long aging time as long as about two weeks is required for obtaining a desired adhesion strength.

In repairing the concrete structures in seaboard region which are in a wet state or submerged in seawater, water in the part to be repaired repels a repairing material and therefore it is difficult to apply a repairing material to the part, or even though a repairing material could be applied, a sufficient adhesion strength could not be obtained because water prevents the curing reaction.

A method of removing water by drying the part to be repaired may be employed, but wet or submerged concrete structures often hold a large amount of water therein. Therefore, even though the part to be repaired is dried, the water inside the structures would bleed out with the lapse of time into the part to be repaired, and the bleeding water would make it difficult to obtain a sufficient adhesion strength.

Patent Literature 3 uses a thiol compound as a curing agent, but only primary thiol compounds are exemplified therein and nothing is disclosed relating to secondary and tertiary thiol compounds, that is, nothing is addressed relating to them.

The epoxy resin composition described in Patent Literature 6 still requires a long time for curing, and could not be said to be excellent in rapid curing ability under wet conditions.

The primer composition described in Patent Literature 7 fails to cure under the condition where a lot of water exists, because cobalt naphthenate serving as an accelerator may dissolve out into water and may be deactivated.

Concrete structures near seashores, rivers, and lakes are often in a wet environment. The internal surfaces of road tunnels and railway tunnels are also often in a wet environment by bleeding water. Accordingly, a spall preventing material that can sufficiently cure even in wet surfaces of concrete structures and is excellent in spall preventing properties is desired. However, Patent Literatures 8 and 9 do not address at all a spall preventing material applicable to a wet surface.

If fiber-reinforced resin pipes for digging wells at seafloor or resinous materials for floating structures or underwater structures can be produced in the working sites at sea, transportation costs can be reduced, construction costs can be reduced and construction periods can be shortened. However, the working sites at sea are always in a wet environment and it is difficult to stably cure a radical polymerizable composition under such an environment, or a long period of time must be needed for producing cured products having a sufficient strength.

The present invention has been made in consideration of the above-mentioned situation and provides a radical-polymerizable resin composition that can be stably cured in a dry condition, in water and in seawater, and further on a wet substrate, that is, on a dry surface, on the surface in water and in seawater, and even on a wet surface, a method for curing the composition, and a method for producing the radical-polymerizable resin composition.

Further, the present invention provides a repairing material for inorganic structure comprising the radical-polymerizable resin composition, and a method for repairing inorganic structure using the repairing material.

Further, the present invention provides a radical-polymerizable coating composition that can cure rapidly to show a certain strength without causing a blushing phenomenon in both dry and wet conditions, i.e., in a dry condition, in water or seawater, under a wet condition, or on the surface of a substrate wetted with dew caused by the water contained therein.

Further, the present invention provides a curable material for preventing concrete spalling which comprises the radical-polymerizable resin composition, and a method for preventing concrete spalling using the composition.

Further, the present invention provides a reinforcing fiber-containing composite material that comprises fibers and the radical-polymerizable resin composition, and a shaped product of the material.

Solution to Problem

The present inventors have extensively studied for solving the above problems and, as a result, have found that a metal-containing compound for use as a curing agent, such as a metal soap and a metal complex, does not cure in the presence of water, for example, in water, because the metal contained therein is deactivated by water. As a result of further study on the method for preventing metal deactivation, the inventors have found that the combined use of at least one metal-containing compound selected from a specific metal soap and a specific metal complex and at least one thiol compound selected from a secondary thiol compound and a tertiary thiol compound enables a stable curing in the presence of water, for example, in a wet atmosphere or in water, because the secondary or tertiary thiol compound coordinates around the metal of the metal-containing compound and therefore water could hardly come closer to the metal to prevent metal deactivation. The present invention has be completed by this finding.

The present invention provides the following [1] to [30].

[1] A radical-polymerizable resin composition comprising one or more metal-containing compounds (A) selected from a metal soap (A1) and a β-diketone skeleton-containing metal complex (A2); one or more thiol compounds (B) selected from a secondary thiol compound (B1) and a tertiary thiol compound (B2); and a radical-polymerizable compound (C).

[2] The radical-polymerizable resin composition according to [1], wherein the thiol compound (B) comprises at least one structure represented by formula (Q-1) and comprises two or more mercapto groups bonding to a secondary or tertiary carbon atom in the molecule including the mercapto group in the structure represented by formula (Q-1):

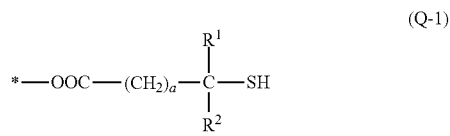

wherein $R^1$ represents a hydrogen atom, an alkyl group having 1 to 10 carbon atoms, or an aromatic group having 6 to 18 carbon atoms; $R^2$ represents an alkyl group having 1 to 10 carbon atoms or an aromatic group having 6 to 18 carbon atoms; * bonds to an organic group; and a represents an integer of 0 to 2.

[3] The radical-polymerizable resin composition according to [2], wherein the thiol compound (B) comprising at least one ester structure represented by formula (Q-1) is a compound derived from a mercapto group-containing carboxylic acid represented by formula (S) and a polyhydric alcohol:

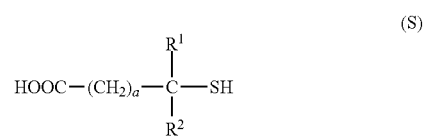

wherein $R^1$, $R^2$ and a are as defined in formula (Q-1).

[4] The radical-polymerizable resin composition according to [2] or [3], wherein $R^1$ represents a hydrogen atom and the thiol compound (B) is a compound comprising 2 or more mercapto groups bonding to a secondary carbon atom in the molecule.

[5] The radical-polymerizable resin composition according to any of [1] to [4], wherein the total amount of the thiol compound (B) is 0.01 to 10 parts by mass to 100 parts by mass of the radical-polymerizable compound (C).

[6] The radical-polymerizable resin composition according to any of [1] to [5], wherein the molar ratio of the thiol compound (B) to the metal component in the metal-containing compound (A), (B)/(A), is 0.1 to 15.

[7] The radical-polymerizable resin composition according to any of [1] to [6], wherein the radical-polymerizable resin composition comprises a radical polymerization initiator (D).

[8] The radical-polymerizable resin composition according to [7], wherein the radical polymerization initiator (D) is a photoradical polymerization initiator.

[9] The radical-polymerizable resin composition according to any of [1] to [8], wherein a long-chain fatty acid constituting the metal soap (A1) is a linear or cyclic saturated fatty acid having 6 to 16 carbon atoms or an unsaturated fatty acid having 6 to 16 carbon atoms.

[10] The radical-polymerizable resin composition according to any of [1] to [9], wherein the metal soap (A1) is zirconium octylate, manganese octylate, cobalt octylate, or cobalt naphthenate.

[11] The radical-polymerizable resin composition according to any of [1] to [10], wherein the radical-polymerizable compound (C) is one or more selected from a vinyl ester resin, an unsaturated polyester resin, a mixture of a vinyl ester resin and a radical-polymerizable unsaturated monomer, and a mixture of an unsaturated polyester resin and a radical-polymerizable unsaturated monomer.

[12] The radical-polymerizable resin composition according to [11], wherein the radical-polymerizable unsaturated monomer is styrene and a styrene content in the radical-polymerizable compound (C) is 20% by mass or less.

[13] A primer comprising the radical-polymerizable resin composition of any of [1] to [12].

[14] A repairing material for inorganic structure comprising a radical-polymerizable resin composition of any of [1] to [12].

[15] The repairing material for inorganic structure according to [14], wherein the repairing material for inorganic structure comprises a filler (F).

[16] The repairing material for inorganic structure according to [14] or [15], wherein the repairing material for inorganic structure is a section repairing material, a crack injection material, or a water sealant.

[17] The repairing material for inorganic structure according to any of [14] to [16], wherein a content of the radical-polymerizable compound (C) in the radical-polymerizable resin composition is 10 to 99.9% by mass.

[18] The radical-polymerizable resin composition according to any of [1] to [12], wherein the metal-containing compound (A) is a metal soap (A1).

[19] A radical-polymerizable coating composition comprising the radical-polymerizable resin composition of [18].

[20] The radical-polymerizable coating composition according to [19], wherein a content of the radical-polymerizable compound (C) in the radical-polymerizable resin composition is 80 to 99.9% by mass.

[21] The radical-polymerizable coating composition according to [19] or [20], wherein the radical-polymerizable coating composition is a two-component curable coating composition comprising a main component and a curing agent, wherein the main component comprises a metal soap (A1), one or more thiol compounds (B) selected from a secondary thiol compound (B1) and a tertiary thiol compound (B2), and a radical-polymerizable compound (C), and the curing agent comprises a radical polymerization initiator (D).

[22] A curable material for preventing concrete spalling, comprising the radical-polymerizable resin composition of any of [1] to [12].

[23] The radical-polymerizable resin composition according to any of [1] to [12], wherein the radical-polymerizable resin composition comprises a fiber (G).

[24] A prepreg sheet produced by prepolymerizing the radical-polymerizable resin composition of [23].

[25] A reinforcing fiber-containing composite material comprising the radical-polymerizable resin composition of [23].

[26] A method for producing the radical-polymerizable resin composition of any one of [1] to [12], wherein the method comprises a step 1 of mixing the metal-containing compound (A) and the radical-polymerizable compound (C) to prepare a liquid mixture (i), and a step 2 of mixing the liquid mixture (i) and the thiol compound (B) to prepare a liquid mixture (ii).

[27] The method for producing a radical-polymerizable resin composition according to [26], wherein the method comprises a step 3 of mixing the liquid mixture (ii) and the radical polymerization initiator (D).

[28] A method for repairing a concrete structure, which comprises applying one or more selected from the repairing material for inorganic structure of any of [14] to [17], the radical-polymerizable coating composition of any of [19] to [21], and the curable material for preventing concrete spalling of [22], directly or indirectly onto a surface of a damaged part of a concrete structure and curing the applied material for repairing the damaged part.

[29] A photocuring method for a radical-polymerizable resin composition, wherein the method comprises a step of irradiating the radical-polymerizable resin composition of [8] with a light within a photosensitive wavelength range of the photoradical polymerization initiator to polymerize the radical-polymerizable compound (C).

[30] A method for producing a prepreg sheet, wherein the method comprises a step of irradiating the radical-polymerizable resin composition of [8] with a light within a photosensitive wavelength range of the photoradical polymerization initiator to prepolymerize the radical-polymerizable compound (C).

Advantageous Effects of Invention

According to the present invention, a radical-polymerizable resin composition that can be stably cured in a dry condition, in water and in seawater, and further on a wet substrate, a method for curing the composition, and a method for producing the radical-polymerizable resin composition are provided.

Further, according to the present invention, a repairing material for inorganic structure that can be stably cured in a dry condition, in water and in seawater, and further on a wet substrate, and a method for repairing inorganic structures using the repairing material are provided.

Further, according to the present invention, a radical-polymerizable coating composition is provided, that can cure rapidly to show a certain strength without causing a blushing phenomenon in both dry and wet conditions, i.e., in a dry condition, in water or seawater, under a wet condition, or on the surface of a substrate which is wetted with dew caused by the water contained therein.

Further, according to the present invention, a curable material for preventing concrete spalling that can cure stably to form a coating film having an excellent adhesion force to concrete in a dry condition, or in water or seawater, and further on a wet concrete, and a method for preventing concrete spalling that uses the composition are provided.

Further, according to the present invention, a reinforcing fiber-containing composite material that can cure stably in a dry condition, in water or seawater and even on a wet substrate and a shaped product of the material are provided.

Figure 1:
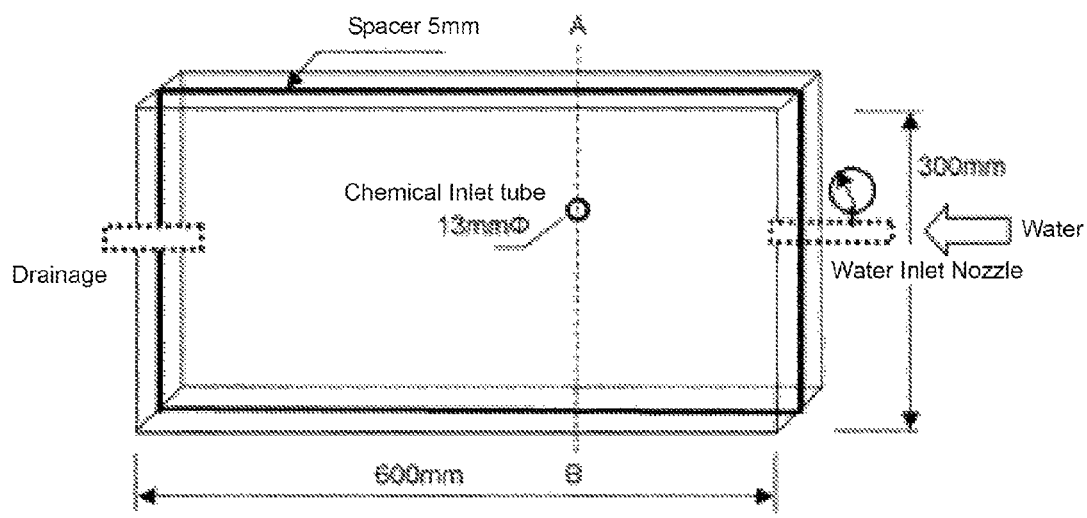
FIG. 1 is a schematic view of the device used in Examples 84 to 88 and Comparative Examples 53 to 60.

DESCRIPTION OF EMBODIMENTS (I) Radical-Polymerizable Resin Composition

The radical-polymerizable resin composition of the present invention comprises one or more metal-containing compounds (A) selected from a metal soap (A1) and a β-diketone skeleton-containing metal complex (A2), one or more thiol compounds (B) selected from a secondary thiol compound (B1) and a tertiary thiol compound (B2), and a radical-polymerizable compound (C), and can be stably cured on a dry surface in air, or on a surface immersed in water or seawater, or further on a wet surface.

Metal-Containing Compound (A)

The radical-polymerizable resin composition of the present invention comprises one or more metal-containing compounds (A) selected from a metal soap (A1) and a β-diketone skeleton-containing metal complex (A2) as a curing accelerator. The metal soap (A1) in the present invention is a salt of a long-chain fatty acid or an organic acid other than the long-chain fatty acid and a metal element other than potassium and sodium. The β-diketone skeleton-containing metal complex (A2) in the present invention is a complex wherein a compound having one carbon atom between two carbonyl groups coordinates to a metal element.

The content of the metal-containing compound (A) in the radical-polymerizable resin composition, which is expressed based on the amount of metal, is preferably 0.001 to 5 parts by mass to 100 parts by mass of the radical-polymerizable compound (C) to be mentioned below, and in one embodiment of the present invention, the content is more preferably 0.002 to 3 parts by mass, even more preferably 0.003 to 2.5 parts by mass, further more preferably 0.004 to 2 parts by mass. In another embodiment of the present invention, the content is more preferably 0.001 to 3 parts by mass, even more preferably 0.002 to 2 parts by mass, still more preferably 0.003 to 1 part by mass, and further more preferably 0.004 to 0.8 parts by mass. In still another embodiment, the content is more preferably 0.005 to 3 parts by mass, more preferably 0.01 to 2 parts by mass, even more preferably 0.015 to 1 part by mass, still more preferably 0.02 to 0.8 parts by mass, and further more preferably 0.025 to 0.6 parts by mass. When the metal element-equivalent content of the metal-containing compound (A) falls within the above ranges, curing can rapidly occur even in water and in a wet atmosphere.

Metal Soap (A1)

The long chain fatty acid in the metal soap (A1) is not specifically limited, but is, for example, preferably a fatty acid having 6 to 30 carbon atoms. Specific examples of the acid include a linear or cyclic saturated fatty acid such as heptanoic acid, octanoic acid such as 2-ethylhexanoic acid, nonanoic acid, decanoic acid, neodecanoic acid, undecanoic acid, dodecanoic acid, tetradecanoic acid, hexadecanoic acid, octadecanoic acid, eicocanoic acid, docosanoic acid, tetracosanoic acid, hexacosanoic acid, octacosanoic acid, triacontanoic acid, naphthenic acid, etc., and an unsaturated fatty acid such as oleic acid, linoleic acid, linolenic acid, etc.

In addition, the acid includes rosin acids, linseed oil fatty acids, soybean oil fatty acids, tall oil fatty acids, etc.

The organic acid other than the long chain fatty acid in the metal soap (A1) is not specifically limited, but is preferably a weak acid having a carboxyl group, a hydroxyl group or an enol group and capable of dissolving in an organic solvent.

Examples of the carboxyl group-containing compound include a carboxylic acid such as formic acid, acetic acid, oxalic acid, etc.; a hydroxy acid such as citric acid, gallic acid, saccharic acid, 12-hydroxystearic acid, hydroxycinnamic acid, folic acid, etc.; an amino acid such as alanine, arginine, etc.; an aromatic acid such as benzoic acid, phthalic acid, etc.

Examples of the compound having a hydroxy group or an enol group include ascorbic acid, α acid, imide acid, erythorbic acid, croconic acid, kojic acid, squaric acid, sulfinic acid, teichoic acid, dehydroacetic acid, delta acid, uric acid, hydroxamic acid, humic acid, fulvic acid, phosphonic acid, etc.

Among these, the long chain fatty acid is preferred; a linear or cyclic saturated fatty acid having 6 to 16 carbon atoms or an unsaturated fatty acid having 6 to 16 carbon atoms is more preferred; octanoic acid and naphthenic acid are still more preferred; and 2-ethylhexanoic acid and naphthenic acid are further more preferred.

The metal element constituting the metal soap (A1) includes group 1 or 2 metal elements such as lithium, magnesium, calcium, barium, etc.; group 3 to 12 metal elements such as titanium, zirconium, vanadium, manganese, iron, ruthenium, cobalt, rhodium, nickel, palladium, platinum, copper, silver, gold, zinc, etc.; Group 13 to 14 metal elements such as aluminum, indium, tin, lead, etc.; rare earth metal elements such as neodymium, cerium, etc.; bismuth, etc.

In an embodiment of the present invention, group 2 to 12 metal elements are preferred; barium, vanadium, manganese, iron, cobalt, copper, titanium and zinc are more preferred; manganese, iron, cobalt, copper, titanium and zinc are even more preferred; and manganese, cobalt and titanium are further more preferred.

In another embodiment of the present invention, group 2 to 12 metal elements are preferred; zirconium, barium, vanadium, manganese, iron, cobalt, copper, titanium, bismuth, calcium, lead, tin and zinc are more preferred; zirconium, manganese, iron, cobalt, copper, titanium, bismuth, calcium, lead, tin and zinc are even more preferred; and zirconium, bismuth and calcium are further more preferred.

Preferred examples of the metal salt (A1) include, in an embodiment of the present invention, manganese octylate, cobalt octylate, zinc octylate, vanadium octylate, cobalt naphthenate, copper naphthenate, and barium naphthenate; and manganese octylate, cobalt octylate and cobalt naphthenate are more preferred.

In another embodiment of the present invention, zirconium octylate, manganese octylate, cobalt octylate, bismuth octylate, calcium octylate, zinc octylate, vanadium octylate, lead octylate, tin octylate, cobalt naphthenate, copper naphthenate, barium naphthenate, bismuth naphthenate, calcium naphthenate, lead naphthenate, and tin naphthenate are preferred; zirconium octylate, manganese octylate, cobalt octylate, bismuth octylate, calcium octylate, lead octylate, tin octylate, bismuth naphthenate, calcium naphthenate, lead naphthenate, and tin naphthenate are more preferred.

β-Diketone Skeleton-Containing Metal Complex (A2)

Examples of the β-diketone skeleton-containing metal complex (A2) (hereinafter also simply referred to as "metal complex (A2)") include complexes formed by acetylacetone, ethyl acetoacetate, benzoyl acetone or the like with a metal. These metal complexes (A2) also express the same function as that of the metal soaps (A1).

The metal element in the metal complex (A2) may be the same as the metal element mentioned above with respect to the metal soap (A1).

In an embodiment of the present invention, preferred examples of the metal complex (A2) includes vanadium acetylacetonate, cobalt acetylacetonate, titanium acetylacetonate, titanium dibutoxybis(acetylacetonate), iron acetylacetonate, and cobalt ethyl acetoacetate, with titanium acetylacetonate and titanium dibutoxybis(acetylacetonate) being more preferred.

In another embodiment of the present invention, zirconium acetylacetonate, vanadium acetylacetonate, cobalt acetylacetonate, titanium acetylacetonate, titanium dibutoxybis(acetylacetonate), iron acetylacetonate, and cobalt ethyl acetoacetate are preferred, with zirconium acetylacetonate, titanium acetylacetonate, and titanium dibutoxybis (acetylacetonate) being more preferred.

Thiol Compound (B)

The radical-polymerizable resin composition of the present invention comprises one or more thiol compounds (B) selected from a secondary thiol compound (B1) and a tertiary thiol compound (B2). In the present invention, the thiol compound (B) works as a curing accelerator and may prevent the deactivation of metal due to water by coordinating in the vicinity of the metal of the metal-containing compound (A).

The thiol compound (B) for use in the present invention is not specifically limited as long as it is a compound having one or more mercapto groups bonding to the secondary or tertiary carbon atom in the molecule (hereinafter these may be referred to as "secondary mercapto group" and "tertiary mercapto group", respectively), but from the viewpoint of accelerating rapid curing even in water and from the viewpoint of preventing deactivation by water of the metal in the metal-containing compound (A), a polyfunctional thiol having two or more secondary or tertiary mercapto groups in the molecule is preferred, and a difunctional thiol having two secondary or tertiary mercapto groups in the molecule is more preferred. The secondary thiol compound (B1) is preferred to the tertiary thiol compound (B2).

"Polyfunctional thiol" referred to herein is a thiol compound having two or more mercapto groups as the functional groups, and "difunctional thiol" is a thiol compound having two mercapto groups as the functional groups.

The compound having two or more secondary or tertiary mercapto groups in the molecule is not specifically limited, but is, for example, preferably a compound having at least one structure represented by formula (Q) and having two or more secondary or tertiary mercapto groups in the molecule, inclusive of the mercapto group in the structure represented by formula (Q):

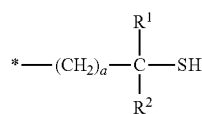

(Q)

wherein $R^1$ represents a hydrogen atom, an alkyl group having 1 to 10 carbon atoms, or an aromatic group having 6 to 18 carbon atoms, $R^2$ represents an alkyl group having 1 to 10 carbon atoms or an aromatic group having 6 to 18 carbon atoms, * bonds to an organic group, and a represents an integer of 0 to 2.

A compound having two or more secondary mercapto groups in the molecule wherein $R^1$ in formula (Q) is a hydrogen atom is more preferred. Specifically, the thiol compound (B) is preferably a secondary thiol compound (B1) wherein the mercapto group in formula (Q) bonds to a secondary carbon atom.

The alkyl group having 1 to 10 carbon atoms for $R^1$ and $R^2$ in formula (Q) may be linear or branched. Example thereof includes a methyl group, an ethyl group, various types of propyl groups, various types of butyl groups, various types of pentyl groups, various types of hexyl groups, various types of heptyl groups, various types of octyl groups, etc. "Various types" mean various types of isomers including n-, sec-, tert- and iso-forms.

Among these alkyl groups, a methyl group and an ethyl group are preferred.

Examples of the aromatic group having 6 to 18 carbon atoms for $R^1$ and $R^2$ in formula (Q) include a phenyl group, a benzyl group, a naphthyl group, an anthryl group, a phenanthryl group, etc. These aromatic groups may be substituted with a halogen atom, an amino group, a nitro group, a cyano group, etc.

In formula (Q), a is an integer of 0 to 2, and is preferably 1.

Further, the thiol compound (B) is preferably one having at least one ester structure represented by formula (Q-1):

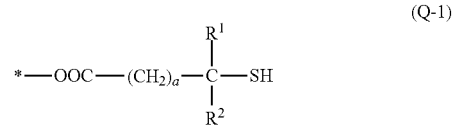

(Q-1)

wherein $R^1$, $R^2$, * and a are as defined above with respect to $R^1$, $R^2$, * and a in formula (Q-1).

The subscript a in formula (Q-1) is preferably 1. In the case where a is 1 and $R^1$ is a hydrogen atom, that is, in the case where the secondary thiol compound (B1) has an ester structure represented by formula (Q-1), as represented by formula (T) below, it is considered that the carbonyl oxygen and the mercapto group could easily coordinate to the metal element such as cobalt or the like in the metal-containing compound (A), thereby allowing the metal element to be surrounded by the thiol compound. As a result, it is considered that the contact of the metal element with water can be prevented. As compared with a tertiary thiol compound (B2), wherein $R^1$ and $R^2$ are both substituents bulkier than hydrogen, it is considered that the secondary thiol compound (B1) can exhibit more efficiently the curing acceleration performance because the coordination of the mercapto group to a metal element is not sterically hindered. However, if the carbonyl oxygen and the mercapto group of the tertiary thiol compound (B2) stably coordinate to the metal element, it is considered that the contact between the metal element and water can be more efficiently prevented than in the case of a secondary thiol compound (B1).

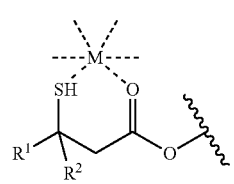

(T)

In formula (T), $R^1$ and $R^2$ are as defined above with respect to $R^1$ and $R^2$ in formula (Q-1), and M represents a metal element of the metal-containing compound (A).

The thiol compound (B) having an ester structure represented by formula (Q-1) is preferably a compound derived from a mercapto group-containing carboxylic acid represented by formula (S) and a polyhydric alcohol.

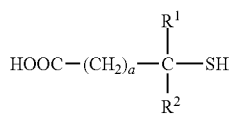

(S)

In formula (S), $R^1$, $R^2$ and a are as defined above with respect to $R^1$, $R^2$ and a in formula (Q).

The polyhydric alcohol may include dihydric alcohols such as ethylene glycol, diethylene glycol, triethylene glycol, tetraethylene glycol, polyethylene glycol, propylene glycol, dipropylene glycol, tripropylene glycol, polypropylene glycol, neopentyl glycol, 1,2-propanediol, 1,3-propanediol, 1,3-butanediol, 1,4-butanediol, 1,2-pentanediol, 1,3-pentanediol, 2,3-pentanediol, 1,4-pentanediol, 1,5-pentanediol, 1,6-hexanediol, 1,9-nonanediol, tricyclodecanedimethanol, (2,2-bis(2-hydroxyethoxyphenyl)propane), bisphenol A alkylene oxide adduct, bisphenol F alkylene oxide adduct, bisphenol S alkylene oxide adduct, 1,4-cyclohexanediol, 1,4-cyclohexanedimethanol, 1,2-hexanediol, 1,3-hexanediol, 2,3-hexanediol, 1,4-hexanediol, 2,4-hexanediol, 3,4-hexanediol, 1,5-hexanediol, 2,5-hexanediol, 1,6-hexanediol, 9,9-bis[4-(2-hydroxyethyl)phenyl]fluorenone, etc.; tri or more hydric alcohols such as glycerin, diglycerin, trimethylolethane, trimethylolpropane, ditrimethylolpropane, tris(2-hydroxyethyl) isocyanurate, hexanetriol, sorbitol, pentaerythritol, dipentaerythritol, sucrose, 2,2-bis(2,3-dihydroxypropyloxyphenyl)propane, etc.; and polycarbonate diols, dimeric acid polyester polyols, etc.

Among these, from the viewpoint of easy availability and from the viewpoint of improving curability in water, dihydric alcohols such as ethylene glycol, 1,2-propanediol, 1,3-propanediol, 1,4-butanediol, etc., tri or more polyhydric alcohols such as glycerin, trimethylolethane, trimethylolpropane, tris(2-hydroxyethyl) isocyanurate, pentaerythritol, dipentaerythritol, 2,2-bis(2,3-dihydroxypropyloxyphenyl) propane, etc., and polycarbonate diols and dimeric acid polyester polyols are preferred; and from the viewpoint of the number of functional groups and vapor pressure, 1,4-butanediol, trimethylolethane, trimethylolpropane, tris(2-hydroxyethyl)isocyanurate, pentaerythritol, polycarbonate diols and dimer acid polyester polyols are more preferred.

Secondary Thiol Compound (B1)

In the case where the thiol compound (B) having a structure represented by formula (Q) is a secondary thiol compound (B1), specific examples thereof includes 3-mercaptobutyric acid, di(1-mercaptoethyl) 3-mercaptophthalate, di(2-mercaptopropyl) phthalate, di(3-mercaptobutyl) phthalate, ethylene glycol bis(3-mercaptobutyrate), propylene glycol bis(3-mercaptobutyrate), diethylene glycol bis(3-mercaptobutyrate), butanediol bis(3-mercaptobutyrate), octanediol bis(3-mercaptobutyrate), trimethylolethane tris(3-mercaptobutyrate), trimethylolpropane tris(3-mercaptobutyrate), pentaerythritol tetrakis(3-mercaptobutyrate), dipentaerythritol hexakis(3-mercaptobutyrate), ethylene glycol bis(2-mercaptopropionate), propylene glycol bis(2-mercaptopropionate), diethylene glycol bis(2-mercaptopropionate), butanediol bis(2-mercaptopropionate), octanediol bis(2-mercaptopropionate), trimethylolpropane tris(2-mercaptopropionate), pentaerythritol tetrakis(2-mercaptopropionate), dipentaerythritol hexakis(2-mercaptopropionate), ethylene glycol bis(4-mercaptovalerate), diethylene glycol bis(4-mercaptovalerate), butanediol bis(4-mercaptovalerate), octanediol bis(4-mercaptovalerate), trimethylolpropane tris(4-mercaptovalerate), pentaerythritol tetrakis(4-mercaptovalerate), dipentaerythritol hexakis(4-mercaptovalerate), ethylene glycol bis(3-mercptovalerate), propylene glycol bis(3-mercaptovalerate), diethylene glycol bis(3-mercaptovalerate), butanediol bis(3-mercaptovalerate), octanediol bis(3-mercaptovalerate), trimethylolpropane tris(3-mercaptovalerate), pentaerythritol tetrakis(3-mercaptovalerate), dipentaerythritol hexakis(3-mercaptovalerate), hydrogenated bisphenol A bis(3-mercaptobutyrate), bisphenol A dihydroxyethyl ether-3-mercaptobutyrate, 4,4'-(9-fluorenylidene) bis(2-phenoxyethyl(3-mercaptobutyrate)), ethylene glycol bis(3-mercapto-3-phenylpropionate), propylene glycol bis(3-mercapto-3-phenylpropionate), diethylene glycol bis(3-mercapto-3-phenylpropionate), butanediol bis(3-mercapto-3-phenylpropionate), octanediol bis(3-mercapto-3-phenylpropionate), trimethylolpropane tris(3-mercapto-3-phenylpropionate), tris-2-(3-mercapto-3-phenylpropionate) ethyl isocyanurate, pentaerythritol tetrakis(3-mercapto-3-phenylpropionate), dipentaerythritol hexakis(3-mercapto-3-phenylpropionate), etc.

In the case where the secondary thiol compound (B1) is a compound having an ester structure represented by formula (Q-1), the compound is preferably derived from the above polyhydric alcohol and a carboxylic acid having the secondary mercapto group represented by formula (S). The carboxylic acid having the mercapto group represented by formula (S) includes 2-mercaptopropionic acid, 3-mercaptobutyric acid, 3-mercapto-3-phenylpropionic acid, etc.

The commercially available secondary thiol compounds (B1) having two or more secondary mercapto groups in the molecule may include 1,4-bis(3-mercaptobutyryloxy)butane (Karenz MT (registered trademark) BD1 manufactured by Showa Denko K.K.), pentaerythritol tetrakis(3-mercaptobutyrate) (Karenz MT (registered trademark) PE1 manufactured by Showa Denko K.K.), 1,3,5-tris[2-(3-mercaptobutyryloxyethyl)]-1,3,5-triazine-2,4,6(1H,3H,5H)-trione (Karenz MT (registered trademark) NR1 manufactured by Showa Denko K.K.), trimethylolethane tris(3-mercaptobutyrate) (TEMB manufactured by Showa Denko K.K.), trimethylolpropane tris(3-mercaptobutyrate) (TPMB manufactured by Showa Denko K.K.), etc. Preferably, one or more of these are used.

Tertiary Thiol Compound (B2)

In the case where the thiol compound (B) having the structure represented by formula (Q) is a tertiary thiol compound (B2), specific examples thereof include di(2-mercaptoisobutyl) phthalate, ethylene glycol bis(2-mercaptoisobutyrate), propylene glycol bis(2-mercaptoisobutyrate), diethylene glycol bis(2-mercaptoisobutyrate), butanediol bis(2-mercaptoisobutyrate), octanediol bis(2-mercaptoisobutyrate), trimethylolethane tris(2-mercaptoisobutyrate), trimethylolpropane tris(2-mercaptoisobutyrate), pentaerythritol tetrakis(2-mercaptoisobutyrate), dipentaerythritol hexakis (2-mercaptoisobutyrate), di(3-mercapto-3-methylbutyl) phthalate, ethylene glycol bis(3-mercapto-3-methylbutyrate), propylene glycol bis(3-mercapto-3-methylbutyrate), diethylene glycol bis(3-mercapto-3-methylbutyrate), butanediol bis(3-mercapto-3-methylbutyrate), octanediol bis(3-mercapto-3-methylbutyrate), trimethylolethane tris(3-mercapto-3-methylbutyrate), trimethylolpropane tris(3-mercapto-3-methylbutyrate), pentaerythritol tetrakis(3-mercapto-3-methylbutyrate), dipentaerythritol hexakis(3-mercapto-3-methylbutyrate), etc.

In the case where the tertiary thiol compound (B2) is a compound having the ester structure represented by formula (Q-1), the compound is preferably derived from the above polyhydric alcohol and a carboxylic acid having the tertiary mercapto group represented by formula (S). The carboxylic acid having the mercapto group represented by formula (S) may include 2-mercaptoisobutyric acid, 3-mercapto-3-methylbutyric acid, etc.

Esterification of Carboxylic Acid Having Mercapto Group Represented by Formula (S) and Polyhydric Alcohol Esterification of the carboxylic acid having the mercapto group represented by formula (S) and the polyhydric alcohol is not specifically limited, and the ester can be produced through ordinary esterification.

The reaction temperature in esterification is, from the viewpoint of rapidly promoting the reaction and preventing the formation of side products, preferably 60 to 160° C., more preferably 60 to 135° C. From the viewpoint of preventing formation of side products, the reaction is preferably carried out while removing water formed during the esterification.

In the esterification, a solvent may be used or may not be used. From the viewpoint of increasing the reaction speed, a solvent azeotropic with water is preferably used. The solvent azeotropic with water may include toluene, xylene, cyclohexane, ethylbenzene, etc. From the viewpoint of the balance between production cost and performance, toluene is preferred. The amount of the solvent azeotropic with water is preferably 10 to 90% by mass in the reaction system.

The carboxylic acid having the mercapto group represented by formula (S) and the polyhydric alcohol are preferably used in an amount such that the carboxy group in the carboxylic acid having the mercapto group represented by formula (S) could be 1.0 to 4.0 equiv to 1 equiv of the hydroxyl group in the polyhydric alcohol. When the equivalent of the carboxy group in the carboxylic acid having the mercapto group represented by formula (S) is 1.0 equiv or more, the amount of the unreacted hydroxyl group can be reduced, and two or more mercapto groups can be introduced into one molecule to increase the curability. When the carboxyl group is 4.0 equiv or less, the production cost can be reduced.

The catalyst for use in the esterification is preferably a nonvolatile acid catalyst, for example, inorganic acids such as sulfuric acid, perchloric acid, phosphoric acid, etc.; organic acids such as p-toluenesulfonic acid, methanesulfonic acid, levulinic acid, etc. Among these, from the viewpoint of reaction speed, sulfuric acid, p-toluenesulfonic acid, methanesulfonic acid and the like are preferred.

The nonvolatile acid catalyst means an acid catalyst having a vapor pressure of 1 kPa or less at 25° C.

The amount of the catalyst to be used is preferably 0.01 to 1.0 mol to 1 mol of the hydroxyl group of the polyhydric alcohol. When the amount of the catalyst used is 0.01 mol or more, the reaction speed can be sufficiently high, and when 1.0 mol or less, the amount of the basic substance to be used for neutralization after the reaction can be small.

The reaction pressure in the esterification is not specifically limited, but from the viewpoint of increasing the reaction speed, the pressure is preferably 100 to 760 mmHg, and further from the viewpoint of removing water efficiently, the pressure is more preferably 300 to 550 mmHg. When the reaction pressure falls within the above ranges, the temperature in the reaction system can be high and the reaction can proceed smoothly.

The completion of the reaction can be confirmed by the amount of water discharged from the reaction system. Preferably, the reaction is continued until the amount of water removed in the esterification reaches the theoretical amount of water to be eliminated. If a long time is needed, the reaction may be terminated at the time when water in an amount of 80% by mass or more of the theoretical amount is discharged. When the amount of water discharged is 80% by mass or more of the theoretical amount of water to be eliminated in the esterification, the amount of the unreacted polyhydric alcohol is small and therefore the curability of the radical-polymerizable resin composition of the invention is improved.

After the reaction, the acid catalyst is preferably neutralized. The basic substance to be used for the neutralization is not specifically limited, but from the viewpoint of cost reduction, sodium bicarbonate and sodium hydroxide are preferred, and from the viewpoint of easiness in pH control, sodium bicarbonate is more preferred.

After the reaction, the product may be purified by extraction. The extractant is, from the viewpoint of easiness in evaporation, toluene, ethyl acetate, isopropyl acetate and butyl acetate are preferred, and further from the viewpoint of the cost of the extractant, toluene and ethyl acetate are more preferred. For the purpose of increasing the liquid-liquid separation speed in extraction, a hydrophobic solvent may be added to the extractant, and from the viewpoint of the liquid-liquid separation speed and the cost of the hydrophobic solvent, hexane and heptane are more preferred.

In the solvent removal step, the solvent is evaporated away under reduced pressure under heating, and the evaporation temperature is preferably 80 to 150° C. irrespective of the degree of reduced pressure. When the temperature falls within the range, the solvent can be completely evaporated away, and the synthesized thiol compound can be prevented from polymerizing with each other.

The molecular weight of the thiol compound (B) in the present invention is not specifically limited, but preferably a low molecular weight, specifically 5,000 or less, more preferably 2,500 or less, even more preferably 1,500 or less, still more preferably 750 or less. Also preferably, the molecular weight is 100 or more, more preferably 150 or more, even more preferably 200 or more. In the present invention, the molecular weight is a number-average molecular weight measured by gel permeation chromatography (GPC) method using a polystyrene calibration.

The total amount of the thiol compound (B) in the radical-polymerizable resin composition of the present invention is preferably 0.01 to 10 parts by mass to 100 parts by mass of the radical-polymerizable compound (C) to be mentioned below, more preferably 0.1 to 7 parts by mass, even more preferably 0.1 to 5 parts by mass, still more preferably 0.2 to 4 parts by mass. When the amount of the thiol compound (B) is 0.01 parts by mass or more, the curing function can be sufficiently exhibited, and when 10 parts by mass or less, the curing occurs rapidly.

The total molar ratio of the thiol compound (B) to the metal component in the metal-containing compound (A), (B)/(A), is preferably 0.1 to 15, and in an embodiment of the present invention, the ratio is more preferably 0.3 to 10, even more preferably 0.6 to 8, still more preferably 0.8 to 5, and in another embodiment of the present invention, the ratio is more preferably 0.5 to 15, even more preferably 1 to 12, still more preferably 1.5 to 10, further more preferably 2 to 9. When the molar ratio (B)/(A) is 0.1 or more, the thiol compound (B) can sufficiently coordinate around the metal of the metal-containing compound (A), and when the molar ratio is 15 or less, the balance between production cost and performance is good.

The thiol compounds (B) may be used singly or in combination of two or more. In the case where a secondary thiol compound (B1) and a tertiary thiol compound (B2) are combinedly used, the molar ratio of (B1)/(B2) is preferably 0.001 to 1000, more preferably 1 to 10. When the molar ratio (B1)/(B2) falls within the range, the metal soap (A) and the thiol compound (B) stably form the state represented by formula (T) in the radical-polymerizable resin composition, and a disulfide compound of the thiol compounds (B) is not by-produced. From the viewpoint of storing the radical-polymerizable resin composition while keeping the metal soap (A) and the thiol compound (B) stable, the secondary thiol compound (B1) or the tertiary thiol compound (B2) is preferably used singly.

Radical-Polymerizable Compound (C)

The radical-polymerizable resin composition of the present invention comprises a radical-polymerizable compound (C) as a basic material. In the present invention, the radical-polymerizable compound (C) is a compound having an ethylenically unsaturated group in the molecule and undergoing radical polymerization.

The radical-polymerizable compound (C) may include a vinyl ester resin (epoxy (meth)acrylate resin), an unsaturated polyester resin, a polyester (meth)acrylate resin, a urethane (meth)acrylate resin, a (meth)acrylate resin, a radical-polymerizable unsaturated monomer, and a mixture of the above resin and a radical-polymerizable unsaturated monomer, etc. Above all, one or more selected from a vinyl ester resin, an unsaturated polyester resin, and a mixture of any of these and a radical-polymerizable unsaturated monomer are preferred. In this description, "(meth)acrylate" means "acrylate or methacrylate".

Vinyl Ester Resin

The vinyl ester resin may be one produced by the reaction of an epoxy resin and an unsaturated monobasic acid.

The epoxy resin may include a bisphenol A diglycidyl ether and high-molecular weight analogues thereof, novolak-type glycidyl ethers, etc.

Specific examples of the resin include bisphenol-type epoxy resins (for example, those produced by reacting a bisphenol such as bisphenol A, bisphenol F, bisphenol S, tetrabromobisphenol A or the like with epichlorohydrin and/or methylepichlorohydrin, those produced by reacting a condensation product of a bisphenol A glycidyl ether, the above bisphenol, and epichlorohydrin and/or methylepichlorohydrin, etc.), biphenyl-type epoxy resins (for example, those produced by reacting a biphenol with epichlorohydrin and/or methylepichlorohydrin), naphthalene-type epoxy resins (for example, those produced by reacting a dihydroxynaphthalene with epichlorohydrin and/or methylepichlorohydrin), aralkyldiphenol-type epoxy resins (for example, those produced by reacting an aralkylphenol with epichlorohydrin and/or methylepichlorohydrin), diglycidyl-type epoxy resins (for example, dimer acid diglycidyl esters, diglycidyl hexahydrophthalate), alicyclic epoxy resins (for example, alicyclic diepoxy acetals, alicyclic diepoxy adipates, alicyclic diepoxy carboxylates, etc.), oxazolidone ring-containing epoxy resins produced by reacting the above epoxy resin with a diisocyanate (as specific examples, Araldite (registered trademark) AER4152 manufactured by Asahi Kasei Epoxy Corporation, etc.), novolak-type epoxy resins (for example, those produced by reacting a phenol novolak or a cresol novolak with epichlorohydrin and/or methylepichlorohydrin), trisphenolmethane-type epoxy resins (for example, those produced by reacting trisphenolmethane or triscresolmethane with epichlorohydrin and/or methylepichlorohydrin), etc.

As the unsaturated monobasic acid, any known one is usable, for example, (meth)acrylic acid, crotonic acid, cinnamic acid, etc. In addition, a reaction product of a compound having one hydroxyl group and one or more (meth) acryloyl groups and a polybasic acid anhydride is also usable. In this description, "(meth)acrylic acid" means one or both of "acrylic acid and methacrylic acid", and "(meth) acryloyl group" means one or both of "acryloyl group and methacryloyl group".

The polybasic acid is used for increasing the molecular weight of the epoxy resin, and any known one is usable. Examples thereof include succinic acid, glutaric acid, adipic acid, sebacic acid, phthalic acid, fumaric acid, maleic acid, itaconic acid, tetrahydrophthalic acid, hexahydrophthalic acid, dimer acid, ethylene glycol 2-mol maleic anhydride adduct, polyethylene glycol 2-mol maleic anhydride adduct, propylene glycol 2-mol maleic anhydride adduct, polypropylene glycol 2-mol maleic anhydride adduct, dodecanoic diacid, tridecanoic diacid, octadecanoic diacid, 1,16-(6-ethylhexadecane)dicarboxylic acid, 1,12-(6-ethyldodecane)dicarboxylic acid, carboxyl-terminated butadiene/acrylonitrile copolymer (trade name Hycar CTBN), etc.

Unsaturated Polyester Resin

The unsaturated polyester resin for use herein may include those produced by the esterification of a dibasic acid component comprising an unsaturated dibasic acid and optionally a saturated dibasic acid with a polyhydric alcohol component.

Examples of the unsaturated dibasic acid include maleic acid, maleic anhydride, fumaric acid, itaconic acid, itaconic anhydride, etc. These may be used singly or in combination of two or more.

Examples of the unsaturated dibasic acid include aliphatic dibasic acids such as adipic acid, suberic acid, azelaic acid, sebacic acid, isosebacic acid, etc.; aromatic dibasic acids such as phthalic acid, phthalic anhydride, halogenophthalic anhydride, isophthalic acid, terephthalic acid, tetrachlorophthalic acid, tetrachlorophthalic anhydride, dimer acid, 2,6-naphthalenedicarboxylic acid, 2,7-naphthalenedicarboxylic acid, 2,3-naphthalenedicarboxylic acid, 2,3-naphthalenedicarboxylic acid anhydride, 4,4'-biphenyldicarboxylic acid, and dialkyl esters thereof, etc.; halogenated saturated dibasic acids, etc. These may be used singly or in combination of two or more.

The polyhydric alcohol is not specifically limited, and examples thereof include dihydric alcohols such as ethylene glycol, propylene glycol, diethylene glycol, dipropylene glycol, 1,2-butanediol, 1,3-butanediol, 1,4-butanediol, 1,5-pentanediol, 1,6-hexanediol, neopentyl glycol, 2-methyl-1,3-propanediol, 2-methyl-1,4-butanediol, 2,2-dimethyl-1,3-propanediol, 2,2,4-trimethyl-1,3-pentanediol, 2-ethyl-2-butyl-1,3-propanediol, 3-methyl-1,5-pentanediol, diethylene glycol, triethylene glycol, polyethylene glycol, dipropylene glycol, polypropylene glycol, 1,2-cyclohexaneglycol, 1,3-cyclohexaneglycol, 1,4-cyclohexaneglycol, 1,4-cyclohexanedimethanol, paraxylene glycol, bicyclohexyl-4,4'-diol, 2,6-decalin glycol, 2,7-decalin glycol, etc.;

dihydric alcohols that are adducts of a dihydric phenol such as hydrogenated bisphenol A, cyclohexanedimethanol, bisphenol A, bisphenol F, bisphenol S, tetrabromobisphenol A or the like with an alkylene oxide such as propylene oxide or ethylene oxide;

tri- or more hydric alcohols such as 1,2,3,4-tetrahydroxybutane, glycerin, trimethylolpropane, pentaerythritol, etc.

The unsaturated polyester may be modified with a dicyclopentadiene compound as long as not detracting from the advantageous effects of the present invention. Regarding the method of modifying with a dicyclopentadiene compound, for example, a known method is employable, such as a method of preparing an addition product of dicyclopentadiene and maleic acid (didecanol monomaleate), then introducing a dicyclopentadiene skeleton using it as a monobasic acid.

In the vinyl ester resin or the unsaturated polyester resin for use in the present invention, an oxidatively polymerizable group can be introduced. The introduction method is not specifically limited. Examples of the method include a method of adding a polymer having an oxidatively polymerizable group; a method of condensing with a compound having a hydroxyl group and an allyl ether group; and a method wherein a compound having a hydroxyl group and an allyl ether group is reacted with an acid anhydride and the resultant reaction product is added to allyl glycidyl ether or 2,6-diglycidylphenyl allyl ether.

Polyester (Meth)Acrylate Resin, Urethane (Meth)Acrylate Resin, and (Meth)Acrylate Resin As the polyester (meth)acrylate resin in the present invention, for example, a polyester produced by reacting a polycarboxylic acid and a polyhydric alcohol, specifically a resin produced by reacting a (meth)acrylic acid with the hydroxyl group at both terminals of polyethylene terephthalate or the like can be used.

As the urethane (meth)acrylate resin, for example, a resin produced by reacting a (meth)acrylic acid with the hydroxyl group or the isocyanate group at both terminals of a polyurethane produced by the reaction of an isocyanate and a polyhydric alcohol can be used.

As the (meth)acrylate resin, for example, a poly(meth)acrylic resin having one or more substituents selected from a hydroxyl group, an isocyanate group, a carboxy group and an epoxy group, or a resin produced by reacting a hydroxyl group-containing (meth)acrylate with the substituent of a polymer produced from a monomer having the above substituent and a (meth)acrylate can be used.

Radical-Polymerizable Unsaturated Monomer

In the present invention, a radical-polymerizable unsaturated monomer can be used as the radical-polymerizable compound (C).

A radical-polymerizable unsaturated monomer may be used alone, but is preferably used in combination with at least one of the above vinyl ester resin and the above unsaturated polyester resin.

The radical-polymerizable unsaturated monomer is not specifically limited, but is preferably one having a vinyl group or a (meth)acryloyl group.

Specific examples of the vinyl group-containing monomer include styrene, p-chlorostyrene, vinyltoluene, α-methylstyrene, dichlorostyrene, divinylbenzene, tert-butylstyrene, vinyl acetate, diallyl phthalate, triallyl isocyanurate, etc.

Specific examples of the (meth)acryloyl group-containing monomer include (meth)acrylates. Examples thereof include methyl (meth)acrylate, ethyl (meth)acrylate, n-butyl (meth)acrylate, isobutyl (meth)acrylate, tert-butyl (meth)acrylate, 2-ethylhexyl (meth)acrylate, lauryl (meth)acrylate, cyclohexyl (meth)acrylate, benzyl (meth)acrylate, stearyl (meth) acrylate, tridecyl (meth)acrylate, dicyclopentenyloxyethyl (meth)acrylate, phenoxyethyl methacrylate, 2-hydroxyethyl methacrylate, ethylene glycol monomethyl ether (meth)acrylate, ethylene glycol monoethyl ether (meth)acrylate, ethylene glycol monobutyl ether (meth)acrylate, ethylene glycol monohexyl ether (meth)acrylate, ethylene glycol mono-2-ethylhexyl ether (meth)acrylate, diethylene glycol monomethyl ether (meth)acrylate, diethylene glycol monoethyl ether (meth)acrylate, diethylene glycol monobutyl ether (meth)acrylate, diethylene glycol monohexyl ether (meth)acrylate, diethylene glycol mono-2-ethylhexyl ether (meth)acrylate, neopentyl glycol di(meth)acrylate, dimethacrylate of PTMG, 1,3-butylene glycol di(meth)acrylate, 1,6-hexanediol di(meth)acrylate, neopentyl glycol di(meth)acrylate, 2-hydroxy-1,3-dimethacyrloyloxypropane, 2,2-bis[4-(methacryloylethoxy)phenyl]propane, 2,2-bis[4-(methacryloxydiethoxy)phenyl]propane, 2,2-bis[4-(methacryloxy.polyethoxy)phenyl]propane, tetraethylene glycol diacrylate, bisphenol AEO-modified (n=2) diacrylate, isocyanuric acid EO-modified (n=3) diacrylate, pentaerythritol diacrylate monostearate, dicyclopentenyl acrylate, dicyclopentenyloxyethyl acrylate, tricyclodecanyl (meth)acrylate, tris(2-hydroxyethyl) isocyanurate acrylate, etc.

Examples of polyfunctional (meth)acrylates include alkanediol di(meth)acrylates such as ethylene glycol di(meth)acrylate, 1,2-propylene glycol di(meth)acrylate, 1,3-butylene glycol di(meth)acrylate, 1,4-butylene glycol di(meth)acrylate, neopentyl glycol di(meth)acrylate, 1,6-hexanediol di(meth)acrylate, etc.; polyoxyalkylene glycol di(meth)acrylates such as diethylene glycol di(meth)acrylate, dipropylene glycol di(meth)acrylate, triethylene glycol (meth)acrylate, tetraethylene glycol di(meth)acrylate, polyethylene glycol (meth)acrylate, etc.; trimethylolpropane di(meth)acrylate, glycerin di(meth)acrylate, pentaerythritol di(meth)acrylate, trimethylolpropane tri(meth)acrylate, glycerin tri(meth)acrylate, pentaerythritol tri(meth)acrylate, pentaerythritol tetra(meth)acrylate, dipentaerythritol hexa(meth)acrylate, etc.

Further, as the radical-polymerizable unsaturated monomer, the following compounds are also usable. Specifically, the compounds include divinyl benzene, diallyl phthalate, triallyl phthalate, triallyl cyanurate, triallyl isocyanurate, allyl (meth)acrylate, diallyl fumarate, allyl methacrylate, vinylbenzyl butyl ether, vinylbenzyl hexyl ether, vinylbenzyl octyl ether, vinylbenzyl (2-ethylhexyl) ether, vinylbenzyl (β-methoxymethyl) ether, vinylbenzyl (n-butoxypropyl) ether, vinylbenzyl cyclohexyl ether, vinylbenzyl (β-phenoxyethyl) ether, vinylbenzyl dicyclopentenyl ether, vinylbenzyl dicyclopentenyloxyethyl ether, vinylbenzyl dicyclopentenylmethyl ether, and divinylbenzyl ether.

In addition to the above, dicyclopentenyl (meth)acrylate, dicyclopentenyloxyethyl (meth)acrylate and the like are also usable.

These may be used singly or in combination of two or more.

The radical-polymerizable unsaturated monomer can be used for lowering the viscosity of the radical-polymerizable resin composition of the present invention and for enhancing the hardness, the strength, the chemical resistance and the waterproofness thereof. However, too much content of the monomer may deteriorate the cured product and may cause environmental pollution. Consequently, the content of the radical-polymerizable unsaturated monomer is preferably 90% by mass or less in the radical-polymerizable compound (C).

Further, in the case where the radical-polymerizable compound (C) comprises especially styrene as the radical-polymerizable unsaturated monomer, the content thereof is preferably 60% by mass or less, more preferably 50% by mass or less, even more preferably 20% by mass or less, still more preferably 5% by mass or less. When the content of styrene in the radical-polymerizable compound (C) is more than 60% by mass, styrene may unfavorably dissolve out into water to embrittle the cured product.

In the radical-polymerizable compound (C), a catalyst and a polymerization inhibitor used in synthesizing a vinyl ester resin, an unsaturated polyester resin, a polyester (meth) acrylate resin, a urethane (meth)acrylate resin and a (meth) acrylate resin may remain.

Examples of the catalyst include tertiary nitrogen-containing compounds such as triethylamine, pyridine derivatives, imidazole derivatives, etc.; amine salts such as tetramethylammonium chloride, triethylamine, etc.; phosphorus compounds such as trimethylphosphine, triphenylphosphine, etc.

Examples of the polymerization inhibitor include hydroquinone, methylhydroquinone, phenothiazine, etc.

In the case where a catalyst or a polymerization inhibitor remains in the radical-polymerizable compound (C), the amount of each is preferably 0.001 to 2 parts by mass to 100 parts by mass of the total of the vinyl ester resin and the unsaturated polyester resin.

The content of the radical-polymerizable compound (C) in the radical-polymerizable resin composition of the present invention is preferably 10 to 99.9% by mass, and in an embodiment of the present invention, the content is more preferably 15 to 80% by mass, even more preferably 20 to 60% by mass, still more preferably 25 to 40% by mass, while in another embodiment, the content is more preferably 80 to 99.9% by mass, even more preferably 85 to 99.5% by mass, still more preferably 90 to 99.5% by mass. When the content of the radical-polymerizable compound (C) in the radical-polymerizable resin composition falls within the above ranges, the hardness of the cured product can be furthermore higher.

Radical Polymerization Initiator (D)

The radical-polymerizable resin composition of the present invention preferably comprises a radical polymerization initiator (D) as a curing agent. The radical polymerization initiator (D) includes a thermal radical polymerization initiator (D-1) and a photoradical polymerization initiator (D-2).

Examples of the thermal radical polymerization initiator (D-1) include organic peroxides, for example, diacyl peroxides such as benzoyl peroxide, etc.; peroxy esters such as tert-butyl peroxybenzoate, etc.; hydroperoxides such as cumene hydroperoxide, etc.; dialkyl peroxides such as dicumyl peroxide, etc.; ketone peroxides such as methyl ethyl ketone peroxide, acetyl acetone peroxide, etc.; peroxyketals, alkyl peresters, percarbonates, etc.

The photoradical polymerization initiator (D-2) includes benzoin ethers such as benzoin alkyl ethers, etc.; benzophenones such as benzophenone, benzil, methyl orthobenzoyl benzoate, etc.; acetophenones such as benzyl dimethyl ketal, 2,2-diethoxyacetophenone, 2-hydroxy-2-methylpropiophenone, 4-isopropyl-2-hydroxy-2-methylpropiophenone, 1,1-dichloroacetophenone, etc.; thioxanthones such as 2-chlorothioxanthone, 2-methylthioxanthone, 2-isopropylthioxanthone, etc.

The photoradical polymerization initiator (D-2) sensitive to UV light to visible light includes various known initiators such as acetophenones, benzyl ketals, and (bis)acylphosphine oxides, and specific examples thereof include Irgacure 1700 (trade name, manufactured by Ciba Specially Chemicals Corporation) which is a 75%/25% mixture of 2-hydroxy-2-methyl-1-phenylpropan-1-one (trade name: Darocur 1173, manufactured by Ciba Specialty Chemicals Corporation) and bis(2,6-dimethoxybenzoyl)-2,4,4-trimethylpentyl phosphine oxide (manufactured by Ciba Specialty Chemicals Corporation); Irgacure 1800 (trade name, manufactured by Ciba Specialty Chemicals Corporation) which is a 75%/25% mixture of 1-hydroxycyclohexyl phenyl ketone (trade name: Irgacure 184, manufactured by Ciba Specialty Chemicals Corporation) and bis(2,6-dimethoxybenzoyl)-2, 4,4-trimethylpentyl phosphine oxide (manufactured by Ciba Specialty Chemicals Corporation); Irgacure 1850 (trade name, manufactured by Ciba Specialty Chemicals Corporation) which is a 50%/50% mixture of the preceding compounds; bis(2,4,6-trimethylbenzoyl)phenyl phosphine oxide (trade name: Irgacure 819, manufactured by Ciba Specialty Chemicals Corporation); 2,4,6-trimethylbenzoyl diphenyl phosphine oxide (trade name; Lucirin TPO, manufactured by BASF AG); Darocur 4265 (trade name) which is a 50%/50% mixture of 2-hydroxy-2-methyl-1-phenylpropane-1-one (trade name: Darocur 1173, manufactured by Ciba Specialty Chemicals Corporation) and 2,4,6-trimethylbenzoyldiphenyl phosphine oxide (trade name: Lucirin TPO, manufactured by BASF AG), etc.

The photoradical polymerization initiator (D-2) sensitive to a visible light region includes camphor quinone, benzyltrimethylbenzoyl diphenyl phosphinoxide, methyl thioxanthone, dicyclopentadiethyltitanium-di(pentafluorophenyl), etc.

These radical polymerization initiators (D) may be used singly or in combination of two or more. For the purpose of assisting one of the thermal curing reaction and the photocuring reaction, the other curing reaction may be used, for example, the thermal radical polymerization initiator (D-1) and the photoradical polymerization initiator (D-2) may be combinedly used, as needed.

Depending on molding conditions, a composite form such as peroxide/dye, diphenyl iodide salt/dye, imidazole/keto compound, hexaallylbiimidazole compound/hydrogen donor compound, mercaptobenzothiazole/thiopyrylium salt, metal arene/cyanine dye, hexaallylbiimidazole/radical generator or the like is also employable.

In the case where the radical-polymerizable resin composition of the present invention comprises the radical polymerization initiator (D), the amount thereof is preferably 0.1 to 10 parts by mass to 100 parts by mass of the radical-polymerizable compound (C), more preferably 0.5 to 8 parts by mass, even more preferably 0.5 to 5 parts by mass.

Curing Accelerator (E)

The radical-polymerizable resin composition of the present invention may comprise a curing accelerator (E) other than the metal-containing compound (A) and the thiol compound (B) for the purpose of improving the curability.

The curing accelerator (E) other than the metal-containing compound (A) and the thiol compound (B) includes amines, for example, N,N-substituted anilines, N,N-substituted p-toluidines, 4-(N,N-substituted amino)benzaldehydes and the like. Example thereof include aniline, N,N-dimethylaniline, N,N-diethylaniline, p-toluidine, N,N-dimethyl-p-toluidine, N,N-bis(2-hydroxyethyl)-p-toluidine, 4-(N,N-dimethylamino)benzaldehyde, 4-[N,N-bis(2-hydroxyethyl)amino]benzaldehyde, 4-(N-methyl-N-hydroxyethylamino) benzaldehyde, N,N-bis(2-hydroxypropyl)-p-toluidine, N-ethyl-m-toluidine, triethanolamine, m-toluidine, diethylenetriamine, pyridine, phenylmorpholine, piperidine, N,N-bis(hydroxyethyl)aniline, diethanolaniline, etc.

However, a part or all of the curing accelerator (E) dissolves in water or eluted into water or forms a complex with water in some cases. Therefore, the curing accelerator (E) possibly eluted into water is preferably not used, particularly when using in water or seawater.

Filler (F)

The radical-polymerizable resin composition of the present invention may comprise a filler (F) for the purpose of enhancing workability and for controlling physical properties. For example, the filler (F) includes an inorganic filler and an organic filler.

As the inorganic filler, any known one is usable, including cement, quicklime, river gravel, river sand, seashore gravel, seashore sand, mountain gravel, damaged stone, crushed sand, sand containing silica as the main component such as silica sand, etc., artificial aggregate such as ceramics, glass waste, etc., talc, zeolite, activated carbon, etc. However, from the viewpoint of heat generation and shrinkage through hydration reaction of cement, a combination of cement causing hydration reaction and a dried aggregate of river gravel or the like is preferred.

Various types of cements are usable, including Portland cements such as normal Portland cement, early-strength Portland cement, ultrahigh-early-strength Portland cement, moderate-heat Portland cement, sulfate-resistant Portland cement, etc.; mixed cements such as slag cement, silica cement, fly ash cement, etc.; special cements such as ultrarapid hardening cement, alumina cement, oil well cement, geothermal cement, color cement, powdery cement, etc.; and various gypsums.

From the viewpoint of imparting flame retardancy, aluminum hydroxide is also usable, and from the viewpoint of controlling flowability, fumed silica, talc or the like is also usable. In addition, from the viewpoint of coloration, a colorant or an inorganic pigment such as titanium oxide or the like can be used, and further, Molecular sieves are also usable.

As the organic filler, various organic fillers such as amide wax, absorbent polymer and the like are usable.

In the case where the photoradical polymerization initiator (D-2) is used, a filler not reducing light transmission is preferably used, and examples thereof include fumed silica, glass powder, glass milled fibers, silica powder, etc.

The amount of the filler (F) in the radical-polymerizable resin composition of the present invention is preferably 0.1 to 700 parts by mass to 100 parts by mass of the radical-polymerizable compound (C), and in an embodiment of the present invention, the amount is more preferably 0.1 to 500 parts by mass and even more preferably 1 to 500 parts by mass, in another embodiment, the amount is more preferably 0.1 to 500 parts by mass and even more preferably 10 to 500 parts by mass, and in still another embodiment, the amount is more preferably 10 to 700 parts by mass and even more preferably 30 to 600 parts by mass. When the amount of the filler falls within the above ranges, the water remaining inside can be fully removed. On the other hand, an amount over the range may interfere with operation such as injection, etc.

Fiber (G)

The radical-polymerizable composition of the present invention may comprise fibers as needed. Specific examples of the fibers usable in the present invention include glass fibers, carbon fibers, vinylon fibers, nylon fibers, aramid fibers, polypropylene fibers, acrylic fibers, polyester fibers such as polyethylene terephthalate fibers, etc., cellulose fibers, metal fibers such as steel fibers, etc., ceramic fibers such as alumina fibers, etc. Preferably, these fibers are used in the form of fiber structures, biaxial meshes or triaxial meshes selected from, for example, plain-woven fabrics, sateen woven fabrics, nonwoven fabrics, mats, rovings, chopped fabrics, knitted fabrics, braids, and composite structures thereof, etc. For example, in some cases, the radical-polymerizable composition may be impregnated into the fiber structure and then prepolymerized to form a prepreg.

As the meshes, for example, biaxial meshes and triaxial meshes are usable. The length of one side of the square of the biaxial mesh (mesh size) and the length of one side of the triangle of the triaxial mesh (mesh size) are each preferably 5 mm or more, more preferably 10 to 20 mm. By using a biaxial mesh or a triaxial mesh, a curable material for prevention of concrete spalling that is lightweight and economical and excellent in workability and durability can be obtained.

Preferably, these fibers are used for enhancing the performance of coating such as the resistance to concrete spalling, FRP waterproofness, etc., or used for producing FRP molded articles.

For use for preventing concrete spalling, glass fibers, cellulose fibers and the like are preferred from the viewpoint that the degree of deterioration of the under coat can be visually inspected from the outside.

The content of fibers is preferably 0.1 to 100% by mass in the radical-polymerizable coating resin composition, more preferably 1 to 75% by mass, even more preferably 2 to 50% by mass.

Other Components

Polymerization Inhibitor

The radical-polymerizable resin composition of the present invention may comprise a polymerization inhibitor from the viewpoint of suppressing excessive polymerization of the radical-polymerizable compound (C) and for controlling the reaction speed.

The polymerization inhibitor may be any known one, including hydroquinone, methylhydroquinone, phenothiazine, catechol, 4-tert-butylcatechol, etc.

Curing Retardant

The radical-polymerizable resin composition of the present invention may comprise a curing retardant for the purpose of retarding the curing of the radical-polymerizable composition (C). The curing retardant includes a free radical-type curing retardant, and examples thereof include TEMPO derivatives such as 2,2,6,6-tetramethylpiperidin-1-oxyl free radical (TEMPO), 4-hydroxy-2,2,6,6-tetramethylpiperidin-1-oxyl free radical (4H-TEMPO), 4-oxo-2,2,6,6-tetramethylpiperidin-1-oxyl free radical (4-Oxo-TEMPO), etc. Among these, 4-hydroxy-2,2,6,6-tetramethylpiperidin-1-oxyl free radical (4H-TEMPO) is preferred from the viewpoint of cost and easy handling ability.

In the case where the radical-polymerizable resin composition comprises a polymerization inhibitor and a curing retardant, the amount of each is preferably 0.0001 to 10 parts by mass to 100 parts by mass of the radical-polymerizable compound (C), more preferably 0.001 to 10 parts by mass.

Coupling Agent

The radical-polymerizable resin composition of the present invention may comprise a coupling agent for the purpose of enhancing workability and for the purpose of enhancing adhesion to substrates. The coupling agent includes known silane coupling agents, titanate coupling agents, aluminum coupling agents, etc.

Examples of such coupling agents include silane coupling agents represented by $R^3$—$Si(OR^4)_3$, wherein $R^3$ is, for example, an aminopropyl group, a glycidyloxy group, a methacryloxy group, an N-phenylaminopropyl group, a mercapto group, a vinyl group, etc., and $R^4$ is, for example, a methyl group, an ethyl group, etc.

In the case where the radical-polymerizable resin composition comprises a coupling agent, the amount thereof is preferably 0.001 to 10 parts by mass to 100 parts by mass of the radical-polymerizable compound (C).

Polyisocyanate Compound

The radical-polymerizable resin composition of the present invention may comprise a polyisocyanate compound. The polyisocyanate compound reacts with the hydroxyl group of the radical-polymerizable compound (C) to form a cured coating film.

The polyisocyanate compound comprises two or more isocyanate groups in the molecule, and the isocyanate group may be blocked with a blocking agent, etc.

Examples of the polyisocyanate compound not blocked with a blocking agent include aliphatic diisocyanates such as lysine diisocyanate, hexamethylene diisocyanate, trimethylhexane diisocyanate, etc.; cycloaliphatic diisocyanates such as hydrogenated xylylene diisocyanate, isophorone diisocyanate, methylcyclohexane-2,4 (or 2,6)-diisocyanate, 4,4'-methylenebis(cyclohexyl isocyanate), 1,3-(isocyanatomethyl)cyclohexane, etc.; aromatic diisocyanates such as tolylene diisocyanate, xylylene diisocyanate, diphenylmethane diisocyanate, etc.; tri- or more polyisocyanates such as lysine triisocyanate, etc.; as well as addition products of each of these polyisocyanates with a polyhydric alcohol, a low molecular weight polyester resin, water or the like; cyclized polymers of the above diisocyanates (for example, isocyanurates), biuret-type addition products thereof, etc. Above all, isocyanurates of hexamethylene diisocyanate are preferred.

These polyisocyanate compounds may be used singly or in combination of two or more.

In the case where the radical-polymerizable resin composition comprises a polyisocyanate compound, the amount thereof is preferably 0.1 to 50 parts by mass to 100 parts by mass of the radical-polymerizable compound (C), more preferably 1 to 30 parts by mass, even more preferably 2 to 20 parts by mass.

The blocked polyisocyanate compound is one prepared by blocking the isocyanate group in the above polyisocyanate compound with a blocking agent.

Examples of the blocking agent include phenol compounds such as phenol, cresol, xylenol, etc.; lactams such as ε-caprolactam, δ-valerolactam, γ-butyrolactam, β-propiolactam, etc.; alcohols such as methanol, ethanol, n- or iso-propyl alcohol, n-, iso- or tert-butyl alcohol, ethylene glycol monomethyl ether, ethylene glycol monoethyl ether, ethylene glycol monobutyl ether, diethylene glycol monomethyl ether, diethylene glycol monoethyl ether, propylene glycol monomethyl ether, benzyl alcohol, etc.; oximes such as formamidoxime, acetaldoxime, acetoxime, methylethyl ketoxime, diacetyl monoxime, benzophenone oxime, cyclohexane oxime, etc.; active methylenes such as dimethyl malonate, diethyl malonate, ethyl acetoacetate, methyl acetoacetate, acetyl acetone, etc. By mixing the polyisocyanate with the blocking agent, the isocyanate group in the polyisocyanate can be readily blocked.

In the case where the polyisocyanate compound is an unblocked polyisocyanate compound, the radical-polymerizable compound (C) in the radical-polymerizable resin composition of the present invention reacts with the polyisocyanate compound, and therefore, it is preferable that the radical-polymerizable compound (C) and the polyisocyanate are separated before use and mixed in use.

A curing catalyst may be used for reacting the radical-polymerizable compound (C) and the polyisocyanate compound. Preferred examples of the curing catalyst include organic metal catalysts such as tin octylate, dibutyl tin di(2-ethylhexanoate), dioctyl tin di(2-ethylhexanoate), dioctyl tin diacetate, dibutyl tin dilaurate, dibutyl tin oxide, dioctyl tin oxide, lead 2-ethylhexanoate, etc.

In the case where the radical-polymerizable resin composition comprises the above curing catalyst, the amount thereof is preferably 0.01 to 5 parts by mass to 100 parts by mass of the radical-polymerizable compound (C), more preferably 0.05 to 4 parts by mass.

Surfactant

The radical-polymerizable resin composition of the present invention preferably comprises a surfactant from the viewpoint of well mixing the resin and water so that the composition could cure even when the composition holds water therein.

The surfactant includes an anionic surfactant, a nonionic surfactant, a cationic surfactant and an ampholytic surfactant. These surfactants may be used singly or in combination of two or more.

Among these surfactants, one or more selected from an anionic surfactant and a nonionic surfactant are preferred.

Examples of the anionic surfactant include alkyl sulfate salts such as sodium lauryl sulfate, triethanolamine lauryl sulfate, etc.; polyoxyethylene alkyl ether sulfate salts such as sodium polyoxyethylene lauryl ether sulfate, triethanolamine polyoxyethylene alkyl ether sulfate, etc.; dodecylbenzenesulfonic acid, sulfonate salts such as sodium dodecylbenzenesulfonate, sodium alkylnaphthalenesulfonate, sodium dialkylsulfosuccinate, etc.; fatty acid salts such as sodium stearate soap, potassium oleate soap, potassium castor oil soap, etc.; naphthalenesulfonic acid/formalin condensation product, special polymers, etc.

Among these, sulfonate salts are preferred, sodium dialkylsulfosuccinate is more preferred, and sodium dioctylsulfosuccinate is even more preferred.

Examples of the nonionic surfactant include polyoxyethylene alkyl ethers such as polyoxylauryl ether, polyoxyethylene cetyl ether, polyoxyethylene stearyl ether, polyoxyethylene oleyl ether, etc.; polyoxyethylene derivatives such as polyoxyethylene-distyrenated phenyl ether, polyoxyethylene tribenzyl phenyl ether, polyoxyethylene polyoxypropylene glycol, etc.; sorbitan fatty acid esters such as polyoxyalkylene alkyl ether, sorbitan monolaurate, sorbitan monopalmitate, sorbitan monostearate, etc.; polyoxyethylene sorbitan fatty acid esters such as polyoxyethylene sorbitan monolaurate, polyoxyethylene sorbitan monolaurate, polyoxyethylene sorbitan monopalmitate, etc.; polyoxyethylene sorbitol fatty acid esters such as polyoxyethylene sorbitol tetraoleate, etc.; glycerin fatty acid esters such as glycerin monostearate, glycerin monooleate, etc.

Among these, polyoxyethylene lauryl ether, polyoxyethylene cetyl ether, polyoxyethylene stearyl ether, polyoxyethylene oleyl ether and polyoxyethylene alkyl ether are preferred. HLB (hydrophile-lipophile balance) of the nonionic surfactant is preferably 5 to 15, more preferably 6 to 12.

In the case where the radical-polymerizable resin composition comprises a surfactant, the amount thereof is preferably 0.01 to 10 parts by mass to 100 parts by mass of the radical-polymerizable compound, more preferably 0.05 to 7 parts by mass, even more preferably 0.1 to 5 parts by mass.

Wetting Dispersant

The radical-polymerizable resin composition of the present invention may comprise a wetting dispersant for improving the penetrability thereof into a wet or submerged object to be repaired.

The wetting dispersant includes a fluorine wetting dispersant and a silicone wetting dispersant. These may be used singly or in combination of two or more.

Commercial products of a fluorine wetting dispersant include Megafac (registered trademark) F176, Megafac (registered trademark) R08 (both manufactured by DIC Corporation), PF656, PF6320 (manufactured by OMNOVA Solutions Inc.), Troysol S-366 (manufactured by Troy Chemical Corporation), Fluorad FC430 (manufactured by 3M Japan Limited), Polysiloxane Polymer KP-341 (manufactured by Shin-etsu Chemical Co., Ltd.), etc.

Commercial products of a silicone wetting dispersant include BYK (registered trademark)-322, BYK (registered trademark)-377, BYK (registered trademark)-UV3570, BYK (registered trademark)-330, BYK (registered trademark)-302, BYK (registered trademark)-UV3500, BYK-306 (manufactured by BYK Corporation), Polysiloxane Polymer KP-341 (manufactured by Shin-etsu Chemical Co., Ltd.), etc.

Preferably, the silicone wetting dispersant includes a compound represented by formula (U).

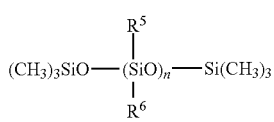

(U)

In the formula, $R^5$ and $R^6$ each independently represent a hydrocarbon group having 1 to 12 carbon atoms which optionally having an aromatic ring, or —$(CH_2)_3O(C_2H_4O)_p(CH_2CH(CH_3)O)_qR'$, n represents an integer of 1 to 200, R' represents an alkyl group having 1 to 12 carbon atoms, p and q each represent an integer and satisfy q/p=0 to 10.

Commercial products of a silicone wetting dispersant including the compound represented by formula (U) include BYK (registered trademark)-302 and BYK (registered trademark)-322 (manufactured by BYK Corporation).

In the case where the radical-polymerizable resin composition of the present invention comprises a wetting dispersant, the amount thereof is preferably 0.001 to 5 parts by mass to 100 parts by mass of the radical-polymerizable compound (C), more preferably 0.01 to 2 parts by mass.

Wax

The radical-polymerizable resin composition of the present invention may comprise wax.

The wax includes paraffin waxes and polar waxes. These may be used singly or in combination of two or more.

As paraffin waxes, known ones having a different melting point can be used. As polar waxes, those having both a polar group and a nonpolar group in the structure may be used, and specific examples thereof include NPS (registered trademark)-8070, NPS (registered trademark)-9125 (manufactured by Nippon Seiro Co., Ltd.), Emanon (registered trademark) 3199, Emanon (registered trademark) 3299 (manufactured by Kao Corporation), etc.

In the case where the radical-polymerizable resin composition of the present invention comprises wax, the amount thereof is preferably 0.05 to 4 parts by mass to 100 parts by mass of the radical-polymerizable compound, more preferably 0.1 to 2.0 parts by mass. However, in the case where the radical-polymerizable resin composition of the present invention is used in water, preferably, wax is not used since it may dissolve out in water.

Thixotropic Agent

The radical-polymerizable resin composition of the present invention may comprise a thixotropic agent for the purpose of viscosity control for securing operability on a vertical surface or a ceiling surface.

The thixotropic agent includes an inorganic thixotropic agent and an organic thixotropic agent. The organic thixotropic agent includes a hydrogenated castor oil agent, an amide agent, a polyethylene oxide agent, a vegetable polymer oil agent, a surfactant agent, and a composite agent of these agents. Specific examples include Disparlon (registered trademark) 6900-20X (by Kusumoto Chemicals, Ltd.), etc.

The inorganic thixotropic agent includes silica type and bentonite type, and hydrophobic agents include Reolosil (registered trademark) PM-20L (silica by vapor phase reaction manufactured by Tokuyama Corporation), Aerosil (registered trademark) R-106 (by Nippon Aerosil Co., Ltd.), etc. Hydrophilic agents include Aerosil (registered trademark) L-200 (by Nippon Aerosil Co., Ltd.), etc. From the viewpoint of enhancing thixotropy, one prepared by adding a thixotropy modifier, BYK (registered trademark) R605 or BYK (registered trademark) R606 (manufactured by BYK Corporation) to a hydrophilic baked silica can be also favorably used.

In the case where the radical-polymerizable resin composition of the present invention comprises a thixotropic agent, the amount thereof is preferably 0.01 to 10 parts by mass to 100 parts by mass of the radical-polymerizable compound, more preferably 0.1 to 5 parts by mass.

Preferably, the radical-polymerizable resin composition of the present invention does not comprise water. However, the composition may comprise water in an amount of less than 5% by mass of the composition, which may incidentally mix in the radical-polymerizable resin composition from the ambient environment during manufacture or use of the composition.

Production Method for Radical-Polymerizable Resin Composition

The production method for the radical-polymerizable resin composition of the present invention comprises a step 1 of mixing the metal-containing compound (A) and the radical-polymerizable compound (C) to prepare a liquid mixture (i), and a step 2 of mixing the liquid mixture (i) and the thiol compound (B) to prepare a liquid mixture (ii).

When the radical-polymerizable resin composition of the present invention is produced according to the above method, the thiol compound (B) can be efficiently coordinated around the metal of the metal-containing compound (A).

The mixing method in each step is not specifically limited, and may be carried out according to a known method. The temperature in mixing is, from the viewpoint of uniformly mixing the components and from the viewpoints of preventing the components from being denatured, preferably 20 to 40° C.

Preferably, the production method of the present invention comprises a step 3 of mixing the liquid mixture (ii) and the above radical polymerization initiator (D). By mixing the liquid mixture (ii) and the radical polymerization initiator (D) in the step 3, it is possible to prevent radical polymerization from starting before mixing the components. In the case where a thermal radical polymerization initiator (D-1) and a photoradical polymerization initiator (D-2) are combinedly used, it is preferable that the step 3 is carried out in a dark place, and a photoradical polymerization initiator (D-2) is first added and then a thermal radical polymerization initiator (D-1) is added.

The mixing order of the components other than those used in the steps 1 to 3 is not specifically limited, and may be mixed in any step. However, from the viewpoint that the components could be uniformly mixed prior to the start of radical polymerization, the components ua mixed preferably in any of the step 1 or the step 2.

The radical-polymerizable resin composition of the present invention can also be produced according to any other method than the above-mentioned production method of the present invention, but the composition is preferably produced according to the production method of the present invention since a uniform composition could not be obtained in the other methods.

The radical-polymerizable resin composition of the present invention is preferably used as a curing agent not only in a dry state but also in water or seawater or in a wet state. The radical-polymerizable resin composition of the present invention can be cured not only in a dry state but also in water or seawater or in a wet state.

Curing Method for Radical-Polymerizable Resin Composition

The radical-polymerizable resin composition of the present invention is cured on any of the surface of a substrate in a dry state, the surface of a substrate in water, the surface of a substrate in seawater, or the surface of a substrate in a wet state.

In the curing method of the present invention, the radical-polymerizable resin composition of the present invention may be cured on any of a substrate in a dry state, in water, in seawater or in a wet state, and for example, the radical-polymerizable resin composition prepared by mixing the components may be dropped into water, and as needed, after arranging its shape with a trowel or the like, it is cured by leaving to stand for 1 min to 50 h.

According to the curing method for the radical-polymerizable resin composition of the present invention, a cured product can be obtained easily and rapidly. The composition is effective for use in a dry state, and particularly effective for use on a submerged concrete surface in a brackish water region, in a seawater region or in a river region, and can be used as a repairing material.

The material of the substrate includes concrete, asphalt concrete, mortar, bricks, wood, metal, and in addition to these, thermosetting resins such as phenolic resins, epoxy resins, melamine resins, urea resins, unsaturated polyester resins, vinyl ester resins, alkyd resins, polyurethanes, polyimides, etc.; and thermoplastic resins such as polyethylenes, polypropylenes, polyvinyl chlorides, polystyrenes, polyvinyl acetates, polyurethanes, Teflon (registered trademark), ABS resins, AS resins, acrylic resins, etc.

In addition, the radical-polymerizable resin composition of the present invention can be used as a resin composition for so-called "primer treatment," i.e., the composition may be applied to the surface of a concrete structure before repairing, thereby forming a cured layer on the surface. In this case, the coating amount of the composition as a primer may be 20 to 800 g/m$^2$, preferably 30 to 300 g/m$^2$. The coating method may be any known methods using a brush, a roll, a spray gun, a spatula, etc.

Further, in the case where the radical-polymerizable resin composition is used as a primer, various types of resin composition may be applied onto the primer layer to form a multilayer structure having multiple functions.

Further, the radical-polymerizable resin composition of the present invention may also be used as a lining agent or a surface-finishing agent for the purpose of improving weather resistance, waterproofness, fouling resistance, repellency, heat insulation and the like of the repaired surface, and for plating the surface.

In the case where the radical-polymerizable resin composition of the present invention is required to adhere rapidly, for example, within about 6 h especially in a wet state or in water, an extremely strong rapid-curing resin composition that can complete the polymerization rapidly must be used for the purpose of finishing the curing quickly.

In the case where such a strong rapid-curing radical-polymerizable resin composition is used, it is preferable that a strong polymerization inhibitor or curing retardant is used along with the composition for the purpose of securing enough working time for the worker. Further, it is preferable that the water existing on the surface of a structure is temporarily absorbed into the resin by using wax, a wetting dispersant, a surfactant, a polyisocyanate compound or the like. With that, for example, the working time for repairing structures around railways or in tunnels can be extremely shortened, for example, within about 6 h from the last train to the first train. In addition, for the structures at piers and harbor facilities, ultra-short working time would be possible, for example, within about 6 h from low tide to high tide.

For example, in the case where the radical-polymerizable resin composition of the present invention is required to adhere to a structure within a short period of time of about 12 h under the condition of an outside temperature of 5° C., especially in a wet state or in water, a method wherein an extremely strong rapid-curing resin composition containing an increased amount of the radical initiator is used to cure the composition quickly is preferred. According to this method, for example, various structures may be repaired or repaired temporary under the water existing condition in the off-season in winter.

In the case where the radical-polymerizable resin composition of the present invention comprises a photoradical polymerization initiator (D-2), the radical-polymerizable resin composition is applied to a substrate and then photocured, or the radical-polymerizable resin composition is pre-polymerized to prepare a sheet (B-stage or prepreg formation) and then the sheet is photocured on a substrate.

The light source may be any one having a spectral distribution in a photosensitive wavelength range of the photoradical polymerization initiator (D-2), and examples thereof include sunlight, UV lamp, near-IR lamp, sodium lamp, halogen lamp, fluorescent lamp, metal halide lamp, LED, etc. In case of using two or more kinds of photoradical polymerization initiators (D-2), the wavelength for prepolymerization and polymerization can be changed by using a wavelength cut filter to the light source or using a specific wavelength of LED. The wavelength for prepolymerization is preferably a long wavelength having a low energy level, and in particular, near-IR light is preferred for easy control of the degree of polymerization. In the present invention, UV light (UV ray) indicates a light of 280 to 380 nm; visible light (visible ray) indicates a light of 380 nm to 780 nm; and near-IR light (near-IR ray) indicates a light of 780 to 1,200 nm. The irradiation time with lamp necessary for prepolymerization may vary depending on the effective wavelength range of the light source, the output thereof, the irradiation distance, the thickness of the composition and others, and therefore could not be specifically defined, but, for example, the irradiation time may be 0.01 h or more, preferably 0.05 h or more.

A specific example of using a photoradical polymerization initiator (D-2) is a radical-polymerizable resin composition comprising a visible ray radical polymerization initiator and a near-IR ray radical polymerization initiator. This composition is impregnated into a vinylon mesh or a vinylon mat and layered to produce a sheet sandwiched between films. The sheet is irradiated with near-IR ray for prepolymerization, and thus a visible ray-curable prepreg sheet in which the visible ray radical polymerization initiator and the radical-polymerizable compound remain is produced, which can be used as a photocurable material. The photocurable prepreg sheet can be rapidly cured by the irradiation with a light sensitive to the remaining visible ray radical polymerization initiator.

In using the prepreg sheet, the substrate surface may be treated with a primer, or the space between the prepreg sheets may be filled up with putty. The sheets may be independently photocured in each step or the sheets may applied on a substrate at the same time and then photocured simultaneously. Plural prepreg sheets may be layered. In the case where plural prepreg sheets are layered, the lower prepreg sheet may be processed by sanding treatment or primer treatment. When the lower prepreg sheet is uncured, another prepreg sheet may be layered thereon with not treatment.

Preferred use of the radical-polymerizable resin composition of the present invention as a repairing material for inorganic structure, a radical-polymerizable coating composition, a curable material for prevention of concrete spalling, and a reinforcing fiber-containing composite material is described below. The details mentioned above with respect to the radical-polymerizable resin composition (examples of the components, content of each component, etc.) apply to the above use.

(II) Repairing Material for Inorganic Structures

The repairing material for inorganic structures of the present invention comprises a radical-polymerizable resin composition that comprises one or more metal-containing compounds (A) selected from a metal soap (A1) and a β-diketone skeleton-containing metal complex (A2), one or more thiol compounds (B) selected from a secondary thiol compound (B1) and a tertiary thiol compound (B2), and a radical-polymerizable compound (C), and can stably cure not only on a dry repair part in air but also on a repair part in a wet state or in water. In the present invention, "inorganic structure" means a structure formed of an inorganic compound such as cement, mortar or the like.

For rapidly curing even in a wet condition or in water, the content of the metal-containing compound (A) in the repairing material for inorganic structure, which is based on the material component, is preferably 0.005 to 3 parts by mass to 100 parts by mass of the radical-polymerizable compound (C), more preferably 0.01 to 2 parts by mass, even more preferably 0.015 to 1 part by mass, still more preferably 0.02 to 0.8 parts by mass, further more preferably 0.025 to 0.6 parts by mass.

The metal elements in the metal soap (A1) for the repairing material for inorganic structure are preferably zirconium, barium, vanadium, manganese, iron, cobalt, copper, titanium, bismuth, calcium, lead, tin and zinc, more preferably zirconium, manganese, iron, cobalt, copper, titanium, bismuth, calcium, lead, tin and zinc, and even more preferably zirconium, bismuth and calcium.

In accordance with the use method and the use mode for the repairing material for inorganic structure, the metal element in the metal soap (A1) may be a metal element selected from Groups 2 to 12 metal elements, preferably from barium, vanadium, manganese, iron, cobalt, copper, titanium and zinc, more preferably from manganese, iron, cobalt, copper, titanium and zinc, even more preferably from manganese, cobalt and titanium.

As the metal soap (A1), zirconium octylate, manganese octylate, cobalt octylate, bismuth octylate, calcium octylate, zinc octylate, vanadium octylate, lead octylate, tin octylate, cobalt naphthenate, copper naphthenate, barium naphthenate, bismuth naphthenate, calcium naphthenate, lead naphthenate, and tin naphthenate are preferred; and zirconium octylate, manganese octylate, cobalt octylate, bismuth octylate, calcium octylate, lead octylate, tin octylate, bismuth naphthenate, calcium naphthenate, lead naphthenate, and tin naphthenate are more preferred.

Depending on the use method and the use mode for the repairing material for inorganic structure, the metal soap may be selected preferably from manganese octylate, cobalt octylate, zinc octylate, vanadium octylate, cobalt naphthenate, copper naphthenate, and barium naphthenate, more preferably from manganese octylate, cobalt octylate and cobalt naphthenate.

As the metal complex (A2), vanadium acetylacetonate, cobalt acetylacetonate, titanium acetylacetonate, titanium dibutoxybis(acetylacetonate), iron acetylacetonate, and cobalt ethyl acetoacetate are preferred, and above all, titanium acetylacetonate and titanium dibutoxybis(acetylacetonate) are more preferred.

The total amount of the thiol compound (B) in the repairing material for inorganic structure of the present invention is preferably 0.01 to 10 parts by mass to 100 parts by mass of the radical-polymerizable compound (C), more preferably 0.1 to 7 parts by mass, even more preferably 0.1 to 5 parts by mass, still more preferably 0.2 to 4 parts by mass. When the amount of the thiol compound (B) is 0.01 parts by mass or more, the curing function of the material is satisfactory, and when 10 parts by mass or less, rapid curing is realized.

The molar ratio of the thiol compound (B) to the metal component in the metal-containing compound (A), (B)/(A), is preferably 0.5 to 15, more preferably 1 to 12, even more preferably 1.5 to 10, and further more preferably 2 to 9. When the molar ratio (B)/(A) is 0.5 or more, the thiol compound sufficiently coordinates around the metal of the metal soap (A1) and the β-diketone skeleton-containing metal complex (A2). When the molar ratio is 15 or less, the balance between production cost and performance is better.

The thiol compounds (B) may be used singly or in combination of two or more. In the case where the secondary thiol compound (B1) and the tertiary thiol compound (B2) are combinedly used, the molar ratio of (B1)/(B2) is preferably 0.001 to 1000, more preferably 1 to 10.

In the case where the repairing material for inorganic structure of the present invention is used on a surface that is repeatedly submerged and dried depending on the tide or on a wetted or submerged repairing part of an inorganic structure, the radical-polymerizable compound (C) is preferably one or more selected from the vinyl ester resins, the unsaturated polyester resins and the radical-polymerizable unsaturated monomers, each mentioned above. In the case where plural kinds of radical-polymerizable unsaturated monomers are used, at least one of the radical-polymerizable unsaturated monomers is preferably hydrophilic or water-soluble.

These compounds may reduce the waterproofness of a cured product of the repairing material for inorganic structure, but when used in a suitable amount, an exceptionally good penetrability is obtained particularly to parts to be repaired of a wetted or submerged inorganic structures.

In the case where these compounds are used, for example, biodegradable compounds such as 2-hydroxyethyl (meth)

acrylate are preferably used so as not to cause any negative influence on the environment even when dissolved out in water.

In the case where the radical-polymerizable compound (C) comprises styrene as a radical-polymerizable unsaturated monomer, the styrene content in the radical-polymerizable compound (C) is preferably 60% by mass or less, more preferably 50% by mass or less, even more preferably 20% by mass or less, still more preferably 5% by mass or less. When the styrene content increases, styrene may dissolve out in water and the cured product of the repairing material for inorganic structure may become brittle. Consequently, in the case where the repairing material is used for submerged parts of an inorganic structure, it is not preferable to use styrene. However, in use in air, styrene may be used.

The radical-polymerizable compound (C) may be adequately selected from the compounds exemplified above in accordance with the intended use and performance of the repairing material for inorganic structure of the present invention. For example, when used as a crack injection material, a water sealant, an anchor bolt or the like, the repairing material for inorganic structure is injected into gaps and cured therein to form massive matters. The massive matters are much subjected to shrinking caused by curing and the environmental change after curing, this causing the spalling of the repairing material or, in some cases, the break of the repaired part. Consequently, in these uses, the radical-polymerizable compound (C) is preferably selected from those which shrink slightly, excellent in tensile characteristics and can readily follow the shape of the repaired part.

When used for repairing a cross section by applying the repairing material for inorganic structure thereto to form a coating film, the coating film would be hardly influenced by curing shrinkage or shrinkage caused by the environmental change after curing. Therefore, in this case, the adhesion power to the repaired part is important.

The content of the radical-polymerizable compound (C) in the radical-polymerizable resin composition for the repairing material for inorganic structure of the present invention is preferably 10 to 99.9% by mass, more preferably 15 to 80% by mass, even more preferably 20 to 60% by mass, still more preferably 25 to 40% by mass. When the content of the radical-polymerizable compound (C) in the radical-polymerizable resin composition falls within the range, the cured product can have a more increased hardness.

The details of the metal-containing compound (A), the thiol compound (B) and the radical-polymerizable compound (C) constituting the repairing material for inorganic structure are as described in the section of "(A) Radical-Polymerizable Resin Composition", and are omitted here for conciseness.

Preferably, the repairing material for inorganic structure of the present invention comprise the above radical polymerization initiator (D). The content thereof is preferably 0.1 to 10 parts by mass to 100 parts by mass of the radical-polymerizable compound (C), more preferably 0.5 to 8 parts by mass, even more preferably 0.5 to 5 parts by mass.

The repairing material for inorganic structure of the present invention may comprise the above curing accelerator (E). However, as mentioned above, it is preferable that the repairing material for inorganic structure of the present invention does not comprise the curing accelerator (E) when the material is used on a wetted or submerged repairing part.

The repairing material for inorganic structure of the present invention may comprise the above filler (F). The amount thereof is preferably 10 to 500 parts by mass to 100 parts by mass of the radical-polymerizable compound (C). When the amount of the filler (F) falls within the range, the water remaining inside can be fully removed. However, when the amount is more than the range, it may detract from operability for injection or the like. In particular, in the case where the repairing material for inorganic structure is used as a section repairing material, the content of the filler (F) is preferably 10 to 700 parts by mass to 100 parts by mass of the radical-polymerizable compound (C), more preferably 30 to 600 parts by mass.

The details of the radical polymerization initiator (D), the curing accelerator (E) and the filler (F) that may be optionally contained in the repairing material for inorganic structure of the present invention are as described in the section of "(A) Radical-Polymerizable Resin Composition", and are omitted here for conciseness.

The repairing material for inorganic structure of the present invention may comprise the above-mentioned polymerization inhibitor and curing retardant. The amount of each is preferably 0.0001 to 10 parts by mass to 100 parts by mass of the radical-polymerizable compound (C). Further, the repairing material for inorganic structure of the present invention may comprise any other optional components mentioned above in the amount mentioned above.

Preparation of Repairing Material for Inorganic Structure

The repairing material for inorganic structure of the present invention can be prepared according to a method comprising two steps of a step 1 of mixing the metal-containing compound (A) and the radical-polymerizable compound (C) to prepare a liquid mixture (i), and a step 2 of mixing the liquid mixture (i) and the thiol compound (B) to prepare a liquid mixture (ii). By this preparation process, the thiol compound (B) efficiently coordinates around the metal of the metal-containing compound (A).

The details of the preparation method for the repairing material for inorganic structure of the present invention are the same as those described above in the section of the production method for the radical-polymerizable resin composition.

The repairing material for inorganic structure of the present invention can be used in air but is preferably used on a part to be repaired in a wet state or in water. The repairing material for inorganic structure of the present invention can cure on any of repairing parts in a dry state in air or even in a wet state or in water.

The repairing material for inorganic structure of the present invention can be used for both indoor parts and outdoor parts, for example, for repairing parts with concrete surfaces of floors, walls, ceilings, corridors, platforms, stairs and others of houses, factories, station buildings, etc.

The wet parts to be repaired include tunnels, bridges and others of railways, subways, highways, etc. and bridge piers of highways, monorails, etc. Even when these parts are wetted entirely owing to weather environments such as rains, snows, fogs, etc., the repairing material for inorganic structure of the present invention can be used in the same manner as in the case of using for a dry repair part in air.

The repair parts in water include submerged concrete structures, for example, agricultural irrigation channels in farm fields; concrete structures of sluice gate facilities and bridge piers; structures in waterworks systems, sewerage systems, sewage plumbing, lakes, water reservoirs, etc.; and industrial channels and pits. Further, the repairing material for inorganic structure of the present invention can be used favorably in quay, revetment wall, and breakwater in tidal area or brackish water where submerging and drying are repeated by tides; bridge piers, underground tunnels and others of highways, monorails, etc.; offshore airports, landing piers, undersea facilities and others.

Inorganic Structure Repairing Method

The repairing material for inorganic structure of the present invention can be used especially as a section repairing material, a crack injection material, a water sealant, an anchor bolt, etc.

The method for repairing inorganic structure of the present invention is a method of applying the repairing material for inorganic structure to the part to be repaired to form a coating film thereon, followed by curing the coating film.

In addition, the method for repairing inorganic structure of the present invention is a method of injecting the repairing material for inorganic structure into voids having formed in a part to be repaired to fill up the voids, followed by curing the material therein.

In the present invention, the part to be repaired includes not only voids such as cracks and the like but also surfaces to be repaired.

In the present invention, the repairing method is not limited depending on the use as a section repairing material, a crack injection material, a water sealant, an anchor bolt or the like. When using as a section repairing material, a method where the repairing material for inorganic structure is applied onto the part to be repaired to form a coating film thereon and the coating film is then cured is preferred. When using as a crack injection material, a water sealant or an anchor bolt, a method where the repairing material for inorganic structure is injected into the voids formed in the part to be repaired and then cured therein is preferred.

The material of the part to be repaired includes concrete, asphalt concrete, mortar, wood, metal, thermosetting resins such as phenolic resins, epoxy resins, melamine resins, urea resins, unsaturated polyester resins, vinyl ester resins, alkyd resins, polyurethanes, polyimides, etc., and thermosetting resins such as polyethylenes, polypropylenes, polyvinyl chlorides, polystyrenes, polyvinyl acetates, polyurethanes, Teflon (registered trademark), ABS resins, AS resins, acrylic resins, etc.

The injection method, the coating method and the curing method for the repairing material for inorganic structure of the present invention are not specifically limited. For example, the repairing material for inorganic structure is injected into the voids of a wet part to be repaired or applied onto the surface of the part to be repaired, and after optionally arranging its shape with a trowel or the like, the material is left to sat and for about 30 sec to 50 h for curing.

Using the repairing material for inorganic structure of the present invention, a cured product can be formed easily and rapidly, and therefore the material is favorably used on a dry part to be repaired in air, in a wet state or in water, especially on a concrete surface around the foreshore or submerged in water.

In the method for repairing inorganic structure of the present invention, the part to be repaired may be previously treated with a primer before the repairing material for inorganic structure is injected or applied thereto. In this description, "primer treatment" means a treatment of injecting or applying a primer material to the part to be repaired before the part is coated with the repairing material for inorganic structure, thereby forming a cured layer of the primer material on the part.

The primer treatment applicable to the present invention is not specifically limited, and a method of applying a known primer material to the necessary part with a roller, a brush or the like is employable.

Specific examples of primer include Ripoxy (registered trademark) R-806DA (manufactured by Showa Denko K.K.). In addition, resins C-1 to C-5 to be mentioned in Examples below are also usable.

In the method for repairing inorganic structure of the present invention, the method of injecting or applying the repairing material for inorganic structure is not specifically limited. For example, an injection or coating method using a spray, an injection or coating method using a roller, an injection or coating method using a plasterer's trowel, or an injection or coating method using a tool such as a brush, spatula or the like is employable.

(III) Radical-Polymerizable Coating Composition

The radical-polymerizable coating composition of the present invention (hereinafter this may be simply referred to as "coating composition") comprises a radical-polymerizable resin composition comprising a metal soap (A1), one or more thiol compounds (B) selected from a secondary thiol compound (B1) and a tertiary thiol compound (B2), and a radical-polymerizable compound (C), and can be stably cured on a dry substrate in air and also even on a wet substrate in water or seawater.

Since the coating composition can rapidly cure even in water or in a wet atmosphere, the content of the metal soap (A1) in the coating material, which is based on the metal, is preferably 0.001 to 3 parts by mass to 100 parts by mass of the radical-polymerizable compound (C), more preferably 0.002 to 2 parts by mass, even more preferably 0.003 to 1 part by mass, still more preferably 0.02 to 0.8 parts by mass, and further more preferably 0.04 to 0.8 parts by mass.

The metal element of the metal soap (A1) in the coating composition is preferably zirconium, barium, vanadium, manganese, iron, cobalt, copper, titanium, bismuth, calcium, lead, tin and zinc, more preferably zirconium, manganese, iron, cobalt, copper, titanium, bismuth, calcium, lead, tin and zinc, and even more preferably zirconium, bismuth and calcium.

Depending on the use method and the use mode for the coating composition, the metal element of the metal soap (A1) may be a metal element selected from Group 2 to 12 metal elements, preferably from barium, vanadium, manganese, iron, cobalt, copper, titanium and zinc, more preferably from manganese, iron, cobalt, copper, titanium and zinc, and even more preferably from manganese, cobalt and titanium.

Specifically, the metal soap (A1) is preferably zirconium octylate, manganese octylate, cobalt octylate, bismuth octylate, calcium octylate, zinc octylate, vanadium octylate, lead octylate, tin octylate, cobalt naphthenate, copper naphthenate, barium naphthenate, bismuth naphthenate, calcium naphthenate, lead naphthenate, and tin naphthenate, more preferably zirconium octylate, manganese octylate, cobalt octylate, bismuth octylate, calcium octylate, lead octylate, tin octylate, bismuth naphthenate, calcium naphthenate, lead naphthenate, and tin naphthenate.

Also depending on the use method and the use mode of the coating composition, the metal soap may be preferably selected from manganese octylate, cobalt octylate, zinc octylate, vanadium octylate, cobalt naphthenate, copper naphthenate, and barium naphthenate, more preferably manganese octylate, cobalt octylate and cobalt naphthenate.

The total content of the thiol compound (B) in the radical-polymerizable coating composition of the present invention is preferably 0.01 to 10 parts by mass to 100 parts by mass of the radical-polymerizable compound (C), more preferably 0.1 to 7 parts by mass, even more preferably 0.1 to 5 parts by mass, still more preferably 0.2 to 4 parts by mass. When the amount of the thiol compound (B) is 0.01 parts by mass or more, the curing function can be sufficiently secured, and when 10 parts by mass or less, rapid curing is realized.

The molar ratio of the thiol compound (B) to the metal component in the metal soap (A1), (B)/(A1), is preferably 0.1 to 15, more preferably 0.3 to 10, even more preferably 0.6 to 8, still more preferably 0.8 to 5. When the molar ratio (B)/(A1) is 0.1 or more, the thiol compound sufficiently coordinates around the metal of the metal soap (A1), and when the molar ratio is 15 or less, the balance between production cost and performance is good.

The thiol compounds (B) may be used singly or in combination of two or more. In the case where a secondary thiol compound (B1) and a tertiary thiol compound (B2) are combinedly used, the molar ratio (B1)/(B2) is preferably 0.001 to 1000, more preferably 1 to 10.

The content of the radical-polymerizable compound (C) in the radical-polymerizable coating composition of the present invention is preferably 80 to 99.9% by mass, more preferably 85 to 99.5% by mass, even more preferably 90 to 99.5% by mass. When the content of the radical-polymerizable compound (C) in the radical-polymerizable coating composition falls within the above range, the hardness of the cured product can increase further more.

The details of the metal soap (A1), the thiol compound (B) and the radical-polymerizable compound (C) for the radical-polymerizable coating composition are as described in the section of "(A) Radical-Polymerizable Resin Composition", and are omitted here for simplification.

The radical-polymerizable coating composition of the present invention may comprise, in addition to the above components, one or more selected from the above polymerization inhibitor, curing retardant, coupling agent, polyisocyanate compound, curing catalyst, surfactant, wetting dispersant, wax and thixotropic agent, each in the amount mentioned above. Further, the composition may comprise one or more selected from a colorant (pigment, etc.), a decorating material (sand, silica sand, color sand, beads, color chips, mineral chips, glass chips, wood chips, color beads, etc.), a filming aid, a surface improver, a preservative, an antifungal agent, a defoaming agent, a light stabilizer, an ultraviolet absorbent, an antioxidant, and a pH conditioner.

Ultraviolet Absorbent

The radical-polymerizable coating composition of the present invention may comprise an ultraviolet absorbent. Any known ultraviolet absorbent is usable, including benzotriazoles such as 2-(2'-hydroxy-5'-methylphenyl)benzotriazole, etc.; benzophenones such as 2,4-dihydroxybenzophenone, etc.; and benzoates, etc. Further, hindered amines are also usable. The amount of the ultraviolet absorbent to be added is preferably 0.01 to 5 parts by mass to 100 parts by mass of the radical-polymerizable coating composition.

Colorant

The radical-polymerizable coating composition of the present invention may comprise a colorant. Any of pigments and dyes are usable as the colorant, but pigments are preferably used.

Not specifically limited, the pigments may be any known color pigments, extender pigments, rustproof pigments, etc. Depending on the shape, pigments are classified into spherical, acicular or fibrous pigments, but generally classified in accordance with the difference in the aspect ratio, that is, the ratio of major diameter/minor diameter of each particle.

The pigments are not specifically limited, and examples thereof include organic color pigments such as azo chelate pigments, insoluble azo pigments, condensed azo pigments, monoazo pigments, disazo pigments, diketopyrrolopyrrole pigments, benzimidazolone pigments, phthalocyanine pigments, indigo pigments, thioindigo pigments, perinone pigments, perylene pigments, dioxane pigments, quinacridone pigments, isoindolinone pigments, naphthol pigments, pyrazolone pigments, anthraquinone pigments, anthrapyrimidine pigments, metal complex pigments, etc.; inorganic color pigments such as chrome yellow, yellow iron oxide, chromium oxide, molybdate orange, red iron oxide, titanium yellow, zinc oxide, carbon black, titanium dioxide, cobalt green, phthalocyanine green, ultramarine, cobalt blue, phthalocyanine blue, cobalt violet, etc.; mica pigments (titanium dioxide-coated mica, color mica, metal-plated mica); graphite pigments, alumina flake pigments, titanium metal flakes, stainless flakes, micacious iron oxide, phthalocyanine flakes, metal-plated glass flakes, and other color or chromatic flat pigments; extender pigments such as titanium oxide, calcium carbonate, magnesium carbonate, barium sulfate, barium carbonate, magnesium silicate, clay, talc, silica, potassium feldspar, kaolin, fired kaolin, bentonite, etc.

In addition, rustproof pigments such as zinc powders, zinc alloy powders, zinc phosphate compounds, calcium phosphate compounds, aluminum phosphate compounds, magnesium phosphate compounds, zinc phosphite compounds, calcium phosphite compounds, aluminum phosphite compounds, strontium phosphite compounds, aluminum tripolyphosphate compounds, molybdate compounds, zinc cyanamide compounds, borate compounds, nitro compounds, composite oxides and others may also be used.

These pigments may be used singly or in combination of two or more. In addition, color pigments, extender pigments and rustproof pigments may be combinedly used in any desired manner.

In the case where the radical-polymerizable coating composition comprises a pigment, the content of the pigment to the solid content of the coating composition preferably falls within a range of 5 to 70% by mass. When the pigment content is 5% by mass or more, the composition is excellent in ground masking performance. When the pigment content is 70% by mass or less, the composition is excellent in weather resistance. The pigment content is preferably 20 to 45% by mass. The solid content of the coating composition means the component that has remained when the volatile component such as solvent and others have been removed from the coating composition.

Preferably, the pigment content is adequately changed depending on the color, the object and the thickness of the coating composition. If light transmission is required to be shielded or the ground color is required to be masked, the addition of a small amount of a black pigment is sufficient, but a yellow or orange pigment is needed to be added in a larger amount as compared with the black pigment.

Among the above pigments, when an acicular pigment is used, the mechanical strength such as the cracking resistance and the impact resistance of the coating film can be improved.

Examples of the acicular pigment include wollastonite, sepiolite, chrysotile, amosite, tremolite, zeolite, etc. From the viewpoint of enhancing the strength the durability and the waterproofness of the cured product, wollastonite is preferred.

As wollastonite, commercial products may be used. Specifically, NYAD325 (trade name, manufactured by NYCO Mineral Corporation, wollastonite) is usable.

In the case where an acicular pigment is incorporated in the radical-polymerizable coating composition of the present invention, the content of the acicular pigment is preferably 0.1 to 70% by mass to the solid content of the radical-polymerizable coating composition, more preferably 0.1 to 50% by mass, even more preferably 0.1 to 10% by mass.

Using a hollow spherical pigment as the pigment is advantageous in that the coating film can be light weight and is resistant to sagging. In addition, the pigment realizes heat-shielding and heat-insulating effects.

Examples of the hollow spherical pigment include pearlite, fly ash, resin hollow balloons, etc., and hollow spherical particles of pearlite and the like are preferred.

Here, the hollow spherical pigment means that the inside thereof is not solid but completely or incompletely hollow, and the hollow space confines a vapor such as air or the like having a low heat conductivity or is in vacuum or under a reduced pressure. Examples of the hollow spherical pigment usable here include ceramic balloons and plastic balloons, and ceramic balloons are more preferred as usable at high temperatures.

Ceramic balloons include borosilicate glass balloons, silica balloons, shirasu balloons, fly ash balloons, zirconia balloons, alumina silicate balloons, fired vermiculite balloons, pearlite balloons, etc. From the viewpoint of the strength of the surface of the coating film to be formed, pearlite balloons are preferred.

As pearlite balloons, those having a mean particle size of 3 to 100 μm and having a mean specific gravity of 0.2 to 0.8 are preferably used. Commercial products of pearlite balloons may be used, and specifically, Onyxell ON4150 (trade name, manufactured by KD Ceratech Corporation) is usable.

In the case where a hollow spherical pigment is incorporated in the radical-polymerizable coating composition of the present invention, the content of the hollow spherical pigment is preferably 0.1 to 70% by mass in the radical-polymerizable coating composition, more preferably 0.1 to 30% by mass, even more preferably 0.1 to 10% by mass.

The surface of the acicular pigment and the hollow spherical pigment may be processed for various surface treatments, for example, surface tension reducing treatment with a silicone compound or a fluorine compound.

For improving the dispersibility of pigment, the radical-polymerizable coating composition of the present invention may comprise a pigment dispersant, a leveling agent, a sagging inhibitor, a defoaming agent, etc. These are not specifically limited, and may be adequately selected from those known in the art.

The radical-polymerizable coating composition of the present invention can be used without adding a colorant. In the case where substantially no colorant including a pigment is used, the composition can be used as a clear coating material such as varnish, etc.

The clear coating material means a coating composition containing substantially no colorant, and "substantially no colorant" means that the amount of a colorant in the solid component of the coating composition is 1% by mass or less, preferably 0.5% by mass or less, more preferably 0.1% by mass or less.

Two-Component Curable Coating Composition

The radical-polymerizable coating composition of the present invention is preferably a two-component curable coating composition, and in particular, in the case where the radical-polymerizable coating composition comprises a radical polymerization initiator, the composition is preferably a two-component curable coating composition which comprise a base component and a curing agent, wherein the base component comprises the metal soap (A1), the thiol compound (B) and the radical-polymerizable compound (C) and the curing agent comprises the radical polymerization initiator (D).

In addition, it is preferable that the base component comprises a radical polymerization inhibitor for preventing any undesirable polymerization reaction.

Other ingredients than the above (A1) to (D) and the radical polymerization inhibitor may be contained in any of the base component and the curing agent, but it is preferable that the other additives are adequately selected so as to avoid undesirable curing.

Production Method for Radical-Polymerizable Coating Composition

The production method for the radical-polymerizable coating composition of the present invention comprises two steps of a step 1 of mixing the metal soap (A1) and the radical-polymerizable compound (C) to prepare a liquid mixture (i), and a step 2 of mixing the liquid mixture (i) and the thiol compound (B) to prepare a liquid mixture (ii).

When the radical-polymerizable coating composition of the present invention is produced according to the above method, the thiol compound (B) efficiently coordinates around the metal of the metal soap (A1).

The mixing method in each step is not specifically limited and may be carried out in any known manner. The temperature in mixing is, from the viewpoint of realizing uniform mixing and from the viewpoint of preventing the components from denaturing, preferably 20 to 40° C.

Preferably, the production method of the present invention comprises a step 3 of mixing the liquid mixture (ii) and the radical polymerization initiator (D). By mixing the liquid mixture (ii) and the radical polymerization initiator (D) in the step 3, it is possible to prevent radical polymerization from starting before mixing the components.

The mixing order of the other components than those used in the steps 1 to 3 is not specifically limited and may be mixed in any step. However, from the viewpoint that the components could be uniformly mixed prior to the start of radical polymerization, it is preferable that the components are mixed in any of the step 1 or the step 2.

The radical-polymerizable coating composition of the present invention can also be produced according to any other method than the above production method of the present invention, but the composition is preferably produced according to the production method of the present invention since a uniform composition could not be obtained in the other method.

The radical-polymerizable coating composition of the present invention is preferably used for curing not only in a dry state but also in water or seawater or in a wet state. By using the radical-polymerizable coating composition of the present invention, curing can be attained not only in a dry state but also in water, in seawater, or in a wet state.

Curing Method and Use of Radical-Polymerizable Coating Composition

In the curing method for the radical-polymerizable coating composition of the present invention, the radical-polymerizable coating composition is cured on a surface of any of a substrate in a dry state, a substrate in water, a substrate in seawater, and a wet substrate.

The curing method of the present invention is not specifically limited as long as the radical-polymerizable coating composition can be cured on a substrate in a dry state, in water or seawater, or in a wet state. In the curing method, the coating composition is preferably in the form applicable to a substrate.

The radical-polymerizable coating composition of the present invention is applied onto a substrate by a method selected from any known methods using a roller, a brush, a spray, a spatula or the like, although not specifically limited thereto.

After the radical-polymerizable coating composition prepared by mixing the components is applied to a substrate, the composition is cured by leaving to stand for one minute to 50 h.

According to the curing method for the radical-polymerizable coating composition of the present invention, a cured product can be obtained easily and rapidly, and therefore, the method is effective not only in a dry state but also useful in a wet state.

The coating composition of the present invention is excellent in adhesion to wet surfaces of inorganic structures and can be applied by a simple method of a roller coating or a brush coating. Accordingly, the composition is usable in the places where coating in a wet condition is necessary, for example, for inorganic structures in the area of shores, river sides, lakes and the like and for outdoor structures in rainy weather, etc.

In addition, the coating composition of the present invention is excellent also in adhesion to various coating materials and sealing materials, and therefore can be used as primers or top coating materials. Further, when applied to the surface of an inorganic structure and cured thereon, the coating composition exhibits a certain level of strength rapidly even in a wet condition, and therefore can be used for repairing and reinforcing inorganic structures.

When a large amount of silica sand is incorporated in the coating composition of the present invention, the composition can be preferably used as a resin mortar.

Further, a top coating material may be applied onto the coating film of the coating composition of the present invention, thereby forming a top coating film thereon. In particular, in the case where a long-term weather resistance or a good appearance (color appearance) is needed, a fluororesin-based or urethane-based top coating material is preferably used.

Substrate to be Applied

The substrate to which the radical-polymerizable coating composition of the present invention is applied is not specifically limited, and examples thereof include metal substrates of iron, stainless, surface-treated ones thereof, etc.; cement substrates of gypsum, etc.; concrete, asphalt concrete, mortar, bricks, glass, rubber, wood, etc.; plastic substrates of thermosetting resins such as phenolic resins, epoxy resins, melamine resins, urea resins, unsaturated polyester resins, vinyl ester resins, alkyd resins, polyurethanes, polyimides, etc.; and plastic substrates of thermoplastic resins such as polyethylenes, polypropylenes, polyvinyl chlorides, polystyrenes, polyvinyl acetates, polyurethanes, Teflon (registered trademark), ABS resins, AS resins, acrylic resins, etc.

In addition, the coating composition is applicable to other various types of substrates in industrial fields which are made of the above materials, such as construction materials, building structures, etc. in construction field; car bodies, car parts, etc. in automobile industry; ships, submarines, airplanes, rockets, etc. in transportation vehicles industry; and electric appliances, electronic parts, etc. in the industrial field. In addition, the radical-polymerizable coating composition of the present invention can be used for remodeling the substrates mentioned above.

Further, the radical-polymerizable coating composition of the present invention is excellent in adhesion to wet concrete surfaces, reinforcing rebars, steel plates and rusty surfaces, and is therefore usable as a coating material for various substrates.

The radical-polymerizable coating composition of the present invention may be a top coating composition for forming a top coating layer or may be an undercoating composition for forming an undercoating layer (primer layer), although not specifically limited to one of them.

The top coating composition may be required to have various functions of waterproofness, heat resistance, heat absorbability, heat shielding performance, heat insulation, alkali resistance, acid resistance, solvent resistance, chemical resistance, weather resistance, antireflection performance, light absorbability, etc. The undercoating composition may be required to have functions of wet surface adhesion, adhesion to top coating material, rapid curability, etc. These functions are not necessarily particular to each of the top coating composition and the undercoating composition, and needless to say, the top coating composition may also be required to have wet surface adhesion or may be required to have rapid curability.

The use of the top coating composition is not specifically limited. The radical-polymerizable coating composition of the present invention is preferably used as a top coating composition for repairing old coating films on interior or exterior structures. In particular, in repairing old coating films of exterior structures, the coating composition of the present invention can form a top coating layer even though the old coating films are in a wet state. In addition, using the coating composition of the present invention, it is possible to repair old coating films of interior structures in a wet area such as pools, bath rooms and the like even when the parts to be repaired are in a wet state.

Further, the coating composition of the present invention is preferably used as a finish coating material for interior and exterior structures.

Further, by incorporating a colorant or fibers into the radical-polymerizable coating composition of the present invention, the color and the texture of the cured film can be changed. Such a composition is therefore usable as a decorating composition for various wall panels of concrete, mortar or the like for use on walls of buildings, etc. The cured film of the radical-polymerizable coating composition of the present invention enhances the decorative appearance of wall panels and also works as a surface coating layer of the wall panels to improve scratch resistance and waterproofness thereof.

The radical-polymerizable coating composition of the present invention is preferably used as a coating composition for forming a waterproof layer on concrete members and also as a coating composition for forming an anticorrosive coating film on concrete members, which are applicable to wet concrete members of water storage facilities or structures around waterside, etc.

Further, the radical-polymerizable coating composition of the present invention can be used as a lining material or a surface finishing material for improving weather resistance, waterproofness, fouling resistance, repellency, heat insulation and the like of surfaces to be repaired and for plating surfaces to be repaired.

In the case where the radical-polymerizable coating composition of the present invention is used as a top coating composition, the coating amount is not specifically limited but is preferably 30 to 1,000 $g/m^2$, more preferably 50 to 800 $g/m^2$, even more preferably 70 to 700 $g/m^2$. The coating amount may be adequately controlled depending on the viscosity of the coating material, the solvent content, the curing shrinkage, etc.

The use as the undercoating composition is not specifically limited. For example, the radical-polymerizable coating composition of the present invention can be used as a coating composition for so-called "primer treatment" for forming a cured layer by applying to the surface of a concrete structure before repairing.

The coating amount as a primer is preferably 20 to 800 g/m², more preferably 30 to 300 g/m².

Further, another composition may be applied to the primer layer which is formed of the radical-polymerizable coating composition, thereby forming a multilayered structure having various functions. For example, a known lining material or a known surface-finishing material that is used in a dry condition can be used as an inter-coating agent or a top coating agent, while using the radical-polymerizable coating composition of the present invention as a primer to prevent water from bleeding from a substrate. The lining material or the surface-finishing material that may be combinedly used with the radical-polymerizable coating composition of the present invention is not specifically limited and may be any of those generally used in the art. For example, a vinyl ester lining material, an emulsion coating material or the like is usable.

In the case where the radical-polymerizable coating composition of the present invention is required to be adhered to a substrate rapidly, for example, within about 6 h, especially in a wet state, the curing can be finished quickly preferably by using an extremely strong rapid-curing coating composition in which the polymerization proceeds rapidly from its start and its end.

Such a strong rapid-curing radical-polymerizable coating composition preferably combinedly comprises a strong polymerization inhibitor or a curing retardant to secure enough working time for the worker. Further, it is preferable to confine the water on the surface of a substrate (to be treated) temporarily in the resin by using a wax, a wetting dispersant, a surfactant, a polyisocyanate compound or the like. With this method, for example, the repair work for structures around railways or in tunnels can be finished in an ultra-short period of time of about 6 h from the last train to the first train. In addition, the repair work for structures in piers and harbor facilities can be finished in an ultra-short period of time of about 6 h from low tide to high tide.

In the case where the radical-polymerizable coating composition of the present invention is required to be adhered to a structure rapidly within about 12 h, for example, at an outside temperature of 5° C., and especially in a wet condition, a method of quickly curing an extremely strong rapid-curing coating composition containing an increased amount of the radical initiator is preferred. According to this method, for example, various structures may be repaired or temporary treated under a wet condition in the off-season in winter.

The viscosity of the radical-polymerizable coating composition of the present invention is preferably 1 to 15,000 mPa·s, more preferably 10 to 10,000 mPa·s, even more preferably 20 to 5,000 mPa·s each at 25° C. When the viscosity of the radical-polymerizable coating composition falls within the range, the composition is excellent in coatability.

The viscosity of the radical-polymerizable coating composition is measured according to a Brookfield viscometer method in which the viscosity (25° C.) and the thixotropy index (value calculated by dividing the viscosity at 6 rpm by the viscosity at 60 rpm) of the coating composition are measured according to JIS K 6901 using a B-type (BM) viscometer at 25° C.

(IV) Curable Material for Prevention of Concrete Spalling

The curable material for prevention of concrete spalling of the present invention comprises a radical-polymerizable resin composition that comprises one or more metal-containing compounds (A) selected from a metal soap (A1) and a β-diketone skeleton-containing metal complex (A2), one or more thiol compounds (B) selected from a secondary thiol compound (B1) and a tertiary thiol compound (B2), and a radical-polymerizable compound (C).

The curable material for prevention of concrete spalling of the present invention is applicable to concrete by a simple method of roller coating, brush coating or the like and firmly adheres to concrete to exhibit a certain level of strength not only in a dry condition but also even in a wet condition or in water or seawater. Therefore, the curable material is useful for prevention of concrete spalling.

The content of the metal-containing compound (A) in the curable material for prevention of concrete spalling, which is based on the amount of metal, is preferably 0.001 to 5 parts by mass to 100 parts by mass of the radical-polymerizable compound (C), more preferably 0.002 to 3 parts by mass, even more preferably 0.003 to 2.5 parts by mass, still more preferably 0.004 to 2 parts by mass. When the content of the metal-containing compound (A) falls within the range, the material can rapidly cure even in water or in a wet atmosphere.

The metal element constituting the metal soap (A1) is preferably a Group 2 metal element and Group 3 to 12 metal elements, more preferably zirconium, barium, vanadium, manganese, iron, cobalt, copper, titanium, bismuth, calcium, lead, tin and zinc, and even more preferably zirconium, manganese, iron, cobalt, copper, titanium, bismuth, calcium, lead, tin and zinc. Use of zirconium, bismuth or calcium that may provide colorless transparent cured products is further more preferred since the deterioration of the under coat can be visually inspected from the outside.

Preferred examples of the metal soap (A1) include zirconium octylate, manganese octylate, cobalt octylate, zinc octylate, vanadium octylate, cobalt naphthenate, copper naphthenate, and barium naphthenate, and more preferably zirconium octylate, manganese octylate, cobalt octylate, bismuth octylate, calcium octylate, lead octylate, tin octylate, bismuth naphthenate, calcium naphthenate, lead naphthenate, and tin naphthenate.

Preferred examples of the metal complex (A2) include zirconium acetylacetonate, vanadium acetylacetonate, cobalt acetylacetonate, titanium acetylacetonate, titanium dibutoxybis(acetylacetonate), iron acetylacetonate and cobalt ethyl acetoacetate, and more preferably zirconium acetylacetonate, titanium acetylacetonate and titanium dibutoxybis(acetylacetonate).

The total content of the thiol compound (B) in the curable material for prevention of concrete spalling is preferably 0.01 to 10 parts by mass to 100 parts by mass of the radical-polymerizable compound (C), more preferably 0.1 to 7 parts by mass, even more preferably 0.1 to 5 parts by mass, still more preferably 0.2 to 4 parts by mass. When the amount of the thiol compound (B) is 0.01 parts by mass or more, the curing function can be sufficient, and when 10 parts by mass or less, the material can cure rapidly.

The molar ratio of the thiol compound (B) to the metal component of the metal-containing compound (A), (B)/(A), is preferably 0.5 to 15, more preferably 1 to 12, even more preferably 1.5 to 10, still more preferably 2 to 9. When the molar ratio (B)/(A) is 0.5 or more, the thiol compound can sufficiently coordinate around the metal of the metal soap (A1) and the β-diketone skeleton-containing metal complex (A2), and when the molar ratio is 15 or less, the balance between production cost and performance is good.

The thiol compounds (B) may be used singly or in combination of two or more. In the case where the secondary thiol compound (B1) and the tertiary thiol compound (B2) are combinedly used, the molar ratio thereof, (B1)/(B2), is preferably 0.001 to 1000, more preferably 1 to 10.

The content of the radical-polymerizable compound (C) in the radical-polymerizable coating composition for forming the curable material for prevention of concrete spalling is preferably 80 to 99.9% by mass, more preferably 85 to 99.5% by mass, even more preferably 90 to 99.5% by mass. When the content of the radical-polymerizable compound (C) in the radical-polymerizable resin composition falls within the range, the hardness of the cured product improves further more.

The details of the metal-containing compound (A), the thiol compound (B) and the radical-polymerizable compound (C) are as described in the section of "(A) Radical-Polymerizable Resin Composition" and are omitted here for simplification.

The curable material for prevention of concrete spalling of the present invention may comprise at least one selected from the radical polymerization initiator (D), the curing accelerator (E), the filler (F) and the fiber (G), each mentioned above. In particularly preferably, the material comprises the fiber (G) for enhancing spalling resistance and waterproofness.

The details of the fiber (G) usable in the curable material for prevention of concrete spalling are as described above. Glass fibers and organic fibers are preferred, and in consideration of workability, the fibers are preferably used in the form of cloth, mat, biaxial mesh or triaxial mesh. By using fibers in a biaxial mesh or triaxial mesh form, a curable material for prevention of concrete spalling that is lightweight and economical and is excellent in workability and durability is obtained. By using fibers excellent in transparency such as glass fibers, cellulose fibers or the like, the deterioration of the under coat can be visually inspected from the outside.

The content of the radical polymerization initiator (D) is preferably 0.1 to 10 parts by mass to 100 parts by mass of the radical-polymerizable compound (C), more preferably 0.5 to 8 parts by mass, even more preferably 0.5 to 5 parts by mass.

As described above, when the curable material for prevention of concrete spalling of the present invention is used in a wet place or a submerged place, the curing accelerator (E) is preferably not used in the material.

The content of the filler (F) is preferably 0.1 to 500 parts by mass to 100 parts by mass of the radical-polymerizable compound (C), more preferably 1 to 500 parts by mass.

The content of the fiber (G) is preferably 0.1 to 100% by mass of the radical-polymerizable resin composition, more preferably 1 to 75% by mass, even more preferably 2 to 50% by mass.

The details of the radical polymerization initiator (D), the curing accelerator (E), the filler (F) and the fiber (G) are as described in the section of "(A) Radical-Polymerizable Resin Composition" and are omitted here for simplification.

Further, the curable material for prevention of concrete spalling of the present invention may comprise any of the other optional components in the amount as described above.

Preparation of Curable Material for Prevention of Concrete Spalling

The curable material for prevention of concrete spalling of the present invention can be prepared by a method comprising two steps: a step 1 of mixing the metal-containing compound (A) and the radical-polymerizable compound (C) to prepare a liquid mixture (i), and a step 2 of mixing the liquid mixture (i) and the thiol compound (B) to prepare a liquid mixture (ii). By this preparation method, the thiol compound (B) can efficiently coordinate around the metal of the metal-containing compound (A).

The details of the preparation method for the curable material for prevention of concrete spalling of the present invention are as described above with respect to the production method for the radical-polymerizable resin composition.

Method for Prevention of Concrete Spalling

The method for preventing concrete spalling of the present invention comprises a step of applying the curable material for prevention of concrete spalling onto the surface of concrete to form a coating film thereon and curing the coating film. The curable material for prevention of concrete spalling of the present invention can be applied by a simple method of roller coating, brush coating or the like, and the cured film exhibits excellent adhesion to concrete and a sufficient strength necessary for preventing the spalling not only in a dry condition but also on a wet surface.

In the case where the curable material for prevention of concrete spalling comprises the fiber (G), the performance of preventing concrete spalling is enhanced. The curable material for prevention of concrete spalling comprising the fiber (G) may be in any form, for example, a curable coating film formed by applying the radical-polymerizable resin composition of the present invention onto a surface of concrete, putting a mesh and/or fibrous structure thereon, and then applying the radical-polymerizable resin composition thereon; an impregnated article produced by impregnating the radical-polymerizable resin composition into the overlaid mesh or fibrous structure; or a prepreg sheet formed by prepolymerizing the impregnated article.

The method for preventing concrete spalling of the present invention using the fiber (G) comprises a step of preparing a curable material for prevention of concrete spalling by impregnating the radical-polymerizable resin composition into a mesh or fibrous structure, a step of sticking the curable material for prevention of concrete spalling to a surface of concrete that has been optionally treated with a primer, and a step of curing the curable material. The mesh or fibrous structure impregnated with the radical-polymerizable resin composition may be a prepreg sheet.

Another method for preventing concrete spalling comprises a step of applying the radical-polymerizable resin composition onto a surface of concrete that has been optionally treated with a primer, a step of sticking a mesh and/or fibrous structure thereon, a step of further applying the radical-polymerizable resin composition thereon to form a curable material for preventing concrete spalling, and a step of curing the curable material.

The primer may be any known curable resin or the radical-polymerizable resin composition of the present invention. The curing method is as described above with respect to the radical-polymerizable resin composition.

A damaged concrete structure can be fully repaired by the following repairing method which comprises a step of directly or indirectly applying the radical-polymerizable resin composition, the repairing material for inorganic structure, the radical-polymerizable coating composition or the curing material for prevention of concrete spalling, each according to the present invention, to the surface of a damaged part of a concrete structure and a step of curing the applied material.

Method for Repairing Damaged Concrete Structure (1) A damaged part of a concrete structure is subjected to a scraping treatment or washed with high-pressure water to remove a brittle part and any unnecessary matters such as dust from the damaged part.

(2) As needed, the crack injection material or the water sealant (repairing material for inorganic structure) of the present invention is injected into the damaged part and cured therein to fill up the cracks and the microcracks in the damaged part, thereby preventing the propagation of crack and water leakage.

(3) As needed, by using the radical-polymerizable resin composition of the present invention, the surface of the damaged part, the crack injection material or the water sealant is subjected to primer treatment.

(4) The section repairing material (repairing material for inorganic structure) of the present invention is applied to the surface of the damaged part and cured to repair the damaged part.

(5) By applying and curing the curable material for prevention of concrete spalling of the present invention, the surface of the damaged part is reinforced.

(6) For protecting the damaged part and controlling the color thereof, the radical-polymerizable coating composition or the surface finishing material of the present invention is applied to the damaged part and cured to protect the surface of the damaged part.

The radical-polymerizable coating composition may comprise a colorant and may not comprise a colorant. When the composition comprises a colorant, the esthetic appearance is improved. In addition, the radical-polymerizable coating composition may be used as a top coating agent for providing various functions such as waterproofness, water resistance, salt resistance, corrosion resistance, acid resistance, alkali resistance, heat resistance, heat-shielding performance, heat insulation, light proofness, weather resistance, etc.

In the method of repairing a damaged concrete structure described above, one or more materials of the present invention selected from the radical-polymerizable resin composition, the primer, the crack injection material, the water sealant, the section repairing material, the radical-polymerizable coating composition and the curing material for prevention of concrete spalling optionally comprising reinforcing fibers may be combinedly used with any of known materials other than the radical-polymerizable resin composition of the present invention, for example, one or more known materials selected from radical-polymerizable resin compositions for various uses, epoxy resin-based repairing materials for various uses, various types of silicone-based repairing materials, various types of polymer cement-type repairing materials, and various types of inorganic repairing materials. For example, the material of the present invention and a known material may be combinedly used as a repairing material for concrete structures to form a two or more layered structure.

In this case, these materials may be used irrespective of the type of the substrate or the state of the substrate. Particularly, better effects may be obtained by combinedly using a known repairing material after forming a primer of the radical-polymerizable resin composition of the present invention on a wet surface or after applying the material of the present invention on a wet surface.

(V) Reinforcing Fiber-Containing Composite Material

The reinforcing fiber-containing composite material of the present invention comprises one or more metal-containing compounds (A) selected from a metal soap (A1) and a β-diketone skeleton-containing metal complex (A2), one or more thiol compounds (B) selected from a secondary thiol compound (B1) and a tertiary thiol compound (B2), a radical-polymerizable compound (C), and fiber (G).

The details of the metal-containing compound (A), the thiol compound (B), the radical-polymerizable compound (C) and the fiber (G) are as described in the section of "(A) Radical-Polymerizable Resin Composition".

The reinforcing fiber-containing composite material of the present invention may comprise at least one selected from the radical polymerization initiator (D), the curing accelerator (E), and the filler (F), each mentioned above, in the above amount. Further, the material may comprise at least one selected from the other optional components mentioned above in the above amount.

By curing the reinforcing fiber-containing composite material of the present invention, a molded article (FRP molded article) can be obtained. As a method for producing the FRP molded article, any ordinary method of a hand lay-up molding method, a spray-up molding method, a filament-winding molding method, a resin-injection molding method, a resin transfer molding method or the like may be employed. In addition to these molding methods, a draw-up molding method, a vacuum forming method, a pressure forming method, a compression molding method, an injection molding method, a casting method, a spray method or the like is also employable. The molding condition for these methods is not specifically limited, and the molding may be carried out under any condition heretofore employed in the art.

The surface of an FRP molded article may be protected with a gel-coating resin composition or a top-coating resin. In the case of protecting with a gel-coating layer, any ordinary method of a hand lay-up or spray-up method is employable. An FRP molded article protected with a gel-coating layer may be obtained, for example, through a step of applying a gel-coating resin composition by a mold releasing treatment, a spraying method or a brush coating method and then curing the applied component, a step of superposing FRP and then curing it, and a step of releasing the molded article from the mold. A molded article may be finished by applying and curing a top-coating resin composition to provide an FRP molded article protected with a top-coating layer or a lining-coated structure.

EXAMPLES

The present invention is described with reference to the examples, but it should be noted that the present invention is not limited to the examples.

The materials used in the production of the radical-polymerizable resin compositions (hereinafter also referred to as "resin compositions") in Examples 1 to 61 and Comparative Examples 1 to 35 are mentioned below.

Metal-Containing Compound (A)

Metal Soap (A1-1)

Cobalt octylate (Hexoate Cobalt manufactured by Toei Chemical Industry Co., Ltd., cobalt content: 8% by mass in total amount of product, molecular weight: 345.34)

Metal Soap (A1-2)

Cobalt naphthenate (Naphthex Cobalt manufactured by Nihon Kagaku Sangyo Co., Ltd., cobalt content: 6% by mass in total amount of product, molecular weight: 401.28)

Metal Soap (A1-3)

Manganese octylate (Hexoate Manganese manufactured by Toei Chemical Industry Co., Ltd., manganese content: 8% by mass in total amount of product, molecular weight: 341.35)

Metal Soap (A1-4)

Zirconium octylate (Hexoate Zirconium manufactured by Toei Chemical Industry Co., Ltd., zirconium content in total amount of product: 12% by mass, molecular weight: 664.04)

Metal Soap (A1-5)

Lead naphthenate (Nikka Octhix Lead manufactured by Nihon Kagaku Sangyo Co., Ltd., metal content: 17% by mass in total amount of product, molecular weight: 461.52)

Metal Soap (A1-6)

Calcium naphthenate (manufactured by Wako Pure Chemical Industries, Ltd., metal content: 3% by mass in total amount of product, molecular weight: 382.43)

Metal Soap (A1-7)

Tin octylate (Nikka Octhix Tin manufactured by Nihon Kagaku Sangyo Co., Ltd., metal content in total amount of product: 28% by mass, molecular weight: 405.12)

Metal Soap (A1-8)

Bismuth(III) naphthenate (manufactured by Wako Pure Chemical Industries, Ltd., metal content: 7% by mass in total amount of product, molecular weight: 584)

β-Diketone Skeleton-Containing Metal Complex (A2-1)

Titanium dibutoxybis(acetylacetonate) (Nacem (registered trademark) Titanium manufactured by Nihon Kagaku Sangyo Co., Ltd., titanium content in total amount of product: 8.8% by mass, molecular weight: 392.31)

Thiol Compound (B)

In the following thiol compounds, "monofunctional" means that the number of the mercapto group in the molecule is 1, and each numeral prefix of "difunctional", "trifunctional" and "tetrafunctional" means the number of the mercapto groups in the molecule.

Secondary Thiol Compound (B1-1)

Difunctional secondary thiol: Karenz MT (registered trademark) BD1 (1,4-bis(3-mercaptobutyryloxy)butane, molecular weight: 299.43) manufactured by Showa Denko K.K.

Secondary Thiol Compound (B1-2)

Tetrafunctional secondary thiol: Karenz MT (registered trademark) PE1 (pentaerythritol tetrakis(3-mercaptobutyrate), molecular weight: 544.76) manufactured by Showa Denko K.K.

Secondary Thiol Compound (B1-3)

Cyanurate skeleton-containing trifunctional secondary thiol: Karenz MT (registered trademark) NR1 (1,3,5-tris[2-(3-mercaptobutyryloxy)ethyl]-1,3,5-triazine-2,4,6(1H,3H,5H)-trione), molecular weight: 567.67) manufactured by Showa Denko K.K.

Secondary Thiol Compound (B1-4)

Trifunctional secondary thiol: TPMB (trimethylolpropane tris(3-mercaptobutyrate), molecular weight: 440.64) manufactured by Showa Denko K.K.

Secondary Thiol Compound (B1-5)

Difunctional secondary thiol: thiol-modified polycarbonate diol (molecular weight: about 760) synthesized in Synthesis Example 1 below.

Secondary Thiol Compound (B1-6)

Difunctional secondary thiol: thiol-modified polycarbonate diol (molecular weight: about 1200) synthesized in Synthesis Example 2 below.

Secondary Thiol Compound (B1-7)

Difunctional secondary thiol: thiol-modified dimer acid polyester polyol (hydroxyl groups at both terminals, molecular weight: about 2,000) synthesized in Synthesis Example 3 below.

Secondary Thiol Compound (B1-8)

Monofunctional secondary thiol: 3-mercaptobutyric acid (molecular weight: 120.17) manufactured by Yodo Kagaku Co., Ltd.

Tertiary Thiol Compound (B2-1)

Trifunctional tertiary thiol: trimethylolpropane tris(2-mercaptoisobutyrate) (molecular weight: about 440.64) synthesized in Synthesis Example 4 below.

Primary Thiol Compound (B')

Primary Thiol Compound (B'-1)

Trifunctional primary thiol: TMTP (trimethylolpropane tris(3-mercaptoproionate)) manufactured by Yodo Kagaku Co., Ltd.

Primary Thiol Compound (B'-2)

Tetrafunctional primary thiol: PEMP (pentaerythritol tetrakis(3-mercaptopropionate)) manufactured by SC Organic Chemical Co., Ltd.

Radical-Polymerizable Compound (C)

Radical-Polymerizable Compound (C-1)

Vinyl ester resin: Ripoxy (registered trademark) NSR-112 (non-styrene type) manufactured by Showa Denko K.K.

Radical-Polymerizable Compound (C-2)

Vinyl ester resin: Ripoxy (registered trademark) R-802 (styrene content: 45% by mass) manufactured by Showa Denko K.K.

Radical-Polymerizable Compound (C-3)

Unsaturated polyester resin: Rigolac (registered trademark) SR-110N (styrene content: 40% by mass) manufactured by Showa Denko K.K.

Radical-Polymerizable Compound (C-4)

Vinyl ester resin: Ripoxy (registered trademark) NSR-1000 (non-styrene type) manufactured by Showa Denko K.K.

Radical Polymerization Initiator (D)

Thermal Radical Polymerization Initiator (D-1)

Methyl ethyl ketone peroxide: Permek N manufactured by NOF Corporation.

Thermal Radical Polymerization Initiator (D-2)

Cumene hydroperoxide: Percumyl H-80 manufactured by NOF Corporation.

Photoradical Polymerization Initiator (D-3)

2,2-Dimethoxy-1,2-diphenylethan-1-one (alkylphenone type): Irgacure 651 manufactured by BASF AG.

Photoradical Polymerization Initiator (D-4)

1-Hydroxycyclohexyl phenyl ketone (alkylphenone type): Irgacure 184 manufactured by BASF AG.

Photoradical Polymerization Initiator (D-5)

Bis(2,4,6-trimethylbenzoyl)phenyl phosphine oxide (acylphosphine oxide type): Irgacure 819 manufactured by BASF AG.

Curing Accelerator (E)

Curing Accelerator (E-1)

Dimethylaniline: DMA manufactured by Tokyo Chemical Industry Co., Ltd.

Other Ingredients

Surfactant (P-1)

Sodium dialkylsulfosuccinate: Pelex (registered trademark) OT-P (sodium dialkylsulfosuccinate content: 70% by mass) manufactured by Kao Corporation.

Wax (R-1)

Paraffin wax (135° F.) manufactured by JX Nippon Oil & Energy Corporation.

Wetting Dispersant (S-1)

Silicone-type wetting dispersant containing compound represented by formula (U): BYK (registered trademark)-302 manufactured by BYK Corporation.

Wetting Dispersant (S-2)

Silicone-type wetting dispersant containing compound represented by formula (U): BYK (registered trademark)-322 manufactured by BYK Corporation.

Polymerization Inhibitor (T-1)

Phenothiazine manufactured by Wako Pure Chemical Industries, Ltd.

Polymerization Inhibitor (T-2)

4-Tert-butylcatechol manufactured by Tokyo Chemical Industry Co., Ltd. Curing Retardant (U-1)

4-Hydroxy-2,2,6,6-tetramethylpiperidin 1-oxyl free radical (4H-TEMPO): Polystop 7200P manufactured by Hakuto Co., Ltd.

Curing Catalyst (V-1)

Dibutyltin dilaurate: KS-1260 manufactured by Kyodo Chemical Co., Ltd.

Polyisocyanate Compound (W-1)

Hexamethylene diisocyanate (isocyanurate type): TPA-100 manufactured by Asahi Kasei Corporation.

Synthesis Example 1: Synthesis of Thiol-Modified Polycarbonate Diol (B1-5)

Into a 500-mL flask, 100 g (200 mmol) of C-590 (polycarbonate polyol manufactured by Kuraray Co., Ltd., molecular weight: 500, diol components: 3-methyl-1,5-pentanediol and 1,6-hexanediol), 58 g (480 mmol) of 3-mercaptobutanoic acid (manufactured by Showa Denko K.K.), 7.6 g (40 mmol) of p-toluenesulfonic acid monohydrate (manufactured by Tokyo Chemical Industry Co., Ltd.), and 150 g of toluene (manufactured by Junsei Chemical Co., Ltd.) were charged and a Dean Stark apparatus and a condenser tube were attached to the flask.

The pressure inside the reaction system was reduced down to 73.3 kPa (550 mmHg) and then the contents were heated under stirring in an oil bath at 120° C. After stirred for 4 h and left to cool down to room temperature, the reaction liquid was neutralized with a 9% by mass aqueous solution of sodium hydrogencarbonate. The organic layer was washed three times with ion-exchanged water, and then the solvent was evaporated away via a vacuum pump to obtain the target thiol-modified polycarbonate diol (B1-5) as a pale yellow transparent liquid.

The product was identified by mass analysis, $^1$H-NMR and $^{13}$C-NMR. The molecular weight was determined as a number-average molecular weight by GPC calibrated by polystyrene under the following condition.

Measurement Condition

Apparatus: GPC System SIC-48011 (manufactured by Showa Denko K.K.)

Columns: GPC Columns K-801, K-802, K-802.5 (manufactured by Showa Denko K.K.)

Detector: RI-201H (manufactured by Showa Denko K.K.)

Eluent: chloroform

Sample: 100 μL of a solution of sample in chloroform was injected onto a column at 40° C.

The same identification method and the measurement method were used in the following Synthesis Examples.

Synthesis Example 2: Synthesis of Thiol-Modified Polycarbonate Diol (B1-6)

Into a 2-L flask, 500 g (500 mmol) of C-1090 (polycarbonate polyol manufactured by Kuraray Co., Ltd., molecular weight: 1,000, diol components: 3-methyl-1,5-pentanediol and 1,6-hexanediol), 144 g (1198 mmol) of 3-mercaptobutanoic acid (manufactured by Showa Denko K.K.), 19 g (99.8 mmol) of p-toluenesulfonic acid monohydrate (manufactured by Tokyo Chemical Industry Co., Ltd.), and 500 g of toluene (manufactured by Junsei Chemical Co., Ltd.) were charged and a Dean Stark apparatus and a condenser tube were attached to the flask.

The pressure inside the reaction system was reduced down to 73.3 kPa (550 mmHg) and then the contents were heated under stirring in an oil bath at 120° C. After stirred for 7 h and left to cool down to room temperature, the reaction liquid was neutralized with a 5% by mass aqueous solution of sodium hydrogencarbonate. The organic layer was washed three times with ion-exchanged water, and then the solvent was evaporated away via a vacuum pump to obtain the target thiol-modified polycarbonate diol (B1-6) as a pale yellow transparent liquid.

Synthesis Example 3: Synthesis of Thiol-Modified Dimer Acid Polyester Polyol (B1-7)

In the same manner as in Synthesis Example 1 except for using 110 g (55 mmol) of Priplast 1838-LQ-(GD) (dimer acid polyester polyol manufactured by CRODA Corporation, molecular weight: 2,000, with hydroxyl groups at both terminals) in place of the polycarbonate polyol and changing the amount of 3-mercaptobutanoic acid (manufactured by Showa Denko K.K.) to 15.8 g (132 mmol), the target thiol-modified dimer acid polyester polyol (B1-7) was obtained as a pale yellow transparent liquid.

Synthesis Example 4: Synthesis of Trimethylolpropane tris(2-mercaptoisobutyrate) (B2-1)

Into a 100-mL round-bottom flask, 2.68 g (20 mmol) of trimethylolpropane (manufactured Tokyo Chemical Industry Co., Ltd.), 7.57 g (63 mmol) of 2-mercaptoisobutanoic acid (manufactured by Showa Denko K.K.), 0.23 g (1.2 mmol) of p-toluenesulfonic acid monohydrate, and 20 g of toluene (manufactured by Junsei Chemical Co., Ltd.) were charged and a Dean Stark apparatus and a condenser tube were attached to the flask.

The contents were heated under stirring in an oil bath at 145° C. After stirred for 3 h and left to cool down to room temperature, the reaction liquid was neutralized with 50 mL of a 5% by mass aqueous solution of sodium hydrogencarbonate. The organic layer was washed twice with ion-exchanged water and dried over anhydrous magnesium sulfate, and then toluene was evaporated away. The residue was purified by silica gel column chromatography (silica gel: Wako Gel C-200, developing solvent: n-hexane/ethyl acetate=5/1 (by volume)) to obtain the target trimethylolpropane tris(2-mercaptoisobutyrate) (B2-1) as a white crystal.

Resin Composition 1

A radical-polymerizable resin composition 1 was prepared according to the following process.

Step 1

A liquid mixture (i) was prepared by adding 0.04 parts by mass (based on metal component) of the metal soap (A1-1) to 100 parts by mass of the radical-polymerizable compound (C-1) and well stirring at room temperature (25° C.).

Step 2

The liquid mixture (i) and 0.5 parts by mass of the secondary thiol compound (B1-1) were well stirred to obtain a liquid mixture (ii).

Step 3

The liquid mixture (ii) and 1 part by mass of the radical polymerization initiator (D-1) were stirred to obtain a radical-polymerizable resin composition 1.

Resin Compositions 2 to 31

Each of the radical-polymerizable resin compositions 2 to 31 was produced in the same manner as in the production of the resin composition 1 except for mixing the components in each mixing amount shown in Tables 1 to 5.

The mixing amount of the metal-containing compound (A) for each resin composition is not the actual amount but is based on the amount of the metal component in the metal-containing compound (A) (the same applies below).

Examples 1 to 20 and Comparative Examples 1 to 11

Each of the resultant radical-polymerizable resin compositions 1 to 31 was evaluated for various properties by the following methods. The results are shown in Tables 1 to 5.

Measurement of Gelling Time, Curing Time, Curing Temperature

The radical-polymerizable resin composition was put into a test tube (outer diameter: 18 mm, length: 165 mm) up to a height of 100 mm from the bottom at 25° C., and the temperature thereof was measured using a thermocouple.

The time taken until the temperature of the radical-polymerizable resin composition changed from 25° C. to 30° C. was defined as a gelling time. The time taken until the temperature of the radical-polymerizable resin composition changed from 25° C. to the peak exothermic temperature was defined as a curing time and the peak exothermic temperature was defined as a curing temperature, which were measured according to JIS K 6901:2008.

Adhesion Strength Test

A cement mortar plate having a length of 70 mm, a width of 70 mm and a thickness of 20 mm manufactured by Nippon Testpanel Co., Ltd., which is specified in JIS K 5600 was used as a substrate. After removing brittle matters and powdery matters from the surface to be used for the adhesion test by using a waterproof abrasive paper No. 150 specified in JIS R 6253:2006, the surface was wiped with a soft clean cloth.

Each sample of the radical-polymerizable resin composition for the adhesion strength test was prepared according to 7.4 of JIS A 6909:2014, which was then formed into a test piece according to 7.10 of JIS A 6909:2014 and tested under standard conditions.

Three test pieces were prepared for each radical-polymerizable resin composition, and each test piece was tested for adhesion strength using a pull-off adhesion tester 106 manufactured by Elcometer Limited. The result is shown by the averaged value of the measurements of three test pieces.

After the test, the type of fracture of the test piece was visually observed. The fracture wherein the cement mortar plate (substrate) undergone fracture was rated as "substrate fracture." The fracture occurred at the interface between the cement mortar plate and the cured resin composition was rated as "interfacial fracture." The fracture wherein the cured resin composition undergone fracture was rated as "cohesion failure." In the present invention, "substrate fracture" is preferred.

TABLE 1

|  |  |  | Example | | | | |
|---|---|---|---|---|---|---|---|
|  |  |  | 1 | 2 | 3 | 4 | 5 |
|  | Resin Composition |  | 1 | 2 | 3 | 4 | 5 |
| Mixing Amount (part by mass) | Component (A) | (A1-1) | 0.04 | 0.04 | 0.04 | 0.04 | |
|  |  | (A1-2) |  |  |  |  | 0.018 |
|  |  | (A1-3) |  |  |  |  | |
|  |  | (A2-1) |  |  |  |  | |
|  | Component (B) | (B1-1) | 0.5 |  |  |  | 0.1 |
|  |  | (B1-2) |  | 0.5 |  |  | |
|  |  | (B1-3) |  |  | 0.5 |  | |
|  |  | (B1-4) |  |  |  | 0.5 | |
|  | Component (C) | (C-1) | 100 | 100 | 100 | 100 | |
|  |  | (C-2) |  |  |  |  | 100 |
|  |  | (C-3) |  |  |  |  | |
|  | Component (D) | (D-1) | 1 | 1 | 1 | 1 | 1.5 |
|  |  | (D-2) |  |  |  |  | |
|  | Molar Ratio (B)/(A) |  | 2.5 | 1.4 | 1.3 | 1.7 | 1.1 |
| Evaluation | Gelling Time |  | 3 min 45 sec | 2 min 25 sec | 2 min 05 sec | 2 min 10 sec | 1 min 35 sec |
|  | Curing Time |  | 11 min 15 sec | 23 min 25 sec | 18 min 00 sec | 20 min 00 sec | 37 min 35 sec |
|  | Curing Temperature (° C.) |  | 93.6 | 85.8 | 87.3 | 88.8 | 107 |
|  | Adhesion Strength (N/mm²) |  | 2.9 | 2.8 | 2.6 | 2.2 | 2.2 |
|  | Fracture Type |  | Substrate Fracture | Substrate Fracture | Substrate Fracture | Substrate Fracture | Substrate Fracture |

|  |  |  | Example | | | |
|---|---|---|---|---|---|---|
|  |  |  | 6 | 7 | 8 | 9 |
|  | Resin Composition |  | 6 | 7 | 8 | 9 |
| Mixing Amount (part by mass) | Component (A) | (A1-1) |  | 0.08 |  | |
|  |  | (A1-2) | 0.018 |  |  | |
|  |  | (A1-3) |  |  | 0.06 | |
|  |  | (A2-1) |  |  |  | 0.088 |

TABLE 1-continued

|  |  |  |  |  |  |  |
|---|---|---|---|---|---|---|
|  | Component (B) | (B1-1) | 0.1 | 0.5 | 0.5 | 0.5 |
|  |  | (B1-2) |  |  |  |  |
|  |  | (B1-3) |  |  |  |  |
|  |  | (B1-4) |  |  |  |  |
|  | Component (C) | (C-1) |  | 100 | 100 | 100 |
|  |  | (C-2) |  |  |  |  |
|  |  | (C-3) | 100 |  |  |  |
|  | Component (D) | (D-1) | 1 |  |  | 1 |
|  |  | (D-2) |  | 1 | 1 |  |
|  | Molar Ratio (B)/(A) |  | 3.3 | 1.2 | 1.5 | 0.9 |
| Evaluation | Gelling Time |  | 4 min 45 sec | 2 min 25 sec | 15 min 20 sec | 3 min 35 sec |
|  | Curing Time |  | 21 min 30 sec | 5 min 40 sec | 22 min 45 sec | 10 min 40 sec |
|  | Curing Temperature (° C.) |  | 128.4 | 91.9 | 89.5 | 88 |
|  | Adhesion Strength (N/mm²) |  | 2.5 | 3.4 | 3.1 | 2.8 |
|  | Fracture Type |  | Substrate Fracture | Substrate Fracture | Substrate Fracture | Substrate Fracture |

TABLE 2

|  |  |  | Example |  |  |  |  |  |
|---|---|---|---|---|---|---|---|---|
|  |  |  | 10 | 11 | 12 | 13 | 14 | 15 |
|  | Resin Composition |  | 10 | 11 | 12 | 13 | 14 | 15 |
| Mixing Amount (part by mass) | Component (A) | (A1-1) | 0.04 | 0.04 | 0.04 | 0.04 | 0.04 | 0.04 |
|  | Component (B) | (B1-5) | 0.5 |  |  |  |  |  |
|  |  | (B1-6) |  | 0.5 |  |  |  |  |
|  |  | (B1-7) |  |  | 0.5 | 3.5 |  |  |
|  |  | (B1-8) |  |  |  |  | 0.5 |  |
|  |  | (B2-1) |  |  |  |  |  | 0.5 |
|  | Component (C) | (C-1) | 100 | 100 | 100 | 100 | 100 | 100 |
|  | Component (D) | (D-1) | 1 | 1 | 1 | 1 |  | 1 |
|  |  | (D-2) |  |  |  |  | 1 |  |
|  | Molar Ratio (B)/(A) |  | 1.0 | 0.6 | 0.4 | 2.6 | 6.1 | 1.7 |
| Evaluation | Gelling Time |  | 5 min 30 sec | 6 min 15 sec | 7 min 50 sec | 4 min 10 sec | 1 min 55 sec | 7 min 35 sec |
|  | Curing Time |  | 13 min 30 sec | 14 min 05 sec | 15 min 00 sec | 12 min 15 sec | 6 min 25 sec | 30 min 45 sec |
|  | Curing Temperature (° C.) |  | 90.6 | 90.7 | 90.1 | 91.4 | 89.7 | 83.2 |
|  | Adhesion Strength (N/mm²) |  | 2.7 | 2.6 | 2.6 | 3.0 | 3.1 | 2.1 |
|  | Fracture Type |  | Substrate Fracture | Substrate Fracture | Substrate Fracture | Substrate Fracture | Substrate Fracture | Substrate Fracture |

TABLE 3

|  |  |  | Comparative Example |  |  |  |  |  |
|---|---|---|---|---|---|---|---|---|
|  |  |  | 1 | 2 | 3 | 4 | 5 | 6 |
|  | Resin Composition |  | 16 | 17 | 18 | 19 | 20 | 21 |
| Mixing Amount (part by mass) | Component (A) | (A1-1) | 0.04 |  |  | 0.04 | 0.04 | 0.04 |
|  |  | (A1-2) |  | 0.018 | 0.006 |  |  |  |
|  | Component (B') | (B'-1) |  |  |  | 0.5 |  |  |
|  |  | (B'-2) |  |  |  |  | 0.5 |  |
|  | Component (C) | (C-1) | 100 |  |  | 100 | 100 | 100 |
|  |  | (C-2) |  | 100 |  |  |  |  |
|  |  | (C-3) |  |  | 100 |  |  |  |
|  | Component (D) | (D-1) | 1 | 1.5 | 1 | 1 | 1 | 1 |
|  | Component (E) | (E-1) |  |  |  |  |  | 0.2 |
| Evaluation | Gelling Time |  | 10 min 20 sec | 11 min 30 sec | 21 min 55 sec | 18 min 20 sec | 26 min 10 sec | 5 min 40 sec |
|  | Curing Time |  | 16 min 25 sec | 40 min 05 sec | 46 min 55 sec | 28 min 45 sec | 41 min 00 sec | 9 min 35 sec |
|  | Curing Temperature (° C.) |  | 89.2 | 125.5 | 123.3 | 79.7 | 76.5 | 92.9 |

TABLE 3-continued

|  |  | Comparative Example | | | | | |
|---|---|---|---|---|---|---|---|
|  |  | 1 | 2 | 3 | 4 | 5 | 6 |
|  | Adhesion Strength (N/mm$^2$) | 2.9 | 2.4 | 2.1 | 2.2 | 2.1 | 2.3 |
|  | Fracture Type | Substrate Fracture | Substrate Fracture | Substrate Fracture | Substrate Fracture | Substrate Fracture | Substrate Fracture |

TABLE 4

|  |  |  | Example | | | | |
|---|---|---|---|---|---|---|---|
|  |  |  | 16 | 17 | 18 | 19 | 20 |
|  | Resin Composition | | 22 | 23 | 24 | 25 | 26 |
| Mixing Amount (part by mass) | Component (A) | (A1-4) | 0.36 | | | | |
| | | (A1-5) | | 0.51 | | | |
| | | (A1-6) | | | 0.09 | | |
| | | (A1-7) | | | | 0.42 | |
| | | (A1-8) | | | | | 0.21 |
| | Component (B) | (B1-3) | 1.5 | 1.5 | 1.5 | 0.5 | 1.5 |
| | Component (C) | (C-3) | 100 | 100 | 100 | 100 | 100 |
| | Component (D) | (D-2) | 3 | 3 | 3 | 1 | 3 |
| | Molar Ratio (B)/(A) | | 4.9 | 2.4 | 11.2 | 2.5 | 7.3 |
| Evaluation | Gelling Time | | 11 min 40 sec | 3 min 15 sec | 10 min 55 sec | 7 min 20 sec | 4 min 25 sec |
| | Curing Time | | 35 min 55 sec | 10 min 50 sec | 30 min 55 sec | 14 min 15 sec | 15 min 25 sec |
| | Curing Temperature (° C.) | | 133.2° C. | 164.6° C. | 62.4° C. | 142.2° C. | 157.2° C. |
| | Adhesion Strength | | 3.1 | 2.4 | 1.9 | 3.2 | 2.8 |
| | Fracture Type | | Substrate Fracture | Substrate Fracture | Substrate Fracture | Substrate Fracture | Substrate Fracture |

TABLE 5

|  |  |  | Comparative Example | | | | |
|---|---|---|---|---|---|---|---|
|  |  |  | 7 | 8 | 9 | 10 | 11 |
|  | Resin Composition | | 27 | 28 | 29 | 30 | 31 |
| Mixing Amount (part by mass) | Component (A) | (A1-4) | 0.36 | | | | |
| | | (A1-5) | | 0.51 | | | |
| | | (A1-6) | | | 0.09 | | |
| | | (A1-7) | | | | 0.42 | |
| | | (A1-8) | | | | | 0.21 |
| | Component (B) | (B1-3) | | | | | |
| | Component (C) | (C-3) | 100 | 100 | 100 | 100 | 100 |
| | Component (D) | (D-2) | 3 | 3 | 3 | 1 | 3 |
| | Molar Ratio (B)/(A) | | | | | | |
| Evaluation | Gelling Time | | Not cured | Not cured | Not cured | Not cured | Not cured |
| | Curing Time | | | | | | |
| | Curing Temperature (° C.) | | | | | | |
| | Adhesion Strength | | | | | | |
| | Fracture Type | | | | | | |

As seen from the results shown in Tables 1 to 3, in Examples combinedly using the metal-containing compound (A) and the thiol compound (B), the gelling time, curing temperature and adhesion strength are good. In particular, in the case of using a difunctional secondary thiol, good results were obtained and the cured products having a short curing time and a high adhesion strength were obtained. Among them, a smaller molecular weight gave better evaluation results.

In addition, the evaluation results of the case using the secondary thiol compound (B1) were better than those of Example 15 using the tertiary thiol compound (B2).

On the other hand, in Comparative Examples 1 to 3 not using a thiol compound, the gelling time and the curing time were long as compared with those in Examples. In addition, in Comparative Examples 4 and 5 using the primary thiol compound (B'), the curing time was long and the curing temperature was low as compared with those in Comparative Example 1 not using a thiol compound.

As seen from Tables 4 and 5, the resin compositions of the present invention combinedly using any of the metal soap (A1-4) to (A1-8) as the component (A) and the thiol compound (B) exhibited good results, but the resin compositions of Comparative Examples not containing the thiol compound (B) did not cure even after 3 h.

These Comparative Examples indicate that the curing performance of the compositions is inferior to that of the compositions of Examples 1 to 20 using the secondary thiol compound (B1) or the tertiary thiol compound (B2), and indicates the superiority of the compositions using the thiol compound (B).

Examples 21 to 35 and Comparative Examples 12 to 17

Each of the radical-polymerizable resin compositions 1 to 21 was evaluated for various properties according to the following methods. The results are shown in Tables 6 to 8.

Comparative Examples 18 and 19

For comparison, an underwater adhesive shown below was, in place of the radical-polymerizable resin composition, evaluated in the same manner as in the evaluation of the radical-polymerizable resin compositions. The underwater adhesive was used by following the instructions attached thereto (the same applies below). The results are shown in Table 8.

Underwater Adhesive (I)
Epoxy adhesive: underwater bond E380 (gap filling adhesive for underwater/wet surface) manufactured by Konishi Co., Ltd. The base agent and the hardener were mixed in a ratio of 1:1 (by mass) before use.

Underwater Adhesive (II)
Epoxy adhesive: underwater curable filling adhesive Three Bond 2083L manufactured by ThreeBond Co., Ltd. The base agent and the hardener were mixed in a ratio of 1:1 (by mass) before use.

Measurement of Gelling Time, Curing Time and Curing Temperature in Water

Ion-exchanged water was put into a test tube (outer diameter: 18 mm, length: 165 mm) to a depth of 30 mm at 25° C. and the temperature of the water in the test tube was kept at 25° C. The radical-polymerizable resin composition was put into the test tube such that the depth of the total of water and the radical-polymerizable resin composition was 100 mm. Subsequently, the temperature of the radical-polymerizable resin composition was measured by a thermocouple. The gelling time, the curing time, and the curing temperature were measured in accordance with JIS K 6901: 2008 except for putting the water into the test tube to a depth of 30 mm.

Adhesion Strength Test in Water and in Seawater

A cement mortar plate for adhesion strength test was prepared in the same manner as in the adhesion strength test in Example 1. Subsequently, the cement mortar plate was submerged in water so that the top surface of the plate was at about 5 cm depth below the water, while referring to the method shown in FIG. 8 of the test procedure after immersion in water in 7.10 of JIS A 6909:2014.

The sample for adhesion strength test was prepared in accordance with 7.4 of JIS A 6909:2014. The test piece was produced without providing an interlayer coating of a so-called primer, an under coat improver, a corrosion inhibitor and the like between the surface of the cement mortar plate and the sample. The radical-polymerizable resin composition was immersed into water by dropping and troweled on the cement mortar plate into a thickness of 4 to 5 mm, and then left to stand for one week. Water was adequately added to prevent the water level from being lowered by evaporation.

In the in-water adhesion strength test, ion-exchanged water was used, and in the in-seawater adhesion strength test, a 3.5% by mass aqueous solution of sodium chloride in ion-exchanged water was used.

The test piece was measured and evaluated for the adhesion strength in the same manner as in the adhesion strength test in Example 1.

Adhesion Strength Test in Wet State

A cement mortar plate for adhesion strength test was prepared in the same manner as in the evaluation test in Example 1. Subsequently, the cement mortar plate was placed in water so that the plate was exposed at 5 mm height above the water, while referring to the method shown in FIG. 8 of the test procedure after immersion in water in 7.10 of JIS A 6909:2014.

The radical-polymerizable resin composition sample for adhesion strength test was prepared according to 7.4 of JIS A 6909:2014. The sample was troweled on the cement mortar plate into a thickness of 4 to 5 mm, thereby preparing a test piece. No interlayer coating of a so-called primer, an under coat improver, a corrosion inhibitor and the like was provided between the surface of the cement mortar plate and the sample.

The test piece was measured and evaluated for the adhesion strength in the same manner as in the adhesion strength test in Example 1.

TABLE 6

| | | | Example | | | | |
|---|---|---|---|---|---|---|---|
| | | | 21 | 22 | 23 | 24 | 25 |
| | Resin Composition | | 1 | 2 | 3 | 4 | 5 |
| Mixing Amount (part by mass) | Component (A) | (A1-1) | 0.04 | 0.04 | 0.04 | 0.04 | |
| | | (A1-2) | | | | | 0.018 |
| | | (A1-3) | | | | | |
| | | (A2-1) | | | | | |
| | Component (B) | (B1-1) | 0.5 | | | | 0.1 |
| | | (B1-2) | | 0.5 | | | |
| | | (B1-3) | | | 0.5 | | |
| | | (B1-4) | | | | 0.5 | |
| | Component (C) | (C-1) | 100 | 100 | 100 | 100 | |
| | | (C-2) | | | | | 100 |
| | | (C-3) | | | | | |

TABLE 6-continued

|  |  |  |  |  |  |  |  |
|---|---|---|---|---|---|---|---|
|  | Component (D) | (D-1) | 1 | 1 | 1 | 1 | 1.5 |
|  |  | (D-2) |  |  |  |  |  |
|  | Molar Ratio (B)/(A) |  | 2.5 | 1.4 | 1.3 | 1.7 | 1.1 |
| Evaluation | In water | Gelling Time | 5 min 05 sec | 14 min 45 sec | 6 min 50 sec | 6 min 10 sec | 14 min 10 sec |
|  |  | Curing Time | 10 min 00 sec | 26 min 30 sec | 20 min 40 sec | 16 min 55 sec | 44 min 55 sec |
|  |  | Curing Temperature (° C.) | 77.5 | 46.4 | 72 | 66 | 67.3 |
|  |  | Adhesion Strength (N/mm²) | 2.6 | 2.1 | 2.3 | 2.1 | 1.8 |
|  |  | Fracture Type | Substrate Fracture | Substrate Fracture | Substrate Fracture | Substrate Fracture | Substrate Fracture |
|  | In seawater | Adhesion Strength (N/mm²) | 2.2 | 1.2 | 1.7 | 1.4 | 1.6 |
|  |  | Fracture Type | Substrate Fracture | Interfacial Fracture | Substrate Fracture | Interfacial Fracture | Substrate Fracture |
|  | In wet state | Adhesion Strength (N/mm²) | 2.8 | 2.2 | 2.5 | 2.4 | 1.9 |
|  |  | Fracture Type | Substrate Fracture | Substrate Fracture | Substrate Fracture | Substrate Fracture | Substrate Fracture |

|  |  |  | Example |  |  |  |
|---|---|---|---|---|---|---|
|  |  |  | 26 | 27 | 28 | 29 |
|  | Resin Composition |  | 6 | 7 | 8 | 9 |
| Mixing Amount (part by mass) | Component (A) | (A1-1) |  | 0.08 |  |  |
|  |  | (A1-2) | 0.018 |  |  |  |
|  |  | (A1-3) |  |  | 0.06 |  |
|  |  | (A2-1) |  |  |  | 0.088 |
|  | Component (B) | (B1-1) | 0.1 | 0.5 | 0.5 | 0.5 |
|  |  | (B1-2) |  |  |  |  |
|  |  | (B1-3) |  |  |  |  |
|  |  | (B1-4) |  |  |  |  |
|  | Component (C) | (C-1) |  | 100 | 100 | 100 |
|  |  | (C-2) |  |  |  |  |
|  |  | (C-3) | 100 |  |  |  |
|  | Component (D) | (D-1) | 1 |  |  |  |
|  |  | (D-2) |  | 1 | 1 | 1 |
|  | Molar Ratio (B)/(A) |  | 3.3 | 1.2 | 1.5 | 0.9 |
| Evaluation | In water | Gelling Time | 4 min 45 sec | 4 min 20 sec | 20 min 15 sec | 4 min 15 sec |
|  |  | Curing Time | 19 min 50 sec | 7 min 30 sec | 26 min 35 sec | 12 min 10 sec |
|  |  | Curing Temperature (° C.) | 116.2 | 85.9 | 83.4 | 85.5 |
|  |  | Adhesion Strength (N/mm²) | 2.0 | 3.0 | 2.6 | 2.4 |
|  |  | Fracture Type | Substrate Fracture | Substrate Fracture | Substrate Fracture | Substrate Fracture |
|  | In seawater | Adhesion Strength (N/mm²) | 1.4 | 2.6 | 2.7 | 2.3 |
|  |  | Fracture Type | Interfacial Fracture | Substrate Fracture | Substrate Fracture | Substrate Fracture |
|  | In wet state | Adhesion Strength (N/mm²) | 2.1 | 2.8 | 3.2 | 2.6 |
|  |  | Fracture Type | Substrate Fracture | Substrate Fracture | Substrate Fracture | Substrate Fracture |

TABLE 7

|  |  |  | Example |  |  |  |  |  |
|---|---|---|---|---|---|---|---|---|
|  |  |  | 30 | 31 | 32 | 33 | 34 | 35 |
|  | Resin Composition |  | 10 | 11 | 12 | 13 | 14 | 15 |
| Mixing Amount (part by mass) | Component (A) | (A1-1) | 0.04 | 0.04 | 0.04 | 0.04 | 0.04 | 0.04 |
|  | Component (B) | (B1-5) | 0.5 |  |  |  |  |  |
|  |  | (B1-6) |  | 0.5 |  |  |  |  |
|  |  | (B1-7) |  |  | 0.5 | 3.5 |  |  |
|  |  | (B1-8) |  |  |  |  | 0.5 |  |
|  |  | (B2-1) |  |  |  |  |  | 0.5 |
|  | Component (C) | (C-1) | 100 | 100 | 100 | 100 | 100 | 100 |

TABLE 7-continued

|  |  |  |  | Example | | | | | |
|---|---|---|---|---|---|---|---|---|---|
|  |  |  |  | 30 | 31 | 32 | 33 | 34 | 35 |
|  |  | Component (D) | (D-1) | 1 | 1 | 1 | 1 |  | 1 |
|  |  |  | (D-2) |  |  |  |  | 1 |  |
|  | Molar Ratio (B)/(A) |  |  | 1.0 | 0.6 | 0.4 | 2.6 | 6.1 | 1.7 |
| Evaluation | In water | Gelling Time |  | 8 min 15 sec | 9 min 45 sec | 11 min 10 sec | 6 min 30 sec | 3 min 30 sec | 8 min 40 sec |
|  |  | Curing Time |  | 17 min 40 sec | 20 min 05 sec | 19 min 40 sec | 17 min 40 sec | 11 min 40 sec | 33 min 20 sec |
|  |  | Curing Temperature (° C.) |  | 78.5 | 81.4 | 83.2 | 79.4 | 78.5 | 80.5 |
|  |  | Adhesion Strength (N/mm$^2$) |  | 2.2 | 2.1 | 2.3 | 2.7 | 2.2 | 1.9 |
|  |  | Fracture Type |  | Substrate Fracture | Substrate Fracture | Substrate Fracture | Substrate Fracture | Substrate Fracture | Substrate Fracture |
|  | In seawater | Adhesion Strength (N/mm$^2$) |  | 1.9 | 1.7 | 2.1 | 2.2 | 1.9 | 1.8 |
|  |  | Fracture Type |  | Substrate Fracture | Substrate Fracture | Substrate Fracture | Substrate Fracture | Substrate Fracture | Substrate Fracture |
|  | In wet state | Adhesion Strength (N/mm$^2$) |  | 2.1 | 1.8 | 2.0 | 2.4 | 2.1 | 1.7 |
|  |  | Fracture Type |  | Substrate Fracture | Substrate Fracture | Substrate Fracture | Substrate Fracture | Substrate Fracture | Substrate Fracture |

TABLE 8

|  |  |  |  | Comparative Example | | | |
|---|---|---|---|---|---|---|---|
|  |  |  |  | 12 | 13 | 14 | 15 |
|  | Resin Composition |  |  | 16 | 17 | 18 | 19 |
| Mixing Amount (part by mass) | Component (A) | (A1-1) |  | 0.04 |  |  | 0.04 |
|  |  | (A1-2) |  |  | 0.018 | 0.006 |  |
|  | Component (B') | (B'-1) |  |  |  |  | 0.5 |
|  |  | (B'-2) |  |  |  |  |  |
|  | Component (C) | (C-1) |  | 100 |  |  | 100 |
|  |  | (C-2) |  |  | 100 |  |  |
|  |  | (C-3) |  |  |  | 100 |  |
|  | Component (D) | (D-1) |  | 1 | 1.5 | 1 | 1 |
|  | Component (E) | (E-1) |  |  |  |  |  |
| Underwater Adhesive (I) (part by mass) | Base Agent Hardener |  |  |  |  |  |  |
| Underwater Adhesive (II) (part by mass) | Base Agent Hardener |  |  |  |  |  |  |
| Evaluation | In water | Gelling Time |  | 13 min 35 sec | 12 min 10 sec | 24 min 15 sec | 41 min 35 sec |
|  |  | Curing Time |  | 19 min 20 sec | 30 min 35 sec | 41 min 30 sec | 45 min 25 sec |
|  |  | Curing Temperature (° C.) |  | 72.7 | 92.9 | 89.8 | 33.6 |
|  |  | Adhesion Strength (N/mm$^2$) |  | 1.5 | 1.2 | Not adhered | Not adhered |
|  |  | Fracture Type |  | Interfacial Fracture | Interfacial Fracture | Cohesion Fracture | Cohesion Fracture |
|  | In seawater | Adhesion Strength (N/mm$^2$) |  | Not adhered | Not adhered | Not adhered | Not adhered |
|  |  | Fracture Type |  | Cohesion Fracture | Cohesion Fracture | Cohesion Fracture | Cohesion Fracture |
|  | In wet state | Adhesion Strength (N/mm$^2$) |  | 2.4 | 1.9 | 1.7 | 1.5 |
|  |  | Fracture Type |  | Substrate Fracture | Substrate Fracture | Substrate Fracture | Interfacial Fracture |

|  |  |  |  | Comparative Example | | | |
|---|---|---|---|---|---|---|---|
|  |  |  |  | 16 | 17 | 18 | 19 |
|  | Resin Composition |  |  | 20 | 21 | — | — |
| Mixing Amount (part by mass) | Component (A) | (A1-1) |  | 0.04 | 0.04 |  |  |
|  |  | (A1-2) |  |  |  |  |  |
|  | Component (B') | (B'-1) |  |  |  |  |  |
|  |  | (B'-2) |  | 0.5 |  |  |  |
|  | Component (C) | (C-1) |  | 100 | 100 |  |  |
|  |  | (C-2) |  |  |  |  |  |
|  |  | (C-3) |  |  |  |  |  |

TABLE 8-continued

| | | | | | |
|---|---|---|---|---|---|
| Component (D) | (D-1) | 1 | 1 | | |
| Component (E) | (E-1) | | 0.2 | | |
| Underwater Adhesive (I) (part by mass) | Base Agent | | | 100 | |
| | Hardener | | | 100 | |
| Underwater Adhesive (II) (part by mass) | Base Agent | | | | 100 |
| | Hardener | | | | 100 |
| Evaluation In water | Gelling Time | 28 min 35 sec | 6 min 20 sec | — | — |
| | Curing Time | 38 min 35 sec | 10 min 00 sec | — | — |
| | Curing Temperature (° C.) | 68.9 | 85.3 | — | — |
| | Adhesion Strength (N/mm²) | Not adhered | 1.4 | 2.1 | 1.7 |
| | Fracture Type | Cohesion Fracture | Interfacial Fracture | Interfacial Fracture | Interfacial Fracture |
| In seawater | Adhesion Strength (N/mm²) | Not adhered | Not adhered | 1.6 | 1.5 |
| | Fracture Type | Cohesion Fracture | Cohesion Fracture | Interfacial Fracture | Interfacial Fracture |
| In wet state | Adhesion Strength (N/mm²) | 1.4 | 1.1 | 2.3 | 2.5 |
| | Fracture Type | Interfacial Fracture | Interfacial Fracture | Substrate Fracture | Substrate Fracture |

As seen from the results in Tables 6 to 8, in Examples 21 to 35, the curing reaction proceeded with no problem and the adhesion strength was excellent in any of the tests in water, in seawater, and in a wet state.

On the other hand, in Comparative Examples 12 to 17, the adhesion strength was insufficient or the adhesion was impossible. In addition, the adhesion strength was low in a wet state. In Comparative Examples 18 and 19 using an underwater adhesive, the interfacial fracture occurred both in water and in seawater. From the foregoing, it can be found that the cured product of the radical-polymerizable resin composition of the present invention is excellent both in curability and adhesion.

Resin Composition 32

A radical-polymerizable resin composition 32 was prepared according to the following process.

Step 1

A liquid mixture (i) was prepared by dissolving 0.1 parts by mass of wax (R-1) heated at about 50° C. in 100 parts by mass of the radical-polymerizable compound (C-1), adding 0.04 parts by mass of the metal soap (A1-1) to the obtained solution, and stirring the solution well at room temperature (25° C.).

Step 2-1

The liquid mixture (i) and 0.25 parts by mass of the secondary thiol compound (B1-1) were stirred well to prepare a liquid mixture (ii).

Step 2-2

A mixture of the liquid mixture (ii), 0.01 parts by mass of a polymerization inhibitor, phenothiazine (T-1), and 0.005 parts by mass of a curing retardant 4H-TEMPO (U-1) was stirred well at room temperature (25° C.) to prepare a liquid mixture (iii).

Step 2-3

A liquid mixture (iv) was prepared by adding 0.1 parts by mass of the surfactant (P-1), 0.2 parts by mass of the wetting dispersant (S-1), and 0.2 parts by mass of the wetting dispersant (S-2) to the liquid mixture (iii).

Step 3

The radical-polymerizable resin composition 32 was produced by adding 0.5 parts by mass of the radical polymerization initiator (D-2) to the liquid mixture (iv) and stirring the resultant mixture.

Resin Compositions 33 to 45

Each of radical-polymerizable resin compositions 33 to 45 was produced in the same manner as in the production of the resin composition 32 except for mixing the components in the mixing amounts shown in Tables 9 and 10 below.

In the production of the resin compositions 36 to 41, the curing catalyst (V-1) was added in the step 2-2 after adding the polymerization inhibitor (T-1) and the curing retardant (U-1), and the polyisocyanate compound (W-1) was added to the mixture (iv) in the step 2-3 before adding the radical polymerization initiator (D-2).

Examples 36 to 45 and Comparative Examples 20 to 23

The resultant radical-polymerizable resin compositions 32 to 45 were measured for various properties by the following methods to evaluate the rapid curability when the composition was aged for 6 h for curing. The results are shown in Tables 9 and 10.

Comparative Examples 24 and 25

For comparison, the underwater adhesive as used in Comparative Example 18 or 19 in place of the radical-polymerizable resin composition was evaluated in the same manner as in the evaluation of the radical-polymerizable resin composition. The results are shown in Table 10.

Measurement of Gelling Time, Curing Time, and Curing Temperature

These properties were measured in the same manner as in Example 1.

Adhesion Strength Test in Air (Dry State)

As a substrate, a concrete ordinary slab (60 mm×300 mm×300 mm) specified in JIS A 5371:2010 was prepared. The brittle matter and the powdery matter on the surface to be used in the adhesion test were fully removed, and the surface was wiped with a soft clean cloth. By using a rubber plate having a width of 2 mm and a thickness of 1 mm, a formwork was formed on the concrete ordinary slab according to 7.10 of JIS A 6909:2014.

Next, a sample of the radical-polymerizable resin composition for adhesion strength test was prepared according to 7.4 of JIS A 6909:2014. The prepared sample was cast into the formwork and spread by a spatula, a roller and the like into a thickness of about 1 mm, and then aged at 25° C. and a humidity of 50% for 6 h to produce a test piece. Using a Ken-Ken type adhesion strength tester (Technotester Model R-10000ND, a tensile tester certified by Japan Society For Finishings Technology), each test piece was tested for adhesion strength at 5 points, and the result was shown by a mean value of 5 measured values.

After the test, the type of fracture of the test piece was visually observed. The fracture wherein the concrete ordinary slab (substrate) undergone fracture was rated as "substrate fracture." The fracture occurred at the interface between the concrete ordinary slab and the cured resin composition was rated as "interfacial fracture." The fracture wherein the cured resin composition undergone fracture was rated as "cohesion failure." The test piece wherein both the substrate fracture and the interfacial fracture occurred was rated as "substrate/interfacial." In the present invention, "substrate fracture" is preferred.

Adhesion Strength Test in Wet State

As a substrate, a concrete ordinary slab was prepared in the same manner as in the adhesion strength test in air except for immersing the slab in water for 24 h or longer so as to fully absorb water.

Next, a sample of the radical-polymerizable resin composition for adhesion strength test was prepared in the same manner as in the adhesion strength test in air. Subsequently, the concrete ordinary slab was immersed in water for 24 h or more so that the top surface of the slab was at about 5 cm depth below the water, while referring to the method shown in FIG. 8 of the test procedure after immersion in water in 7.10 of JIS A 6909:2014. Thereafter, just before applying the resin composition, the top surface of the slab was exposed at 5 mm height above the water and the surface was wiped with a dry cloth to remove bleeding water. Immediately thereafter, a sample of the resin composition was cast into the formwork, spread into a thickness of about 1 mm by a trowel or a spatula, and then aged at 25° C. and a relative humidity of 50% for 6 h to produce a test piece.

Water was adequately added to prevent the water level from being lowered with the lapse of time.

The adhesion strength of the test piece was measured and evaluated in the same manner as in the adhesion strength test in air.

Adhesion Strength Test in Water

A concrete ordinary slab as a substrate and a sample of the radical-polymerizable resin composition for adhesion strength test were prepared in the same manner as in the adhesion strength test in a wet state. Subsequently, the concrete ordinary slab was submerged in water so that the top surface of the slab was at about 5 cm depth below the water, while referring to the method shown in FIG. 8 of the test procedure after immersion in water of 7.10 of JIS A 6909:2014. The sample of the resin composition was cast into the formwork on the top surface of the concrete ordinary slab in water, spread into a thickness of about 1 mm by a trowel, a spatula or the like, and aged at 25° C. and a relative humidity of 50% for 6 h to produce a test piece.

Water was adequately added to prevent the water level from being lowered with the lapse of time.

The adhesion strength of the test piece was measured and evaluated in the same manner as in the adhesion strength test in air.

TABLE 9

| | | | Example | | | | |
|---|---|---|---|---|---|---|---|
| | | | 36 | 37 | 38 | 39 | 40 |
| | Resin Composition | | 32 | 33 | 34 | 35 | 36 |
| Mixing Amount (part by mass) | Component (A) | (A1-1) | 0.04 | 0.08 | 0.04 | | 0.08 |
| | | (A1-3) | | | | 0.06 | |
| | Component (B) | (B1-1) | 0.25 | 0.25 | | 0.5 | 0.25 |
| | | (B1-3) | | | 0.5 | | |
| | Component (C) | (C-1) | 100 | 100 | 100 | | 100 |
| | | (C-4) | | | | 100 | |
| | Component (D) | (D-2) | 0.5 | 0.5 | 1 | 2 | 1 |
| | Component (P) | (P-1) | 0.1 | 0.3 | 1 | 0.5 | 0.5 |
| | Component (R) | (R-1) | 0.1 | 0.1 | 0.1 | 0.1 | 0.1 |
| | Component (S) | (S-1) | 0.2 | 0.25 | 0.5 | 0.25 | 0.25 |
| | | (S-2) | 0.2 | 0.25 | 0.1 | 0.25 | 0.1 |
| | Component (T) | (T-1) | 0.01 | 0.01 | 0.01 | 0.01 | 0.01 |
| | Component (U) | (U-1) | 0.005 | 0.025 | 0.01 | 0.01 | 0.01 |
| | Component (V) | (V-1) | | | | | 0.1 |
| | Component (W) | (W-1) | | | | | 5 |
| | Molar Ratio (B)/(A) | | 1.2 | 0.6 | 1.3 | 1.5 | 0.6 |
| Evaluation (6 h) | In air | Gelling Time | 6 min 15 sec | 15 min 20 sec | 18 min 10 sec | 30 min 45 sec | 17 min 15 sec |
| | | Curing Time | 12 min 20 sec | 22 min 40 sec | 24 min 55 sec | 42 min 15 sec | 25 min 30 sec |
| | | Curing Temperature (° C.) | 78.5 | 81.4 | 68.4 | 88.8 | 84.2 |
| | | Adhesion Strength (N/mm$^2$) | 2.2 | 2.4 | 2.2 | 2.6 | 2.0 |
| | | Fracture Type | Substrate Fracture | Substrate Fracture | Substrate Fracture | Substrate Fracture | Substrate Fracture |
| | In wet state | Adhesion Strength (N/mm$^2$) | 1.5 | 2.1 | 2 | 2.2 | 2.1 |
| | | Fracture Type | Substrate Fracture | Substrate Fracture | Substrate Fracture | Substrate Fracture | Substrate Fracture |
| | In water | Adhesion Strength (N/mm$^2$) | 1.1 | 1.4 | 1.5 | 1.7 | 1.9 |
| | | Fracture Type | Substrate/ Interfacial | Substrate/ Interfacial | Substrate/ Interfacial | Substrate Fracture | Substrate Fracture |

TABLE 9-continued

|  |  |  | Example | | | | |
|---|---|---|---|---|---|---|---|
|  |  |  | 41 | 42 | 43 | 44 | 45 |
|  | Resin Composition |  | 37 | 38 | 39 | 40 | 41 |
| Mixing Amount (part by mass) | Component (A) | (A1-1) (A1-3) | 0.08 | 0.08 | 0.08 | 0.08 | 0.08 |
|  | Component (B) | (B1-1) (B1-3) | 0.25 | 0.25 | 0.25 | 0.5 | 0.5 |
|  | Component (C) | (C-1) (C-4) | 100 | 100 | 100 | 100 | 100 |
|  | Component (D) | (D-2) | 1 | 1 | 1 | 1 | 1 |
|  | Component (P) | (P-1) | 0.5 | 1 | 1 | 2 | 2 |
|  | Component (R) | (R-1) | 0.1 | 0.1 | 0.1 | 0.1 | 0.1 |
|  | Component (S) | (S-1) | 0.25 | 0.25 | 0.25 | 0.25 | 0.25 |
|  |  | (S-2) | 0.1 | 0.25 | 0.25 | 0.5 | 0.5 |
|  | Component (T) | (T-1) | 0.01 | 0.01 | 0.01 | 0.01 | 0.01 |
|  | Component (U) | (U-1) | 0.025 | 0.01 | 0.025 | 0.02 | 0.03 |
|  | Component (V) | (V-1) | 0.5 | 0.2 | 1 | 0.3 | 3 |
|  | Component (W) | (W-1) | 5 | 10 | 10 | 30 | 30 |
|  | Molar Ratio (B)/(A) |  | 0.6 | 0.6 | 0.6 | 1.2 | 1.2 |
| Evaluation (6 h) | In air | Gelling Time | 18 min 10 sec | 19 min 15 sec | 17 min 20 sec | 22 min 10 sec | 19 min 20 sec |
|  |  | Curing Time | 24 min 40 sec | 26 min 20 sec | 25 min 10 sec | 27 min 30 sec | 26 min 05 sec |
|  |  | Curing Temperature (° C.) | 85.3 | 84.7 | 83.2 | 85.9 | 84.3 |
|  |  | Adhesion Strength (N/mm$^2$) | 2.1 | 2.6 | 2.8 | 3.1 | 2.8 |
|  |  | Fracture Type | Substrate Fracture | Substrate Fracture | Substrate Fracture | Substrate Fracture | Substrate Fracture |
|  | In wet state | Adhesion Strength (N/mm$^2$) | 2 | 2.5 | 2.7 | 2.7 | 2.6 |
|  |  | Fracture Type | Substrate Fracture | Substrate Fracture | Substrate Fracture | Substrate Fracture | Substrate Fracture |
|  | In water | Adhesion Strength (N/mm$^2$) | 1.8 | 2.2 | 2.1 | 2.2 | 2.4 |
|  |  | Fracture Type | Substrate Fracture | Substrate Fracture | Substrate Fracture | Substrate Fracture | Substrate Fracture |

TABLE 10

|  |  |  | Comparative Example | | | | | |
|---|---|---|---|---|---|---|---|---|
|  |  |  | 20 | 21 | 22 | 23 | 24 | 25 |
|  | Resin Composition |  | 42 | 43 | 44 | 45 | — | — |
| Mixing Amount (part by mass) | Component (A) | (A1-1) | 0.04 |  | 0.04 | 0.04 |  |  |
|  |  | (A1-3) |  | 0.03 |  |  |  |  |
|  | Component (B') | (B'-1) | 0.25 | 0.25 |  |  |  |  |
|  |  | (B'-2) |  |  | 0.2 |  |  |  |
|  | Component (C) | (C-1) | 100 | 100 | 100 | 100 |  |  |
|  | Component (D) | (D-1) |  | 1 | 1 | 1 |  |  |
|  |  | (D-2) | 0.5 |  |  |  |  |  |
|  | Component (P) | (P-1) | 0.3 | 0.3 | 0.3 | 0.3 |  |  |
|  | Component (R) | (R-1) | 0.1 | 0.1 | 0.1 | 0.1 |  |  |
|  | Component (S) | (S-1) | 0.25 | 0.25 | 0.25 | 0.25 |  |  |
|  |  | (S-2) | 0.25 | 0.25 | 0.25 | 0.25 |  |  |
|  | Component (T) | (T-1) | 0.01 | 0.01 | 0.01 | 0.01 |  |  |
|  | Component (U) | (U-1) | 0.005 | 0.005 | 0.005 | 0.005 |  |  |
| Underwater Adhesive (I) (part by mass) | Base Agent |  |  |  |  |  | 100 |  |
|  | Hardener |  |  |  |  |  | 100 |  |
| Underwater Adhesive (II) (part by mass) | Base Agent |  |  |  |  |  |  | 100 |
|  | Hardener |  |  |  |  |  |  | 100 |
| Evaluation (6 h) | In air | Gelling Time | 6 min 15 sec | 33 min 25 sec | 17 min 25 sec | 13 min 25 sec |  |  |
|  |  | Curing Time | 12 min 20 sec | 40 min 25 sec | 29 min 40 sec | 20 min 40 sec |  |  |
|  |  | Curing Temperature (° C.) | 78.5 | 55.9 | 78.9 | 84.8 |  |  |
|  |  | Adhesion Strength (N/mm$^2$) | 2.2 | 1.8 | 1.7 | 2.1 | 0.7 | 0.8 |
|  |  | Fracture Type | Substrate fracture | Interfacial/ Substrate | Interfacial/ Substrate | Substrate fracture | Cohesion Fracture | Cohesion Fracture |

TABLE 10-continued

|  |  | Comparative Example | | | | | |
|---|---|---|---|---|---|---|---|
|  |  | 20 | 21 | 22 | 23 | 24 | 25 |
| In wet state | Adhesion Strength (N/mm$^2$) | 1.5 | 1.5 | 1.4 | 1.5 | 0.5 | 0.7 |
|  | Fracture Type | Substrate fracture | Interfacial Fracture | Interfacial Fracture | Interfacial Fracture | Cohesion Fracture | Cohesion Fracture |
| In water | Adhesion Strength (N/mm$^2$) | 1.1 | Not adhered | Not adhered | 1.1 | 0.9 | 0.8 |
|  | Fracture Type | Substrate/ Interfacial | Cohesion Fracture | Cohesion Fracture | Not Adhered | Cohesion Fracture | Cohesion Fracture |

As seen from the results in Tables 9 and 10, in Examples 36 to 45, the curing reaction proceeded with no problem and the adhesion strength was excellent in any of the tests in water, in seawater, and in a wet state. In addition, a further higher adhesion strength was obtained by the additional use of a surfactant, a wetting dispersant and a polyisocyanate compound.

On the other hand, in Comparative Examples 20 to 23, the adhesion strength was acceptable in a dry state. In a severe state from a wet state to in water, the adhesion strength lowered and the sample did not adhere or did not cure in some cases.

Further, in Comparative Examples 24 and 25, the cohesion fracture or the interfacial fracture occurred in any of the tests in a dry state, in a wet state and in water, showing that the materials used were quite unsuitable for rapid curing.

It is evident from the above results that the radical-polymerizable resin composition of the present invention is excellent in curability and adhesion.

Resin Compositions 46 to 49 and 52 to 55

Radical-polymerizable resin compositions 46 to 49 and 52 to 55 were produced in the same manner as in the production of the resin composition 32 except for mixing the components in the mixing amounts shown in Tables 11 and 12 below.

Resin Compositions 50 and 51

Radical-polymerizable resin compositions 50 and 51 were produced in the same manner as in the production of the resin composition 36 except for mixing the components in the mixing amounts shown in Table 11 below.

Examples 46 to 51 and Comparative Examples 26 to 29

Each of the resultant radical-polymerizable resin compositions 36 to 45 was measured for various properties according to the following methods for evaluating the low-temperature curability when aged for 12 h at 5° C. The results are shown in Tables 11 and 12.

Comparative Examples 30 and 31

For comparison, the underwater adhesive as used in Comparative Examples 18 and 19 in place of the radical-polymerizable resin composition was evaluated in the same manner as in the evaluation of the radical-polymerizable resin composition. The results are shown in Table 12.

Measurement of Gelling Time, Curing Time, and Curing Temperature

Each measurement was carried out in the same manner as in Example 1.

Adhesion Strength Test

The adhesion strength test in air (in a dry state), in a wet state and in water was carried out in the same manner as in Example 36 except for conducting in a room controlled at 5° C. and a relative humidity of 50% and aging for 12 h.

TABLE 11

|  |  |  |  | Example | | | | | |
|---|---|---|---|---|---|---|---|---|---|
|  |  |  |  | 46 | 47 | 48 | 49 | 50 | 51 |
|  |  | Resin Composition |  | 46 | 47 | 48 | 49 | 50 | 51 |
| Mixing Amount (part by mass) | Component (A) | (A1-1) |  | 0.16 | 0.2 |  |  | 0.16 | 0.16 |
|  |  | (A1-3) |  |  |  | 0.12 | 0.15 |  |  |
|  | Component (B) | (B1-1) |  | 1.25 |  | 1 | 1.5 | 1 | 1.5 |
|  |  | (B1-3) |  |  | 1 |  |  |  |  |
|  | Component (C) | (C-1) |  | 100 | 100 |  |  | 100 | 100 |
|  |  | (C-4) |  |  |  | 100 | 100 |  |  |
|  | Component (D) | (D-2) |  | 2.5 | 3 | 4 | 6 | 3 | 2 |
|  | Component (P) | (P-1) |  | 1.5 | 2 | 0.5 | 2 | 1 | 2 |
|  | Component (R) | (R-1) |  | 0.2 | 0.2 | 0.3 | 0.3 | 0.1 | 0.1 |
|  | Component (S) | (S-1) |  | 0.25 | 0.5 | 0.5 | 0.5 | 1 | 1 |
|  |  | (S-2) |  | 0.25 | 0.5 | 1 | 1.5 | 1 | 1 |
|  | Component (T) | (T-1) |  | 0.005 | 0.005 | 0.005 | 0.005 | 0.01 | 0.01 |
|  | Component (U) | (U-1) |  |  | 0.005 | 0.005 | 0.01 | 0.025 | 0.01 | 0.02 |
|  | Component (V) | (V-1) |  |  |  | 0.01 | 0.025 | 0.3 | 1 |
|  | Component (W) | (W-1) |  |  |  |  |  | 10 | 30 |
|  | Molar Ratio (B)/(A) |  |  | 1.5 | 0.5 | 1.3 | 1.0 | 1.2 | 1.8 |
| Evaluation (5° C., 12 h) | In air | Gelling Time |  | 19 min 30 sec | 91 min 55 sec | 58 min 15 sec | 62 min 25 sec | 51 min 45 sec | 64 min 15 sec |
|  |  | Curing Time |  | 27 min 00 sec | 104 min 00 sec | 67 min 40 sec | 72 min 25 sec | 65 min 10 sec | 77 min 10 sec |
|  |  | Curing Temperature (° C.) |  | 78.4 | 71.5 | 81.9 | 91.4 | 78.9 | 75.9 |

TABLE 11-continued

|  |  |  | Example | | | | | |
|---|---|---|---|---|---|---|---|---|
|  |  |  | 46 | 47 | 48 | 49 | 50 | 51 |
|  |  | Adhesion Strength (N/mm$^2$) | 2.1 | 2.4 | 2.7 | 2.4 | 2.8 | 3.0 |
|  |  | Fracture Type | Substrate Fracture | Substrate Fracture | Substrate Fracture | Substrate Fracture | Substrate Fracture | Substrate Fracture |
| In wet state |  | Adhesion Strength (N/mm$^2$) | 1.7 | 1.6 | 2.6 | 2.2 | 2.5 | 2.9 |
|  |  | Fracture Type | Substrate/ Interfacial | Substrate/ Interfacial | Substrate Fracture | Substrate Fracture | Substrate Fracture | Substrate Fracture |
| In water |  | Adhesion Strength (N/mm$^2$) | 1.4 | 1.6 | 2.1 | 1.5 | 2.7 | 1.5 |
|  |  | Fracture Type | Substrate/ Interfacial | Substrate/ Interfacial | Substrate Fracture | Substrate/ Interfacial | Substrate Fracture | Interfacial Fracture |

TABLE 12

|  |  |  | Comparative Example | | | | | |
|---|---|---|---|---|---|---|---|---|
|  |  |  | 26 | 27 | 28 | 29 | 30 | 31 |
|  | Resin Composition |  | 52 | 53 | 54 | 55 | — | — |
| Mixing Amount (part by mass) | Component (A) | (A1-1) | 0.16 |  | 0.16 | 0.2 |  |  |
|  |  | (A1-3) |  | 0.15 |  |  |  |  |
|  | Component (B') | (B'-1) | 1 | 2 |  |  |  |  |
|  |  | (B'-2) |  |  | 1.5 |  |  |  |
|  | Component (C) | (C-1) | 100 | 100 | 100 | 100 |  |  |
|  | Component (D) | (D-1) |  | 3.5 | 3 | 4 |  |  |
|  |  | (D-2) | 4 |  |  |  |  |  |
|  | Component (P) | (P-1) | 1 | 1.5 | 1.5 | 1.5 |  |  |
|  | Component (R) | (R-1) | 0.1 | 0.1 | 0.1 | 0.3 |  |  |
|  | Component (S) | (S-1) | 1 | 1 | 1 | 0.5 |  |  |
|  |  | (S-2) | 1 | 1 | 1 | 0.5 |  |  |
|  | Component (T) | (T-1) | 0.02 | 0.01 | 0.01 | 0.01 |  |  |
|  | Component (U) | (U-1) | 0.01 | 0.005 | 0.005 | 0.005 |  |  |
| Underwater Adhesive (I) (part by mass) | Base Agent |  |  |  |  |  | 100 |  |
|  | Hardener |  |  |  |  |  | 100 |  |
| Underwater Adhesive (II) (part by mass) | Base Agent |  |  |  |  |  |  | 100 |
|  | Hardener |  |  |  |  |  |  | 100 |
| Evaluation (5° C., 12 h) | In air | Gelling Time | 17 min 40 sec | 35 min 50 sec | 67 min 30 sec | 92 min 00 sec |  |  |
|  |  | Curing Time | 34 min 15 sec | 49 min 20 sec | 78 min 05 sec | 118 min 40 sec |  |  |
|  |  | Curing Temperature (° C.) | 59.7 | 70.7 | 65 | 45.8 |  |  |
|  |  | Adhesion Strength (N/mm$^2$) | 1.4 | 1.5 | 1.9 | 1.3 | Uncured | Uncured |
|  |  | Fracture Type | Substrate fracture | Interfacial/ Substrate | Interfacial/ Substrate | Interfacial/ Substrate | Cohesion Fracture | Cohesion Fracture |
|  | In wet state | Adhesion Strength (N/mm$^2$) | 1 | 0.9 | 0.8 | 0.7 | Uncured | Uncured |
|  |  | Fracture Type | Substrate/ Interfacial | Interfacial Fracture | Interfacial Fracture | Interfacial Fracture | Cohesion Fracture | Cohesion Fracture |
|  | In water | Adhesion Strength (N/mm$^2$) | 0.4 | 0.3 | 0.4 | Uncured | Uncured | Uncured |
|  |  | Fracture Type | Interfacial Fracture | Cohesion Fracture | Cohesion Fracture | Not adhered | Cohesion Fracture | Cohesion Fracture |

As seen from the results in Tables 11 and 12, in Examples 46 to 51, the curing reaction proceeded with no problem and the adhesion strength was excellent even in a low-temperature environment as low as 5° C. in any of the tests in water, in seawater, and in a wet state. In addition, a further higher adhesion strength was obtained by the additional use of a surfactant, a wetting dispersant and a polyisocyanate compound.

On the other hand, in Comparative Examples 26 to 29, the adhesion strength was low or the composition was not cured in a low temperature as low as 5° C. in any of the tests in a dry state, in a wet state, and in water.

From the above, it can be seen that a strong curing function was obtained by forming a complex structure between the specific metal-containing compound (A) and the specific thiol compound (B), this being effective for obtaining a sufficient adhesion strength in such a low-temperature environment.

In Comparative Examples 30 and 31, the cohesion fracture occurred and the curing reaction did not occur at all in any of the tests in a dry state, in a wet state, and in water.

From the above results, the cured product of the radical-polymerizable resin composition of the present invention is excellent in curability and adhesion.

Resin Composition 56

A photoradical-polymerizable resin composition 56 was prepared according to the following process.

Step 1

A liquid mixture (i) was prepared by dissolving 0.1 parts by mass of wax (R-1) heated at about 50° C. in 100 parts by mass of the radical-polymerizable compound (C-1), adding 0.08 parts by mass of the metal soap (A1-3) thereto, and stirring the resultant mixture well at room temperature (25° C.).

Step 2-1

The liquid mixture (i) was well stirred with 0.3 parts of the secondary thiol compound (B1-1) to prepare a liquid mixture (ii).

Step 2-2

As a polymerization inhibitor, 0.005 parts by mass of phenothiazine (T-1) and 0.01 parts by mass of 4-tert-butyl-catechol (T-2) were added to the liquid mixture (ii), and the resultant mixture was well stirred at room temperature (25° C.) to prepare a liquid mixture (iii).

Step 2-3

A liquid mixture (iv) was prepared by adding 0.3 parts by mass of the wetting dispersant (S-1) and 0.5 parts by mass of the wetting dispersant (S-2) to the liquid mixture (iii).

Step 3'

To the mixture (iv), 0.3 parts by mass of the photoradical polymerization initiator (D-3) and 0.2 parts by mass of the photoradical polymerization initiator (D-5) were added and the mixture was stirred to obtain a photoradical-polymerizable resin composition 56.

Resin Compositions 57 to 65

Each of radical-polymerizable resin compositions 57 to 65 was produced in the same manner as in the production of the resin composition 56 except for mixing the components in the mixing amounts shown in Tables 13 and 14 below.

Examples 52 to 57 and Comparative Examples 32 to 35

The resultant radical-polymerizable resin compositions 56 to 65 were evaluated for the rapid curability (aging time: 6 h) according to the methods mentioned below. The results are shown in Tables 13 and 14.

Adhesion Strength Test in Air (Dry State)

As a substrate, a concrete ordinary slab (60 mm×300 mm×300 mm) specified in JIS A 5371:2010 was prepared. The brittle matter and the powdery matter on the surface to be used in the adhesion test were fully removed, and the surface was wiped with a soft clean cloth. By using a rubber plate having a width of 2 mm and a thickness of 1 mm, a formwork was formed on the concrete ordinary slab according to 7.10 of JIS A 6909:2014.

Next, in a dark room, glass fibers WR-570C (roving cloth manufactured by Nitto Boseki Co., Ltd.) cut into 300 mm×300 mm were superposed into a 3-ply layer such that the final fiber content was 30% by weight and placed on the concrete ordinary slab. Then, the sample of the photoradical-polymerizable composition 46 was applied thereonto and spread by a roller or the like so as to allow the layer impregnated with the sample to have a thickness of about 1 mm.

Then, the impregnated composition was photocured by irradiating it for 20 min at an irradiation energy of 10 mW/cm$^2$ (380 to 450 nm) by using a metal halide lamp (400 W projector). Subsequently, the irradiated product was aged at 25° C. and a humidity of 50% for 6 h to obtain a test piece.

The test piece was measured for the adhesion strength by the same method as in Example 36.

Adhesion Strength Test in Wet State

As a substrate, a concrete ordinary slab was prepared in the same manner as in the adhesion strength test in air except for immersing the slab in water for 24 h or longer so as to fully absorb water.

Next, a sample of the photoradical-polymerizable resin composition was prepared in the same manner as in the adhesion strength test in air. Then, the concrete ordinary slab was immersed in water for 24 h or more so that the top surface of the slab was at about 5 cm depth below the water, while referring to the method shown in FIG. 8 of the test procedure after immersion in water in 7.10 of JIS A 6909: 2014. Thereafter, just before applying the resin composition, the top surface of the slab was exposed at 5 mm height above the water and the surface was wiped with a dry cloth to remove bleeding water.

Next, in a dark room, glass fibers WR-570C (roving cloth manufactured by Nitto Boseki Co., Ltd.) cut into 300 mm×300 mm were superposed into a 3-ply layer such that the final fiber content was 30% by weight and placed on the concrete ordinary slab. Then, the sample of the photoradical-polymerizable composition 46 was applied thereon and spread by a roller or the like so as to allow the layer impregnated with the sample to have a thickness of about 1 mm.

Then, the impregnated composition was photocured by irradiating it for 20 min at an irradiation energy of 10 mW/cm$^2$ (380 to 450 nm) by using a metal halide lamp (400 W projector). Subsequently, the irradiated product was aged at 25° C. and a humidity of 50% for 6 h to obtain a test piece.

Water was adequately added to prevent the water level from being lowered with the lapse of time. The adhesion strength of the test piece was measured and evaluated in the same manner as in the adhesion strength test in air.

TABLE 13

|  |  |  | Example | | |
|---|---|---|---|---|---|
|  |  |  | 52 | 53 | 54 |
| Resin Composition | | | 56 | 57 | 58 |
| Mixing Amount (part by mass) | Component (A) | (A1-1) | 0.08 | | 0.08 |
|  |  | (A1-3) | | 0.08 | |
|  | Component (B) | (B1-1) | 0.3 | 0.3 | 0.3 |
|  | Component (C) | (C-1) | 100 | 100 | 100 |
|  | Component (D) | (D-3) | 0.3 | 0.3 | |
|  |  | (D-4) | | | 0.4 |
|  |  | (D-5) | 0.2 | 0.2 | |

TABLE 13-continued

|  |  | Example | | |
|---|---|---|---|---|
| Component (R) | (R-1) | 0.1 | 0.1 | 0.1 |
| Component (T) | (T-1) | 0.005 | 0.005 | 0.005 |
|  | (T-2) | 0.01 | 0.01 | 0.01 |
| Component (S) | (S-1) | 0.3 | 0.3 | 0.3 |
|  | (S-2) | 0.5 | 0.5 | 0.5 |
| Fiber | Kind of Fiber | Glass Fibers | Glass Fibers | Glass Fibers |
|  | Number of Layers | 3 plies | 3 plies | 3 plies |
|  | Fiber Content | 30 wt % | 30 wt % | 30 wt % |
|  | Sample Thickness | 1 mm | 1 mm | 1 mm |
| Light Source | Light Source | Metal Halide Lamp | Metal Halide Lamp | Sunlight |
|  | Irradiation Energy | 10 mW/cm$^2$ | 10 mW/cm$^2$ | 3 mW/cm$^2$ |
|  | Irradiation Time | 20 min | 20 min | 60 min |
| In air | Adhesion Strength after 6 h (N/mm$^2$) | 3.5 | 3.2 | 3.3 |
|  | Fracture Type | Substrate Fracture | Substrate Fracture | Substrate Fracture |
| Wet | Adhesion Strength after 6 h (N/mm$^2$) | 3.0 | 2.6 | 2.9 |
|  | Fracture Type | Substrate Fracture | Substrate Fracture | Substrate Fracture |

|  |  | Example | | |
|---|---|---|---|---|
|  |  | 55 | 56 | 57 |
| Resin Composition |  | 59 | 60 | 61 |
| Mixing Amount (part by mass) | Component (A) (A1-1) |  | 0.08 |  |
|  | (A1-3) | 0.08 |  | 0.08 |
|  | Component (B) (B1-1) | 0.3 | 0.3 | 0.3 |
|  | Component (C) (C-1) | 100 | 100 | 100 |
|  | Component (D) (D-3) |  | 0.3 | 0.3 |
|  | (D-4) | 0.4 |  |  |
|  | (D-5) |  | 0.2 | 0.2 |
|  | Component (R) (R-1) | 0.1 | 0.1 | 0.1 |
|  | Component (T) (T-1) | 0.005 | 0.005 | 0.005 |
|  | (T-2) | 0.01 | 0.01 | 0.01 |
|  | Component (S) (S-1) | 0.3 | 0.3 | 0.3 |
|  | (S-2) | 0.5 | 0.5 | 0.5 |
| Fiber | Kind of Fiber | Glass Fibers | Glass Fibers | Glass Fibers |
|  | Number of Layers | 3 plies | 5 plies | 10 plies |
|  | Fiber Content | 30 wt % | 30 wt % | 30 wt % |
|  | Sample Thickness | 1 mm | 2 mm | 3 mm |
| Light Source | Light Source | Sunlight | Metal Halide Lamp | Metal Halide Lamp |
|  | Irradiation Energy | 3 mW/cm$^2$ | 10 mW/cm$^2$ | 10 mW/cm$^2$ |
|  | Irradiation Time | 60 min | 20 min | 30 min |
| In air | Adhesion Strength after 6 h (N/mm$^2$) | 2.6 | 3.8 | 4.1 |
|  | Fracture Type | Substrate Fracture | Substrate Fracture | Substrate Fracture |
| Wet | Adhesion Strength after 6 h (N/mm$^2$) | 2.5 | 2.8 | 2.9 |
|  | Fracture Type | Substrate Fracture | Substrate Fracture | Substrate Fracture |

TABLE 14

|  |  | Comparative Example | | | |
|---|---|---|---|---|---|
|  |  | 32 | 33 | 34 | 35 |
| Resin Composition |  | 62 | 63 | 64 | 65 |
| Mixing Amount (part by mass) | Component (A) (A1-1) | 0.08 | 0.08 | 0.08 | 0.08 |
|  | (A1-3) |  |  |  |  |
|  | Component (B) (B'-1) |  | 0.3 |  |  |
|  | (B'-2) |  |  | 0.3 |  |
|  | Component (C) (C-1) | 100 | 100 | 100 | 100 |
|  | Component (D) (D-2) |  |  |  |  |
|  | (D-3) | 0.3 | 0.3 | 0.3 | 0.3 |
|  | (D-4) |  |  |  |  |
|  | (D-5) | 0.2 | 0.2 | 0.2 | 0.2 |

TABLE 14-continued

| | | | Comparative Example | | | |
|---|---|---|---|---|---|---|
| | | | 32 | 33 | 34 | 35 |
| | Component (E) | (E-1) | | | | 0.2 |
| | Component (T) | (T-1) | 0.005 | 0.005 | 0.005 | 0.005 |
| | | (T-2) | 0.01 | 0.01 | 0.01 | 0.01 |
| | Component (S) | (S-1) | 0.3 | 0.3 | 0.3 | 0.3 |
| | | (S-2) | 0.5 | 0.5 | 0.5 | 0.5 |
| Fiber Information | Kind of Fiber | | Glass Fibers | Glass Fibers | Glass Fibers | Glass Fibers |
| | Number of Layers | | 3 plies | 3 plies | 3 plies | 3 plies |
| | Fiber Content | | 30 wt % | 30 wt % | 30 wt % | 30 wt % |
| | Sample Thickness | | 1 mm | 1 mm | 1 mm | 1 mm |
| Light Source | Light Source | | Metal Halide Lamp | Metal Halide Lamp | Metal Halide Lamp | Metal Halide Lamp |
| | Irradiation Energy | | 10 mW/cm$^2$ | 10 mW/cm$^2$ | 10 mW/cm$^2$ | 10 mW/cm$^2$ |
| | Irradiation Time | | 20 min | 20 min | 20 min | 20 min |
| In air | Adhesion Strength after 6 h (N/mm$^2$) | | 3.7 | 1.8 | 2.1 | 3.8 |
| | Fracture Type | | Base Fracture | Base Fracture | Base Fracture | Base Fracture |
| Wet | Adhesion Strength after 6 h (N/mm$^2$) | | 0.0 | 0.0 | 0.0 | 0.4 |
| | Fracture Type | | Uncured/Cohesion Fracture | Uncured/Cohesion Fracture | Uncured/Cohesion Fracture | Interfacial Fracture |

As seen from Tables 13 and 14, in Examples 52 to 57 using a photoinitiator, the cured product adhered securely to the concrete ordinary slab both in air and in a wet state regardless of the type of light, i.e., metal halide lamp or sunlight, and regardless of the irradiation energy, and a good adhesion was obtained. In addition, when the glass fibers were made into multiply structures of 5 plies and 10 plies, good adhesion was also obtained.

In Comparative Examples 32 to 35, the composition was cured without using a secondary or tertiary thiol. Comparative Examples 33 to 34 using a primary thiol showed the adhesion strength not so high. In Comparative Example 32, the composition was cured in a wet state but the fraction occurred in the interface between the cured product and the concrete ordinary slab. In Comparative Examples 33 to 34, the resin composition peeled from fibers in some samples during the adhesion test, showing that the curing was incomplete. In Comparative Example 35, the composition cured, but the adhesion force was poor.

Resin Composition 1 for Primer Use

A photoradical-polymerizable resin composition 1 for primer use was prepared according to the following process.

Step 1

A liquid mixture (i) was prepare by dissolving 0.1 parts by mass of wax (R-1) heated at about 50° C. in 100 parts by mass of the radical-polymerizable compound (C-1), adding 0.08 parts by mass of the metal soap (A1-3) thereto, and stirring the resultant mixture well at room temperature (25° C.).

Step 2-1

The liquid mixture (i) was well stirred with 0.3 parts by mass of the secondary thiol compound (B1-1) to prepare a liquid mixture (ii).

Step 2-2

After adding, as a polymerization inhibitor, 0.005 parts by mass of phenothiazine (T-1) and 0.01 parts by mass of 4-tert-butylcatechol (T-2), the liquid mixture (ii) was well stirred at room temperature (25° C.) to prepare a liquid mixture (iii).

Step 2-3

To the mixture (iii), 0.3 parts by mass of the wetting dispersant (S-1) and 0.5 parts by mass of the wetting dispersant (S-2) were added to prepare a liquid mixture (iv).

Step 3'

After adding 0.3 parts by mass of the photoradical polymerization initiator (D-3) and 0.2 parts by mass of the photoradical polymerization initiator (D-5), the liquid mixture (iv) was stirred to obtain the photoradical-polymerizable resin composition 1 for primer use.

Resin Composition 2 for Primer Use

A thermal radical-polymerizable resin composition 2 for primer use was prepared according to the following process.

Step 1

After adding 0.08 parts by mass of the metal soap (A1-3), 100 parts by mass of the radical-polymerizable compound (C-1) was well stirred at room temperature (25° C.) to prepare a liquid mixture (i).

Step 2-1

The liquid mixture (i) was well stirred with 0.3 parts by mass of the secondary thiol compound (B1-1) to prepare a liquid mixture (ii).

Step 2-2

After adding, as a polymerization inhibitor, 0.005 parts by mass of phenothiazine (T-1) and 0.01 parts by mass of 4-tert-butylcatechol (T-2), the liquid mixture (ii) was well stirred at room temperature (25° C.) to prepare a liquid mixture (iii).

Step 2-3

To the mixture (iii), 0.3 parts by mass of the wetting dispersant (S-1) and 0.5 parts by mass of the wetting dispersant (S-2) were added to prepare a liquid mixture (iv).

Step 3

After adding 1 part by mass of the thermal radical polymerization initiator (D-2), the liquid mixture (iv) was stirred to obtain the thermal radical-polymerizable resin composition 2 for primer use.

Prepreg Sheet 1

A photoradical-polymerizable prepreg sheet 1 was produced according to the following process.

Step 1

After adding 0.08 parts by mass of the metal soap (A1-3), 100 parts by mass of the radical-polymerizable compound (C-1) was well stirred at room temperature (25° C.) to prepare a liquid mixture (i).

Step 2-1

The liquid mixture (i) was well stirred with 0.3 parts by mass of the secondary thiol compound (B1-1) to prepare a liquid mixture (ii).

Step 2-2

After adding, as a polymerization inhibitor, 0.005 parts by mass of phenothiazine (T-1) and 0.01 parts by mass of 4-tert-butylcatechol (T-2), the liquid mixture (ii) was well stirred at room temperature (25° C.) to prepare a liquid mixture (iii).

Step 2-3

To the mixture (iii), 0.3 parts by mass of the wetting dispersant (5-1) and 0.5 parts by mass of the wetting dispersant (S-2) were added to prepare a liquid mixture (iv).

Step 3'

After adding 0.3 parts by mass of the photoradical polymerization initiator (D-3) and 0.2 parts by mass of the photoradical polymerization initiator (D-5), the mixture (iv) was stirred to obtain a photoradical-polymerizable resin composition.

Step 4

Glass fibers of 300 mm×300 mm were impregnated with the photoradical-polymerizable resin composition so as to have a fiber content of 15% by weight and coated with a PET film, which was then irradiated with light of 380 to 1,200 nm of a metal halide lamp from a distance of 30 cm for 3 min to prepare a B-stage photoradical-polymerizable prepreg sheet 1.

The resin compositions for primer use and the prepreg sheet were measure for various properties by the methods mentioned below for evaluating the rapid curability after the aging time of 6 h. The results are shown in Table 15.

Example 58

Adhesion Strength Test in Air (Dry State)

As a substrate, a concrete ordinary slab (60 mm×300 mm×300 mm) specified in JIS A 5371:2010 was prepared. The brittle matter and the powdery matter on the surface to be used in the adhesion test were fully removed, and the surface was wiped with a soft clean cloth. By using a rubber plate having a width of 2 mm and a thickness of 1 mm, a formwork was formed on the concrete ordinary slab according to 7.10 of JIS A 6909:2014.

Next, in a dark room, the photoradical-polymerizable resin composition 1 for primer use was applied onto the concrete ordinary slab by a spatula, a roller or the like in an amount of 200 g/m².

Further, one piece of the photoradical-polymerizable prepreg sheet 1 having the PET film thereon was superposed on the photoradical-polymerizable resin composition 1 for primer use.

Then, light from a metal halide lamp (400 W projector) was irradiated for 20 min at an irradiation energy of 10 mW/cm² (380 to 450 nm) for photocuring.

Thereafter, the irradiated product was aged in a chamber controlled at 25° C. and a humidity of 50% for 6 h to prepare a test piece. The test piece was evaluated in the manner described in Example 36.

Adhesion Strength Test in Wet State

As a substrate, a concrete ordinary slab was prepared in the same manner as in the adhesion strength test in air except for immersing the slab in water for 24 h or longer so as to fully absorb water.

Subsequently, the concrete ordinary slab was immersed in water for 24 h or more so that the top surface of the slab was at about 5 cm depth below the water, while referring to the method shown in FIG. 8 of the test procedure after immersion in water in 7.10 of JIS A 6909:2014. Thereafter, just before applying the resin composition, the top surface of the slab was exposed at 5 mm height above the water and just before applying the primer, the surface was wiped with a dry cloth to remove bleeding water.

Then, in the same manner as in the adhesion strength test in air, the resin composition 1 for primer use was applied, one piece of the prepreg sheet 1 was superposed, photocured, and aged to prepare a test piece, which was then evaluated. Water was adequately added to prevent the water level from being lowered with the lapse of time.

Example 59

Adhesion Strength Test in Air (Dry State)

In the same manner as in Example 58, a concrete ordinary slab was processed and a formwork was formed.

Next, the thermal radical-polymerizable resin composition 2 for primer use was applied onto the concrete ordinary slab by a spatula, a roller or the like in an amount of 200 g/m². After aging for about 2 h to allow the reaction of the resin composition 2 for primer use to initiate, the slab was processed in the next step.

Next, in the same manner as in Example 58, one piece of the prepreg sheet 1 was superposed, photocured, and then aged for 6 h to prepare a test piece, which was then evaluated.

Adhesion Strength Test in Wet State

In the same manner as in Example 58, a concrete ordinary slab was processed and partly immersed in water, and then, just before coating a primer, the surface of the concrete ordinary slab was wiped with a dry cloth to remove bleeding water.

Next, in the same manner as in the adhesion strength test in air, the thermal radical-polymerizable resin composition 2 for primer use was applied, aged, and one piece of the prepreg sheet 1 was superposed thereon, photocured, and then aged to prepare a test piece, which was then evaluated. Water was adequately added to prevent the water level from being lowered with the lapse of time.

Example 60

Adhesion Strength Test in Air (Dry State)

In the same manner as in Example 59, a formwork was formed, and the resin composition 2 for primer use was applied onto the concrete ordinary slab and aged for about 2 h.

Next, in a dark room, glass fibers WR-570C (roving cloth manufactured by Nitto Boseki Co., Ltd.) cut into 300 mm×300 mm were superposed into a 3-ply layer such that the final fiber content was 30% by weight and placed on the concrete ordinary slab. Then, the sample of the photoradical-polymerizable composition 48 was applied thereonto and spread by a roller or the like so as to allow the layer impregnated with the sample to have a thickness of about 1 mm.

Then, in the same manner as in Example 59, the composition was cured and aged to prepare a test piece, which was then evaluated.

Adhesion Strength Test in Wet State

In the same manner as in Example 59, a concrete ordinary slab was processed and partly immersed in water, and then, the surface of the concrete ordinary slab was wiped with a dry cloth to remove bleeding water.

Next, in the same manner as in the adhesion strength test in air, a test piece was prepared by applying the thermal radical-polymerizable resin composition 2 for primer use, aging, impregnating the glass fibers with the photoradical-polymerizable resin composition 58, curing, and aging. The obtained test piece was then evaluated. Water was adequately added to prevent the water level from being lowered with the lapse of time.

Example 61

Adhesion Strength Test in Air (Dry State)

In the same manner as in Example 58, a formwork was formed and the photoradical-polymerizable resin composition 1 for primer use was applied.

Next, in the same manner as in Example 60, a test piece was prepared by impregnating the glass fibers with the photoradical-polymerizable resin composition 58, curing, and aging. The obtained test piece was then evaluated.

Adhesion Strength Test in Wet State

In the same manner as in Example 59, a concrete ordinary slab was processed and partly immersed in water, and then, the surface of the concrete ordinary slab was wiped with a dry cloth to remove bleeding water.

Next, in the same manner as in the adhesion strength test in air, a test piece was prepared by applying the photoradical-polymerizable resin composition 1 for primer use, impregnating the glass fibers with the photoradical-polymerizable resin composition 58, curing, and aging. The obtained test piece was then evaluated. Water was adequately added to prevent the water level from being lowered with the lapse of time.

usable as a primer or a prepreg with no problem. By photocuring the primer and the prepreg, a cured product having an excellent adhesion force can be produced not only under a dry condition in air but also under a wet condition.

The materials used in Examples 62 to 88 and Comparative Examples 36 to 60 are as mentioned below.

Metal-Containing Compound (A)

Metal Soap (A1-1)

Cobalt octylate (Hexoate Cobalt manufactured by Toei Chemical Industry Co., Ltd., cobalt content: 8% by mass in total amount of product, molecular weight: 345.34)

Metal Soap (A1-2)

Manganese octylate (Hexoate Manganese manufactured by Toei Chemical Industry Co., Ltd., manganese content: 8% by mass in total amount of product, molecular weight: 341.35)

Metal Soap (A1-3)

Copper naphthenate (manufactured by Toei Chemical Industry Co., Ltd., copper content: 5% by mass in total amount of product, molecular weight: 405.9)

Metal Soap (A1-4)

Toluene solution of vanadium(III) naphthenate (manufactured by Wako Pure Chemical Industries, Ltd., vanadium content: 2% by mass in total amount of product, molecular weight: 735.63)

Metal Soap (A1-5)

Mineral spirit solution of iron naphthenate (manufactured by Wako Pure Chemical Industries, Ltd., iron content: 5% by mass in total amount of product, molecular weight: 398.2)

β-Diketone Skeleton-Containing Metal Complex (A2-1)

Titanium dibutoxybis(acetylacetonate) (Nacem (registered trademark) Titanium manufactured by Nihon Kagaku Sangyo Co., Ltd., titanium content: 8.8% by mass in total amount of product, molecular weight: 392.31)

Secondary Thiol Compound (B)

Secondary Thiol Compound (B-1)

Difunctional secondary thiol: Karenz MT (registered trademark) BD1 (1,4-bis(3-mercaptobutyryloxy)butane,

TABLE 15

| | | Example | | | |
|---|---|---|---|---|---|
| | | 58 | 59 | 60 | 61 |
| Kind of Resin Composition | Photopolymerizable Primer | ○ | | | ○ |
| | Ordinary Primer | | ○ | ○ | |
| | Photopolymerizable Prepreg Sheet | ○ | ○ | | |
| | Photopolymerizable Resin Composition | | | ○ | ○ |
| Fiber | Type of Fiber | Glass Fibers | Glass Fibers | Glass Fibers | Glass Fibers |
| | Number of Layers | one prepreg sheet | one prepreg sheet | 3 plies | 3 plies |
| | Fiber Content | 15 wt % | 15 wt % | 30 wt % | 30 wt % |
| | Sample Thickness | — | — | 1 mm | 1 mm |
| Light Source | Light Source | Metal Halide Lamp | Metal Halide Lamp | Metal Halide Lamp | Metal Halide Lamp |
| | Irradiation Energy | 10 mW/cm$^2$ | 10 mW/cm$^2$ | 10 mW/cm$^2$ | 10 mW/cm$^2$ |
| | Irradiation Time | 20 min | 20 min | 20 min | 20 min |
| In air | Adhesion Strength after 6 h (N/mm$^2$) | 3.0 | 3.5 | 3.7 | 3.4 |
| | Fracture Type | Substrate Fracture | Substrate Fracture | Substrate Fracture | Substrate Fracture |
| Wet | Adhesion Strength after 6 h (N/mm$^2$) | 2.7 | 3.0 | 3.4 | 3.1 |
| | Fracture Type | Substrate Fracture | Substrate Fracture | Substrate Fracture | Substrate Fracture |

From Examples 58 to 61, it can be seen that the radical-polymerizable resin composition of the present invention is molecular weight: 299.43) manufactured by Showa Denko K.K.

Primary Thiol Compound (B')
  Primary Thiol Compound (B'-1)
    Trifunctional primary thiol: TMTP (trimethylolpropane tris(3-mercaptoproionate)) manufactured by Yodo Kagaku Co., Ltd.
  Primary Thiol Compound (B'-2)
    Tetrafunctional primary thiol: PEMP (pentaerythritol tetrakis(3-mercaptopropionate)) manufactured by SC Organic Chemical Co., Ltd.
Radical-Polymerizable Compound (C)
  Radical-Polymerizable Compound (C-1)
    Non-styrene type vinyl ester resin synthesized in Synthesis Example 1
  Radical-Polymerizable Compound (C-2)
    Non-styrene type vinyl ester resin synthesized in Synthesis Example 2
  Radical-Polymerizable Compound (C-3)
    Non-styrene type vinyl ester resin synthesized in Synthesis Example 3
  Radical-Polymerizable Compound (C-4)
    Non-styrene type vinyl ester resin synthesized in Synthesis Example 4
  Radical-Polymerizable Compound (C-5)
    Styrene-containing vinyl ester resin synthesized in Synthesis Example 5
  Radical-Polymerizable Compound (C-6)
    Srider (registered trademark) NF-470 (non-styrene type vinyl ester resin) manufactured by Showa Denko K.K.
  Radical-Polymerizable Compound (C-7)
    Ripoxy (registered trademark) NC-450 (non-styrene type vinyl ester resin) manufactured by Showa Denko K.K.
Radical Polymerization Initiator (D)
  Radical Polymerization Initiator (D-1)
    Cumene hydroperoxide (CHP): Percumyl H-80 manufactured by NOF Corporation.
  Radical Polymerization Initiator (D-2)
    Curing agent for vinyl ester resin: 328E manufactured by Kayaku Akzo Corporation.
  Radical Polymerization Initiator (D-3)
    Methyl ethyl ketone peroxide: Permek (registered trademark) N manufactured by NOF Corporation.
Curing Accelerator (E)
  Curing Accelerator (E-1)
    Dimethylaniline: DMA manufactured by Tokyo Chemical Industry Co., Ltd.
Filler (F)
  Filler (F-1)
    JIS-certified Portland cement: ordinary cement manufactured by Hokusei Cement Co., Ltd.
  Filler (F-2)
    No. 6 silica sand
  Filler (F-3)
    No. 8 silica sand
  Filler (F-4)
    No. 9 silica sand
Polymerization Inhibitor (G)
  Phenothiazine (G-1)
    Phenothiazine manufactured by Wako Pure Chemical Industries, Ltd.
Curing Retardant (H)
  4H-TEMPO (H-1)
    4-Hydroxy-2,2,6,6-tetramethylpiperidin 1-oxyl free radical (4H-TEMPO): Polystop 7200P (product name) manufactured by Hakuto Co., Ltd.

Other Ingredients
  Wetting Dispersant (1)
    Silicone-type wetting dispersant containing compound represented by formula (U): BYK (registered trademark)-302 manufactured by BYK Corporation.
  Wetting Dispersant (2)
    Silicone-type wetting dispersant containing compound represented by formula (U): BYK (registered trademark)-322 manufactured by BYK Corporation.
  Paraffin Wax
    Paraffin wax (135° F.) manufactured by JX Nippon Oil & Energy Corporation.
  Primer
    Ripoxy (registered trademark) R-806DA manufactured by Showa Denko K.K.
Underwater Adhesive
  Underwater Adhesive (I)
    Epoxy adhesive to be used by mixing the base agent and the hardener in a ratio 1/1 (by mass): underwater bond E380 (gap filling adhesive for underwater/wet surface) manufactured by Konishi Co., Ltd.
  Underwater Adhesive (II)
    Epoxy adhesive to be used by mixing the base agent and the hardener in a ratio 1/1 (by mass): underwater curable filling adhesive Three Bond 2083L manufactured by Three-Bond Co., Ltd.

Synthesis Example 5

Into a 1-L four-neck flask equipped with a stirrer, a reflux condenser, a vapor inlet and a thermometer, 189 g of AER-2603 (bisphenol A-type epoxy resin manufactured by Asahi Kasei Corporation, epoxy equivalent: 189), 0.13 g of methylhydroquinone, and 0.55 g of DMP-30 (2,4,6-tris (dimethylaminomethyl)phenol manufactured by Tokyo Chemical Industry Co., Ltd.) were charged and the temperature was raised to 110° C. After reaching 110° C., 86 g of methacrylic acid (manufactured by Mitsubishi Rayon Co., Ltd.) was added dropwise over about 30 min, and the reaction was allowed to proceed for about 4 h to obtain an ester compound.

As a radical-polymerizable unsaturated monomers, 338 g of dicyclopentenyloxyethyl methacrylate (FA-512MT manufactured by Hitachi Chemical Co., Ltd.) and 35.2 g of phenoxyethyl methacrylate (Light Ester PO manufactured by Kyoeisha Chemical Co., Ltd.), and further as a polymerization inhibitor, 0.35 g of 4-tert-butylcatechol (manufactured by Tokyo Chemical Industry Co., Ltd.) were added to the ester compound to obtain a non-styrene type radical-polymerizable compound (C-1) having a viscosity of 440 mPa·s at 25° C., a solid content of 47% by mass, and a radical-polymerizable unsaturated monomer content of 53% by mass.

Synthesis Example 6

A non-styrene type radical-polymerizable compound (C-2) having a viscosity of 450 mPa·s at 25° C., a solid content of 47% by mass, and a radical-polymerizable unsaturated monomer content of 53% by mass was produced in the same manner as in Synthesis Example 5 except for using 338 g of dicyclopentenyloxyethyl methacrylate as a radical-polymerizable unsaturated monomer and 35.2 g of 2-hydroxyethyl methacrylate as a water-soluble radical-polymerizable unsaturated monomer.

Synthesis Example 7

A non-styrene type radical-polymerizable compound (C-3) having a viscosity of 1102 mPa·s at 25° C., a solid content of 70% by mass, and a radical-polymerizable unsaturated monomer content of 30% by mass was produced in the same manner as in Synthesis Example 5 except for using 118.5 g of dicyclopentenyloxyethyl methacrylate as a radical-polymerizable unsaturated monomer and 23.7 g of 2-hydroxyethyl methacrylate as a water-soluble radical-polymerizable unsaturated monomer.

Synthesis Example 8

A non-styrene type radical-polymerizable compound (C-4) having a viscosity of 183.5 mPa·s at 25° C., a solid content of 35% by mass, and a radical-polymerizable unsaturated monomer content of 65% by mass was produced in the same manner as in Synthesis Example 5 except for using 569.1 g of dicyclopentenyloxyethyl methacrylate as a radical-polymerizable unsaturated monomer and 47.4 g of 2-hydroxyethyl methacrylate as a water-soluble radical-polymerizable unsaturated monomer.

Synthesis Example 9

A styrene-containing radical-polymerizable compound (C-5) having a viscosity of 420 mPa·s at 25° C., a solid content of 50% by mass, and a radical-polymerizable unsaturated monomer content of 50% by mass was produced in the same manner as in Synthesis Example 5 except for using 332 g of styrene monomer as a radical-polymerizable unsaturated monomer.

Example 62

Step 1
After adding 0.08 parts by mass of the metal soap (A1-1), 100 parts by mass of the radical-polymerizable compound (C-1) produced in Synthesis Example 5 was well stirred at room temperature (25° C.) to prepare a liquid mixture (i).
Step 2
The liquid mixture (i) was well stirred with 0.5 parts by mass of the secondary thiol compound (B-1) to prepare a liquid mixture (ii).
Step 3
After mixing the wetting dispersant, the wax, various additives, and various fillers with the liquid mixture (ii) in mixing amounts shown in Table 16, 1 part by mass of the radical polymerization initiator (D-1) was added and the contents were stirred to obtain a repairing material for inorganic structure 1, which was then evaluated according to the methods mentioned below. The results are shown in Table 16. In Tables 16 to 20 and 22 to 25, the repairing material for inorganic structure is shown simply as "repairing material."
The mixing amount of the metal-containing compound (A) in the examples and comparative examples is not the actual amount but is based on the amount of the metal component in the metal-containing compound (A).

Examples 63 to 75 and Comparative Examples 36 to 45

Repairing materials for inorganic structures 2 to 25 were produced in the same manner as in Example 62 except for mixing each component in the mixing amount shown in Tables 16 to 20. The repairing materials for inorganic structures were evaluated according to the methods mentioned below. The results are shown in Tables 16 to 20.

In Comparative Examples 44 and 45, the underwater adhesive was evaluated in the same manner as in the evaluation of the repairing materials for inorganic structures of the present invention except for using the underwater adhesive by following the instructions attached thereto.

Example 76

A repairing material for inorganic structure 26 was produced in the same manner as in Example 57 except for mixing each component in the mixing amount shown in Table 18.
In Example 76, the evaluation was made according to the methods mentioned below after forming a primer layer having a thickness of about 0.2 mm on the substrate to be mentioned below by using the resin composition 8 used in Example 8 and then applying the obtained repairing material for inorganic structure on the primer layer. The results are shown in Table 18.
Evaluation Method
Measurement of Gelling Time, Curing Time and Curing Temperature
Measured in the same manner as in Example 1.
Adhesion Strength Test in Air
The brittle matter and the powdery matter on the surface of a concrete ordinary slab (60×300×300) to be used in the adhesion test were fully removed and the surface was wiped with a soft clean cloth. By using a rubber plate having a width of 2 mm and a thickness of 4 mm, a formwork was formed on the concrete ordinary slab according to 7.10 of JIS A 6909:2014 except for using the above rubber plate.
Next, a sample of the repairing material for inorganic structure for adhesion strength test was prepared according to 7.4 of JIS A 6909:2014. The prepared sample was cast into the formwork, spread by a spatula, a roller and the like into a thickness of about 4 mm, and then aged at 25° C. and a humidity of 50% for a predetermined period of time. Thereafter, the adhesion strength test was conducted.
The adhesion strength test was carried out after 6 h, 24 h, 2 days, 3 days and 1 week by using a Ken-Ken type adhesion strength tester (Technotester Model R-10000ND, a tensile tester certified by Japan Society For Finishings Technology) at 5 points of each test piece. The result is shown by a mean value of 5 measured values.
After the test, the repairing material for inorganic structure and the repaired object (concrete ordinary slab) were visually observed to evaluate the type of fracture. The case wherein the repaired substrate undergone fracture was rated as "A (substrate fracture)." The case where the substrate fracture and the interfacial fracture both occurred was rated as "B (substrate fracture/interfacial fracture)." The fracture occurred at the interface between the repaired substrate and the repairing material for inorganic structure was rated as "C (interfacial fracture)." The fracture occurred inside the repairing material for inorganic structure was rated as "D (cohesion failure)."
In the present invention, "substrate fracture" is preferred.
Adhesion Strength Test in Wet State
The sample was prepared in the same manner as in the adhesion strength test in air. The substrate to be repaired (concrete ordinary slab) was prepared in the same manner as in the adhesion strength test in air except for immersing the substrate in water for 24 h or longer so as to fully absorb water.
Subsequently, the substrate to be repaired was placed in water so that the top surface was exposed at 5 mm height above the water, while referring to the method shown in FIG.

8 of the test procedure after immersion in water in 7.10 of JIS A 6909:2014. Just before applying the repairing material for inorganic structure, the top surface of the substrate to be repaired was wiped with a dry cloth to remove bleeding water. Immediately thereafter (within 2 min), the repairing material for inorganic structure was cast into the formwork, spread into a thickness of about 4 mm by a trowel or a spatula, and then aged at 25° C. and a relative humidity of 50% for a predetermined period of time. Thereafter, the adhesion strength test was conducted in the same manner as in the test in air.

Water was adequately added to prevent the water level from being lowered with the lapse of time.

Adhesion Strength Test in Water

The sample and the substrate to be repaired (concrete ordinary slab) were prepared in the same manner as in the adhesion strength test in a wet state.

Subsequently, the substrate to be repaired was submerged in water so that the top surface was at about 5 cm depth below the water, while referring to the method shown in FIG. 8 of the test procedure after immersion in water of 7.10 of JIS A 6909:2014. The repairing material for inorganic structure was cast into the formwork on the top surface of the substrate to be repaired in water, spread into a thickness of about 4 mm by a trowel, a spatula or the like, and aged at 25° C. and a relative humidity of 50% for a predetermined period of time. Thereafter, the adhesion strength test was conducted in the same manner as in the test in air.

Water was adequately added to prevent the water level from being lowered with the lapse of time.

Measurement of Surface Hardness

Each of the repairing materials for inorganic structure prepared in the examples and the comparative examples was applied to a wet substrate to be repaired (concrete ordinary slab) by using a trowel or spatula and aged for a period of time shown in Tables. Then the repairing material for inorganic structure was measured for the surface hardness at arbitrarily selected 10 points by using a Barcol hardness tester (IMPRSSOR GYZJ 934-1 manufactured by Barber-Colman Company). The result is shown by the average of 10 measured values (unit: "Barcol hardness").

The repairing material for inorganic structure aged under the same condition as in the adhesion strength test in a wet state was also measured for the hardness in a wet state.

The repairing material for inorganic structure on the substrate to be repaired immersed in water was not measured for the hardness because its surface was not exposed.

TABLE 16

| | | | | Example | | | | |
|---|---|---|---|---|---|---|---|---|
| | | | | 62 | 63 | 64 | 65 | 66 |
| | Repairing Material | | | 1 | 2 | 3 | 4 | 5 |
| Mixing Amount (part by mass) | Component (A) | (A1-1) | | 0.08 | | 0.08 | | 0.08 |
| | | (A1-2) | | | 0.06 | | 0.06 | |
| | | (A2-1) | | | | | | |
| | Component (B) | (B-1) | | 0.5 | 0.5 | 0.5 | 0.5 | 0.5 |
| | Component (C) | (C-1) | | 100 | 100 | | | |
| | | (C-2) | | | | 100 | 100 | |
| | | (C-3) | | | | | | 100 |
| | | (C-4) | | | | | | |
| | | (C-5) | | | | | | |
| | Component (D) | (D-1) | | 1 | 1 | 1 | 1 | 1 |
| | | (D-3) | | | | | | |
| | Component (F) | (F-1) | | | | | | |
| | | (F-2) | | 210 | 210 | 210 | 210 | 210 |
| | | (F-3) | | 40 | 40 | 40 | 40 | 40 |
| | Component (G) | (G-1) | | 0.01 | 0.01 | 0.01 | 0.01 | 0.01 |
| | Component (H) | (G-2) | | 0.05 | 0.04 | 0.05 | 0.025 | 0.025 |
| | Wetting Dispersant (1) | | | 1 | 1 | 1 | 1 | 1 |
| | Wetting Dispersant (2) | | | | | | | |
| | Wax | | | 0.1 | 0.3 | 0.1 | 0.3 | 0.1 |
| | Primer | | | — | — | — | — | — |
| | Ratio by mass (B)/(A) | | | 6.25 | 8.33 | 6.25 | 8.33 | 6.25 |
| | Content of Component (C) (% by mass) | | | 28.3 | 28.3 | 28.3 | 28.3 | 28.4 |
| Evaluation | Heat Generation Test | Gelling time (min) | | 54 | 62 | 56 | 63 | 65 |
| | | Curing Time (min) | | 66 | 71 | 65 | 71 | 74 |
| | | Curing Temperature (° C.) | | 92.3 | 100.6 | 138 | 151.4 | 133.2 |
| | Adhesion Strength Test (in air) (N/mm²) | 6 hours | | A 2.1 | A 2.0 | A 2.2 | A 2.4 | A 1.9 |
| | | 1 day | | A 2.4 | A 2.8 | A 2.1 | A 2.7 | A 2.2 |
| | | 2 days | | A 2.8 | A 3.2 | A 3.0 | A 3.3 | A 2.7 |
| | | 3 days | | A 3.4 | A 3.5 | A 3.3 | A 3.1 | A 3.0 |
| | | 1 week | | A 4.3 | A 4.0 | A 3.5 | A 3.5 | A 3.2 |
| | Barcol Hardness (in air) | 6 hours | | 28.9 | 18.5 | 36.7 | 22.4 | 19.4 |
| | | 1 day | | 40.6 | 38.4 | 42.2 | 40.9 | 33.5 |
| | | 1 week | | 48.9 | 45.5 | 52.3 | 48.6 | 41.1 |
| | Adhesion Strength Test (in wet state) (N/mm²) | 6 hours | | A 1.8 | A 1.6 | B 1.1 | B 1.4 | B 1.7 |
| | | 1 day | | A 2.2 | A 2.4 | B 1.4 | A 1.9 | A 2.0 |
| | | 2 days | | A 2.6 | A 2.7 | A 2.4 | A 2.2 | A 2.2 |
| | | 3 days | | A 2.4 | A 2.9 | A 2.8 | A 2.3 | A 2.0 |
| | | 1 week | | A 3.0 | A 3.1 | A 2.8 | A 2.8 | A 2.3 |
| | Barcol Hardness (in wet state) | 6 hours | | 17.8 | 12.8 | 9.8 | 7.5 | 18.7 |
| | | 1 day | | 30.2 | 27.1 | 17.5 | 15.5 | 24.4 |
| | | 1 week | | 38.9 | 33.3 | 28.5 | 26.9 | 27.5 |
| | Adhesion Strength Test | 6 hours | | C 1.1 | C 1.2 | B 1.3 | B 1.5 | A 1.7 |
| | | 1 day | | C 1.2 | C 1.4 | B 1.5 | A 1.8 | A 1.9 |

TABLE 16-continued

|  |  |  | Example | | | | |
|--|--|--|---|---|---|---|---|
|  |  |  | 62 | 63 | 64 | 65 | 66 |
| (in water) | 2 days | | C 1.1 | B 1.5 | A 1.7 | A 1.9 | A 2.2 |
| (N/mm²) | 3 days | | B 1.4 | B 1.7 | A 1.8 | A 2.4 | A 2.1 |
|  | 1 week | | B 1.5 | A 2.0 | A 2.2 | A 2.2 | A 2.3 |

TABLE 17

| | | | Example | | | | |
|---|---|---|---|---|---|---|---|
| | | | 67 | 68 | 69 | 70 | 71 |
| | Repairing Material | | 6 | 7 | 8 | 9 | 10 |
| Mixing | Component (A) | (A1-1) | 0.08 | 0.08 | 0.08 | 0.08 | 0.08 |
| Amount | | (A1-2) | | | | | |
| (part by | | (A2-1) | | | | | |
| mass) | Component (B) | (B-1) | 0.5 | 0.5 | 0.5 | 0.5 | 0.5 |
| | Component (C) | (C-1) | | | 100 | 100 | 100 |
| | | (C-2) | | | | | |
| | | (C-3) | | | | | |
| | | (C-4) | 100 | | | | |
| | | (C-5) | | 100 | | | |
| | Component (D) | (D-1) | 1 | 1 | 2 | 2 | 1 |
| | | (D-3) | | | | | |
| | Component (F) | (F-1) | | | | | 80 |
| | | (F-2) | 210 | 210 | 210 | 210 | 150 |
| | | (F-3) | 40 | 40 | 40 | 40 | 20 |
| | Component (G) | (G-1) | 0.01 | 0.01 | 0.01 | 0.01 | 0.01 |
| | Component (H) | (G-2) | 0.025 | 0.04 | 0.05 | 0.05 | 0.05 |
| | | Wetting Dispersant (1) | 1 | 1 | 1 | 1.5 | 1 |
| | | Wetting Dispersant (2) | | | | | |
| | | Wax | 0.1 | 0.1 | 0.1 | 0.1 | 0.1 |
| | | Primer | — | — | — | — | — |
| | Ratio by mass (B)/(A) | | 6.25 | 6.25 | 6.25 | 6.25 | 6.25 |
| | Content of Component (C) (% by mass) | | 28.4 | 28.4 | 28.3 | 28.2 | 28.3 |
| Evaluation | Heat | Gelling time (min) | 58 | 59 | 35 | 37 | 57 |
| | Generation | Curing Time (min) | 66 | 69 | 43 | 44 | 66 |
| | Test | Curing Temperature (° C.) | 117.1 | 122.5 | 102.4 | 93.9 | 95.1 |
| | Adhesion | 6 hours | A 2.5 | A 2.2 | A 1.9 | A 2.1 | A 1.9 |
| | Strength Test | 1 day | A 2.6 | A 2.6 | A 2.4 | A 2.5 | A 2.2 |
| | (in air) | 2 days | A 2.9 | A 2.9 | A 3.3 | A 2.9 | A 2.8 |
| | (N/mm²) | 3 days | A 3.3 | A 3.3 | A 3.9 | A 3.3 | A 3.1 |
| | | 1 week | A 3.6 | A 3.9 | A 4.4 | A 3.7 | A 3.4 |
| | Barcol | 6 hours | 34.3 | 28.0 | 34.4 | 25.5 | 19.9 |
| | Hardness | 1 day | 38.4 | 31.1 | 46.6 | 41.1 | 28.8 |
| | (in air) | 1 week | 46.2 | 49.8 | 56.3 | 52.2 | 39.4 |
| | Adhesion | 6 hours | A 2.1 | C 1.1 | B 1.7 | A 2.2 | A 2.1 |
| | Strength Test | 1 day | A 2.4 | B 1.3 | B 1.9 | A 2.4 | A 2.3 |
| | (in wet state) | 2 days | A 2.5 | B 1.6 | A 2.2 | A 2.5 | A 2.8 |
| | (N/mm²) | 3 days | A 2.4 | A 1.9 | A 2.8 | A 2.3 | A 3.0 |
| | | 1 week | A 2.8 | A 2.2 | A 2.9 | A 2.4 | A 3.2 |
| | Barcol | 6 hours | 17.5 | 6.4 | 24.4 | 18.9 | 11.4 |
| | Hardness | 1 day | 25.1 | 11.2 | 33.3 | 23.3 | 29.4 |
| | (in wet state) | 1 week | 27.4 | 19.5 | 35.4 | 24.4 | 42.5 |
| | Adhesion | 6 hours | A 1.8 | separated | B 1.4 | B 1.5 | C 1.8 |
| | Strength Test | 1 day | A 2.1 | separated | B 1.8 | B 1.8 | B 1.9 |
| | (in water) | 2 days | A 2.2 | separated | B 1.5 | B 1.9 | A 2.0 |
| | (N/mm²) | 3 days | A 2.0 | separated | B 1.9 | B 2.2 | A 2.1 |
| | | 1 week | A 1.9 | separated | B 1.5 | B 2.2 | A 2.3 |

TABLE 18

| | | | Example | | | | |
|---|---|---|---|---|---|---|---|
| | | | 72 | 73 | 74 | 75 | 76 |
| | Repairing Material | | 11 | 12 | 13 | 14 | 15 |
| Mixing | Component (A) | (A1-1) | 0.08 | 0.08 | | 0.08 | 0.08 |
| Amount | | (A1-2) | | | | | |
| (part by | | (A2-1) | | | 0.088 | | |

TABLE 18-continued

|  |  |  | Example |  |  |  |  |
|---|---|---|---|---|---|---|---|
|  |  |  | 72 | 73 | 74 | 75 | 76 |
| mass) | Component (B) | (B-1) | 0.5 | 0.5 | 0.5 | 0.5 | 0.5 |
|  | Component (C) | (C-1) | 100 |  | 100 | 100 | 100 |
|  |  | (C-2) |  | 100 |  |  |  |
|  |  | (C-3) |  |  |  |  |  |
|  |  | (C-4) |  |  |  |  |  |
|  |  | (C-5) |  |  |  |  |  |
|  | Component (D) | (D-1) | 1 | 1 |  |  | 1 |
|  |  | (D-3) |  |  | 1 |  |  |
|  | Component (F) | (F-1) | 80 | 80 |  |  |  |
|  |  | (F-2) | 150 | 150 | 210 | 210 | 210 |
|  |  | (F-3) | 20 | 20 | 40 | 40 | 40 |
|  | Component (G) | (G-1) | 0.01 | 0.01 | 0.01 | 0.01 | 0.01 |
|  | Component (H) | (G-2) | 0.05 | 0.05 | 0.03 | 0.04 | 0.05 |
|  | Wetting Dispersant (1) |  | 1 | 1 | 1 | 1 | 1 |
|  | Wetting Dispersant (2) |  | 1 | 1 |  |  |  |
|  | Wax |  | 0.1 | 0.1 | 0.1 | 0.1 | 0.1 |
|  | Primer |  | — | — | — | — | yes |
|  | Ratio by mass (B)/(A) |  | 6.25 | 6.25 | 5.68 | 6.25 | 6.25 |
|  | Content of Component (C) (% by mass) |  | 28.3 | 28.3 | 28.4 | 28.4 | 28.3 |
| Evaluation | Heat | Gelling time (min) | 65 | 57 | 49 | 47 | 54 |
|  | Generation | Curing Time (min) | 74 | 64 | 58 | 79 | 66 |
|  | Test | Curing Temperature (° C.) | 100.6 | 129.6 | 79.9 | 68.8 | 92.3 |
|  | Adhesion | 6 hours | A 1.8 | A 2.0 | A 1.5 | B 1.5 | A 2.5 |
|  | Strength Test | 1 day | A 2.3 | A 2.7 | A 1.8 | B 1.4 | A 2.6 |
|  | (in air) | 2 days | A 2.7 | A 3.3 | A 2.7 | A 1.9 | A 2.5 |
|  | (N/mm²) | 3 days | A 3.3 | A 3.2 | A 3.3 | A 2.5 | A 3.3 |
|  |  | 1 week | A 3.5 | A 3.8 | A 3.7 | A 2.4 | A 4.1 |
|  | Barcol | 6 hours | 17.4 | 18.4 | 6.5 | 0.0 | 29.9 |
|  | Hardness | 1 day | 29.0 | 30.0 | 12.8 | 11.2 | 38.8 |
|  | (in air) | 1 week | 40.2 | 41.2 | 33.5 | 17.5 | 47.6 |
|  | Adhesion | 6 hours | A 1.9 | A 2.2 | A 1.6 | B 1.3 | A 1.9 |
|  | Strength Test | 1 day | A 2.2 | A 2.5 | A 2.1 | B 1.5 | A 2.1 |
|  | (in wet state) | 2 days | A 3.1 | A 2.8 | A 2.2 | B 1.7 | A 2.5 |
|  | (N/mm²) | 3 days | A 2.9 | A 3.0 | A 3.1 | B 1.9 | A 2.9 |
|  |  | 1 week | A 3.4 | A 3.4 | A 3.5 | A 2.1 | A 3.1 |
|  | Barcol | 6 hours | 10.5 | 14.5 | 7.4 | 0.0 | 21.1 |
|  | Hardness | 1 day | 23.5 | 31.5 | 13.6 | 9.8 | 31.6 |
|  | (in wet state) | 1 week | 39.8 | 43.3 | 34.4 | 11.1 | 40.5 |
|  | Adhesion | 6 hours | B 1.4 | B 1.8 | A 1.5 | C 1.3 | A 1.5 |
|  | Strength Test | 1 day | A 1.8 | A 2.1 | A 2.2 | B 1.4 | A 1.9 |
|  | (in water) | 2 days | A 2.1 | A 2.2 | A 2.6 | B 1.5 | A 1.9 |
|  | (N/mm²) | 3 days | A 2.3 | A 2.8 | A 3.0 | B 1.5 | A 2.2 |
|  |  | 1 week | A 2.7 | A 2.9 | A 3.1 | B 1.6 | A 2.6 |

TABLE 19

|  |  |  | Comparative Example |  |  |  |  |
|---|---|---|---|---|---|---|---|
|  |  |  | 36 | 37 | 38 | 39 | 40 |
|  | Repairing Material |  | 16 | 17 | 18 | 19 | 20 |
| Mixing | Component (A) | (A1-1) | 0.08 | 0.08 | 0.08 | 0.08 | 0.08 |
| Amount | Component (B') | (B'-1) |  |  |  |  | 0.5 |
| (part by |  | (B'-2) |  |  |  |  |  |
| mass) | Component (C) | (C-1) | 100 | 100 | 100 | 100 | 100 |
|  | Component (D) | (D-1) |  |  |  |  | 1 |
|  |  | (D-2) | 1 | 1 | 1 | 1 |  |
|  | Component (E) | (E-1) |  |  |  | 0.2 |  |
|  | Component (F) | (F-1) |  |  | 80 |  |  |
|  |  | (F-2) | 210 | 210 | 150 | 210 | 210 |
|  |  | (F-3) | 40 | 40 | 20 | 40 | 40 |
|  | Component (G) | (G-1) | 0.001 | 0.001 | 0.001 | 0.001 | 0.001 |
|  | Component (H) | (G-2) | 0.002 | 0.004 | 0.004 | 0.003 | 0.004 |
|  | Wetting Dispersant (1) |  | 1 | 1 | 1 | 1 | 1 |
|  | Wetting Dispersant (2) |  |  | 1 | 1 |  |  |
|  | Wax |  | 0.1 | 0.1 | 0.1 | 0.1 | 0.1 |
|  | Underwater Adhesive (I) | Base Agent Hardener |  |  |  |  |  |
|  | Underwater Adhesive (II) | Base Agent Hardener |  |  |  |  |  |

TABLE 19-continued

|  |  |  | Comparative Example | | | | |
|---|---|---|---|---|---|---|---|
|  |  |  | 36 | 37 | 38 | 39 | 40 |
|  | Ratio by mass (B)/(A) |  | — | — | — | — | — |
| Evaluation | Heat Generation Test | Gelling time (min) | 52 | 62 | 56 | 55 | 49 |
|  |  | Curing Time (min) | 61 | 71 | 65 | 64 | 56 |
|  |  | Curing Temperature (° C.) | 78.3 | 83.1 | 85.6 | 87.2 | 84.5 |
|  | Adhesion Strength Test (in air) (N/mm²) | 6 hours | A 2.5 | A 2.2 | A 2.4 | A 3.5 | D 0.7 |
|  |  | 1 day | A 3.1 | A 2.8 | A 2.9 | A 4.1 | D 0.9 |
|  |  | 2 days | A 3.4 | A 3.3 | A 2.9 | A 4.4 | D 1.1 |
|  |  | 3 days | A 4.2 | A 4.0 | A 3.8 | A 5.2 | C 1.2 |
|  |  | 1 week | A 4.4 | A 4.1 | A 4.2 | A 5.4 | C 1.8 |
|  | Barcol Hardness (in air) | 6 hours | 30.9 | 31.3 | 28.8 | 33.3 | 0 |
|  |  | 1 day | 38.8 | 36.6 | 33.5 | 42.1 | 0 |
|  |  | 1 week | 48.9 | 45.8 | 43.1 | 50.8 | 6.6 |
|  | Adhesion Strength Test (in wet state) (N/mm²) | 6 hours | D 0.8 | D 1.1 | D 1.0 | D 0.9 | D 0.5 |
|  |  | 1 day | D 1.3 | D 0.9 | D 1.2 | D 1.1 | D 0.8 |
|  |  | 2 days | D 1.1 | D 1.2 | D 1.1 | D 1.4 | D 0.9 |
|  |  | 3 days | C 1.5 | D 1.1 | C 1.5 | C 1.5 | D 0.5 |
|  |  | 1 week | C 1.2 | C 1.3 | C 1.6 | C 1.5 | D 0.9 |
|  | Barcol Hardness (in wet state) | 6 hours | 26.4 | 29.4 | 22.3 | 31.1 | 0.0 |
|  |  | 1 day | 32.2 | 33.2 | 31.3 | 38.6 | 0.0 |
|  |  | 1 week | 38.4 | 39.4 | 33.7 | 42.0 | 0.0 |
|  | Adhesion Strength Test (in water) (N/mm²) | 6 hours | D 0 | D 0 | D 0 | D 0 | D 0 |
|  |  | 1 day | D 0 | D 0 | D 0 | D 0 | D 0 |
|  |  | 2 days | D 0 | D 0 | D 0 | D 0 | D 0.2 |
|  |  | 3 days | D 0 | D 0 | D 0 | D 0 | D 0.4 |
|  |  | 1 week | D 0 | D 0 | D 0 | D 0 | C 0.9 |

TABLE 20

|  |  |  | Comparative Example | | | | |
|---|---|---|---|---|---|---|---|
|  |  |  | 41 | 42 | 43 | 44 | 45 |
|  | Repairing Material |  | 21 | 22 | 23 | 24 | 25 |
| Mixing Amount (part by mass) | Component (A) | (A1-1) | 0.08 | 0.08 | 0.08 |  |  |
|  | Component (B') | (B'-1) |  | 0.5 | 0.5 |  |  |
|  |  | (B'-2) | 0.5 |  |  |  |  |
|  | Component (C) | (C-1) | 100 | 100 | 100 |  |  |
|  | Component (D) | (D-1) | 1 | 1 | 1 |  |  |
|  |  | (D-2) |  |  |  |  |  |
|  | Component (E) | (E-1) |  |  |  |  |  |
|  | Component (F) | (F-1) |  |  | 80 |  |  |
|  |  | (F-2) | 210 | 210 | 150 |  |  |
|  |  | (F-3) | 40 | 40 | 20 |  |  |
|  | Component (G) | (G-1) | 0.001 | 0.001 | 0.001 |  |  |
|  | Component (H) | (G-2) | 0.004 | 0.004 | 0.004 |  |  |
|  | Wetting Dispersant (1) |  | 1 | 1 | 1 |  |  |
|  | Wetting Dispersant (2) |  |  | 1 | 1 |  |  |
|  | Wax |  | 0.1 | 0.1 | 0.1 |  |  |
|  | Underwater Adhesive (I) | Base Agent |  |  |  | 100 |  |
|  |  | Hardener |  |  |  | 100 |  |
|  | Underwater Adhesive (II) | Base Agent |  |  |  |  | 100 |
|  |  | Hardener |  |  |  |  | 100 |
| Ratio by mass (B)/(A) |  |  | — | — | — | — | — |
| Evaluation | Heat Generation Test | Gelling time (min) | 50 | 52 | 57 | — | — |
|  |  | Curing Time (min) | 58 | 60 | 64 | — | — |
|  |  | Curing Temperature (° C.) | 81.1 | 79.3 | 88.4 | — | — |
|  | Adhesion Strength Test (in air) (N/mm²) | 6 hours | A 0.5 | A 0.9 | A 0.4 | D 0.8 | D 0.2 |
|  |  | 1 day | A 0.7 | A 0.4 | A 0.9 | D 1.1 | D 0.9 |
|  |  | 2 days | A 1.1 | A 0.8 | A 1.1 | A 1.5 | A 1.7 |
|  |  | 3 days | A 1.1 | A 1.1 | A 1.4 | A 2.2 | A 2.4 |
|  |  | 1 week | A 1.1 | A 1.4 | C 1.3 | A 3.1 | A 2.8 |
|  | Barcol Hardness (in air) | 6 hours | 0 | 0 | 0 | 0 | 0 |
|  |  | 1 day | 0 | 0 | 0 | 5.2 | 0 |
|  |  | 1 week | 3.3 | 3.3 | 3.3 | 18.3 | 9.8 |
|  | Adhesion Strength Test (in wet state) (N/mm²) | 6 hours | D 0 | D 0 | D 0 | D 0.3 | D 0.4 |
|  |  | 1 day | D 0.8 | D 0.8 | D 0.5 | D 0.9 | D 0.8 |
|  |  | 2 days | D 0.7 | D 0.6 | D 0.8 | B 1.5 | D 1.1 |
|  |  | 3 days | C 1.2 | D 1.1 | D 0.9 | B 2.4 | B 1.3 |
|  |  | 1 week | C 1.2 | C 1.3 | C 1.3 | A 3.5 | B 1.5 |
|  | Barcol | 6 hours | 0.0 | 0.0 | 0.0 | 0.0 | 0.0 |

TABLE 20-continued

| | | Comparative Example | | | | | | | | | |
|---|---|---|---|---|---|---|---|---|---|---|---|
| | | 41 | | 42 | | 43 | | 44 | | 45 | |
| Hardness | 1 day | 0.0 | | 0.0 | | 0.0 | | 2.8 | | 0.0 | |
| (in wet state) | 1 week | 0.0 | | 0.0 | | 0.0 | | 24.8 | | 11.4 | |
| Adhesion | 6 hours | D | 0 | D | 0 | D | 0 | D | 0.5 | D | 0.6 |
| Strength Test | 1 day | D | 0.4 | D | 0.5 | D | 0 | D | 1.1 | D | 0.7 |
| (in water) | 2 days | D | 0.5 | D | 0.6 | D | 0 | C | 1.3 | D | 1.0 |
| (N/mm$^2$) | 3 days | D | 0.9 | D | 0.9 | D | 0.6 | B | 1.9 | D | 1.1 |
| | 1 week | C | 1.2 | C | 1.1 | C | 0.9 | A | 2.5 | B | 1.4 |

As seen from the results in Tables 16 to 18, the repairing material for inorganic structure of the present invention was rapidly and stably cured even when used in a wet state or in water.

The repairing material for inorganic structure of Example 68 contains styrene as the radical-polymerizable compound (C), and styrene dissolved out in water. Consequently, in water, the use of the repairing material for inorganic structure containing styrene is not suitable.

As seen from the results in Tables 19 to 20, the material not containing the specific secondary thiol compound did not cure in a wet state or in water, and therefore the material could not function as a repairing material for inorganic structure. In addition, as shown by Comparative Examples 44 to 45, the material containing a commercially-available wetting adhesive required a long term aging before exhibiting an acceptable adhesion strength and hardness, and therefore, not suitable for practical use as compared with the repairing material for inorganic structure of the present invention.

The radical-polymerizable resin compositions 66 to 69 to be evaluated for the usability as a crack injection material and a water sealant were measured for the tensile strength and the tensile elongation according to the methods mentioned below. The test results are shown in Table 21. The radical-polymerizable resin composition was cured using 1 part of cobalt octylate having a metal content of 8% and 1 part of the curing agent 328E for vinyl ester resin, and then formed into a test piece according to the method of producing a test piece.

Apparatus Used in Tensile Strength Test
  5900R manufactured by Instron Corporation was used.
  The pulling rate in the tensile test was 5 mm/min.
Tensile Strength, Tensile Elongation
  The tensile strength and the elongation were measured according to JIS K7161-1 (2014).

The test piece was prepared according to 6.1 and 6.2 of JIS K7161-2 (2014). The dimension of the test piece was in accordance with Table 1-1A.

Examples 77 to 83 and Comparative Examples 46 to 52

Repairing materials for inorganic structures 26 to 36 were produced in the same manner as in Example 62 except for mixing each component in the mixing amount shown in Tables 22 to 23. The resultant repairing materials for inorganic structures were evaluated according to the methods mentioned above and mentioned below. The results are shown in Tables 22 to 23.

Workability as Crack Injection Material
Test Method and Evaluation Rating
1. The brittle matter and the powdery matter on the surface to be used in the test of a concrete ordinary slab (600 mm width×300 mm length×60 mm thickness) specified in JIS A 5371-2010 were fully removed and the surface was wiped with a soft clean cloth.
2. Spacers were set around the entire periphery of the surface of the concrete slab (600 mm width×300 mm length×60 mm thickness), and another concrete slab with the same size was put thereon with a predetermined space. The thickness of the spacers (crack width) was changed as follows:
  (1) 0.5 mm
  (2) 1.0 mm
  (3) 3.0 mm
3. The layered slabs were immersed in water in a water tank at 23° C. for about 1 week.
4. One of the surfaces of the layered concrete slabs taken out of the water was drilled in the cross-sectional (thickness) direction to form a hole (about 90 mm depth). A chemical inlet tube with a diameter of 13 mm was provided in the upper portion of the hole.
5. The injection ability was evaluated by injecting each crack injection material in an amount of (1) 175 g, (2) 350 g, or (3) 1000 g through the chemical inlet tube according to the method using an injection gun described in JP-A 10-237264.
Evaluation of Injection Ability
A: Good: The crack injection material was injected without clogging the inlet tube during the injection.

TABLE 21

| Resin Composition | | | 66 | 67 | 68 | 69 |
|---|---|---|---|---|---|---|
| Component (C) | Resin | (C-1) | 100 | | | |
| | | (C-5) | | 100 | | |
| | | (C-6) | | | 100 | |
| | | (C-7) | | | | 100 |
| Component (A) | Metal Soap | (A-1) 8%-o-Co | 0.08 | 0.08 | 0.08 | 0.08 |
| Component (D) | Peroxide | (D-2) 328E | 1 | 1 | 1 | 1 |
| Resin Viscosity at 25° C. (mPa · s) | | | 440 | 183.5 | 864 | 556 |
| Tensile Strength (MPa) | | | 41.7 | 38.5 | 13.2 | 10.2 |
| Tensile Elongation (%) | | | 2.3 | 4.5 | 48.5 | 195.8 |

B: Slightly poor: During injection, the inlet tube was clogged a little, but the crack injection material could be injected.
C: Poor: During injection, the inlet tube was clogged, and the crack injection material was difficult to inject.
6. After evaluation of the injection ability, the layered concrete slabs were left to stand in an environment at 23° C. for about 1 day, and the layered two concrete slabs were tried to separate. By checking whether or not easily separated, the adhesion of two concrete slabs was evaluated according to the following ratings.

Evaluation of Adhesion
A: Good: When the top surface (drilled surface) of the slab was hooked and lifted up to a height of 10 cm from the ground, the upper and lower slabs did not separate even after 30 min or more.
B: Slightly poor: When the top of the slab was hooked and lifted up to a height of 10 cm from the ground, the upper slab separated from the lower slab within 10 to 30 min.
C: Poor: When the top of the slab was hooked and lifted up to a height of 10 cm from the ground, the two slaps separated in shorter than 10 min.

TABLE 22

| | | | Elongation | Resin Viscosity (mPa·s) | Example 77 | Example 78 | Example 79 | Example 80 |
|---|---|---|---|---|---|---|---|---|
| | | Repairing Material | | | 26 | 27 | 28 | 29 |
| Component (C) | Resin | (C-1) | 2.3% | 440 | 100 | | | |
| | | (C-5) | 4.5% | 183.5 | | 100 | | |
| | | (C-6) | 48.5% | 864 | | | 100 | |
| | | (C-7) | 195.8% | 556 | | | | 100 |
| Component (A) | Metal Soap | (A1-1) | | | 0.08 | 0.08 | 0.08 | 0.08 |
| | | (A1-2) | | | | | | |
| Component (B) | Thiol | (B-1) | | | 0.5 | 0.5 | 0.5 | 0.5 |
| Component (G) | Inhibitor | (G-1) | | | 0.01 | 0.01 | 0.01 | 0.01 |
| Component (H) | Curing Retardant | (H-1) | | | 0.02 | 0.02 | 0.02 | 0.02 |
| Component (F) | Filler | (F-1) | | | | | | |
| | | (F-3) | | | 150 | 150 | 150 | 150 |
| | | (F-4) | | | 150 | 150 | 150 | 150 |
| Wetting Dispersant (2) | | | | | 0.5 | 0.5 | 0.5 | 0.5 |
| Component (D) | Peroxide | (D-1) | | | 1 | 1 | 1 | 1 |
| Various Tests | Curing Properties | Gelling Time | | | 18 min 00 sec | 14 min 20 sec | 19 min 40 sec | 16 min 15 sec |
| | | Curing Time | | | 25 min 10 sec | 18 min 15 sec | 28 min 15 sec | 24 min 40 sec |
| | | Peak Exothermic Temperature | | | 91.4° C. | 94.3° C. | 98.2° C. | 93.3° C. |
| | Crack Injection Ability | (1) | Injection | | B | A | C | C |
| | | | Adhesion | | C | B | C | C |
| | | (2) | Injection | | B | A | B | B |
| | | | Adhesion | | A | B | B | A |
| | | (3) | Injection | | B | A | A | A |
| | | | Adhesion | | A | B | A | A |

| | | | Elongation | Resin Viscosity (mPa·s) | Example 81 | Example 82 | Example 83 |
|---|---|---|---|---|---|---|---|
| | | Repairing Material | | | 30 | 31 | 32 |
| Component (C) | Resin | (C-1) | 2.3% | 440 | | 100 | |
| | | (C-5) | 4.5% | 183.5 | 100 | | 100 |
| | | (C-6) | 48.5% | 864 | | | |
| | | (C-7) | 195.8% | 556 | | | |
| Component (A) | Metal Soap | (A1-1) | | | 0.08 | | |
| | | (A1-2) | | | | 0.06 | 0.06 |
| Component (B) | Thiol | (B-1) | | | 0.5 | 0.5 | 0.5 |
| Component (G) | Inhibitor | (G-1) | | | 0.01 | 0.01 | 0.01 |
| Component (H) | Curing Retardant | (H-1) | | | 0.02 | 0.02 | 0.02 |
| Component (F) | Filler | (F-1) | | | 50 | | 50 |
| | | (F-3) | | | 50 | 150 | 50 |
| | | (F-4) | | | 150 | 150 | 150 |
| Wetting Dispersant (2) | | | | | 0.5 | 0.5 | 0.5 |
| Component (D) | Peroxide | (D-1) | | | 1 | 1 | 1 |
| Various Tests | Curing Properties | Gelling Time | | | 15 min 40 sec | 27 min 40 sec | 29 min 25 sec |
| | | Curing Time | | | 23 min 30 sec | 38 min 15 sec | 37 min 40 sec |
| | | Peak Exothermic Temperature | | | 98.2° C. | 91.0° C. | 88.3° C. |
| | Crack Injection Ability | (1) | Injection | | A | B | A |
| | | | Adhesion | | B | B | A |
| | | (2) | Injection | | A | B | A |
| | | | Adhesion | | A | A | A |

TABLE 22-continued

| | | | | | | |
|---|---|---|---|---|---|---|
| | | (3) | Injection | A | B | A |
| | | | Adhesion | A | A | A |

TABLE 23

| | | | | Resin Viscosity | Comparative Examples | | | |
|---|---|---|---|---|---|---|---|---|
| | | | Elongation | (mPa · s) | 46 | 47 | 48 | 49 |
| | Repairing Material | | | | 30 | 31 | 32 | 33 |
| Component (C) | Resin | (C-1) | 2.3% | 440 | | | | |
| | | (C-5) | 4.5% | 183.5 | 100 | 100 | 100 | 100 |
| | | (C-6) | 48.5% | 864 | | | | |
| | | (C-7) | 195.8% | 556 | | | | |
| Component (A) | Metal Soap | (A1-1) | | | 0.08 | 0.08 | 0.08 | 0.08 |
| Component (B) | Thiol | (B'-1) | | | | | | 0.5 |
| Component (E) | Amine | (E-1) | | | | | 0.2 | |
| Component (G) | Inhibitor | (G-1) | | | 0.01 | 0.01 | 0.01 | 0.01 |
| Component (F) | Filler | (F-1) | | | 50 | 50 | 50 | 50 |
| | | (F-2) | | | | | | |
| | | (F-3) | | | 50 | 50 | 50 | 50 |
| | | (F-4) | | | 150 | 150 | 150 | 150 |
| Component (D) | Peroxide | (D-2) | | | | 1 | 1 | |
| | | (D-1) | | | 1 | | | 1 |
| Various Tests | Curing Properties | Gelling Time | | | 20 min 15 sec | 23 min 45 sec | 26 min 15 sec | 22 min 00 sec |
| | | Curing Time | | | 24 min 40 sec | 46 min 30 sec | 33 min 25 sec | 38 min 25 sec |
| | | Peak Exothermic Temperature | | | 84.8° C. | 65.6° C. | 75.4° C. | 65.7° C. |
| | Crack Injection Ability | (1) | Injection | | C | B | B | B |
| | | | Adhesion | | C | C | C | C |
| | | (2) | Injection | | B | B | A | A |
| | | | Adhesion | | C | C | C | C |
| | | (3) | Injection | | B | A | A | B |
| | | | Adhesion | | C | C | C | C |

| | | | | Resin Viscosity | Comparative Example | | |
|---|---|---|---|---|---|---|---|
| | | | Elongation | (mPa · s) | 50 | 51 | 52 |
| | Repairing Material | | | | 34 | 35 | 36 |
| Component (C) | Resin | (C-1) | 2.3% | 440 | 100 | | |
| | | (C-5) | 4.5% | 183.5 | | | |
| | | (C-6) | 48.5% | 864 | | 100 | |
| | | (C-7) | 195.8% | 556 | | | 100 |
| Component (A) | Metal Soap | (A1-1) | | | 0.08 | 0.08 | 0.08 |
| Component (B) | Thiol | (B'-1) | | | 0.5 | 0.5 | 0.5 |
| Component (E) | Amine | (E-1) | | | | | |
| Component (G) | Inhibitor | (G-1) | | | 0.01 | 0.01 | 0.01 |
| Component (F) | Filler | (F-1) | | | 50 | 50 | 50 |
| | | (F-2) | | | | | |
| | | (F-3) | | | 50 | 50 | 50 |
| | | (F-4) | | | 150 | 150 | 150 |
| Component (D) | Peroxide | (D-2) | | | | | |
| | | (D-1) | | | 1 | 1 | 1 |
| Various Tests | Curing Properties | Gelling Time | | | 28 min 05 sec | 26 min 40 sec | 30 min 00 sec |
| | | Curing Time | | | 41 min 30 sec | 43 min 45 sec | 48 min 10 sec |
| | | Peak Exothermic Temperature | | | 58.0° C. | 58.9° C. | 54.9° C. |
| | Crack Injection Ability | (1) | Injection | | A | A | A |
| | | | Adhesion | | C | C | C |
| | | (2) | Injection | | A | A | A |
| | | | Adhesion | | C | C | C |
| | | (3) | Injection | | A | A | A |
| | | | Adhesion | | C | C | C |

Examples 84 to 88 and Comparative Examples 53 to 60

Repairing materials for inorganic structures 37 to 49 were produced in the same manner as in Example 62 except for mixing each component in the mixing amount shown in Tables 24 to 25. The resultant repairing materials for inorganic structures were evaluated according to the methods mentioned above and mentioned below. The results are shown in Tables 24 to 25.

Figure 2:
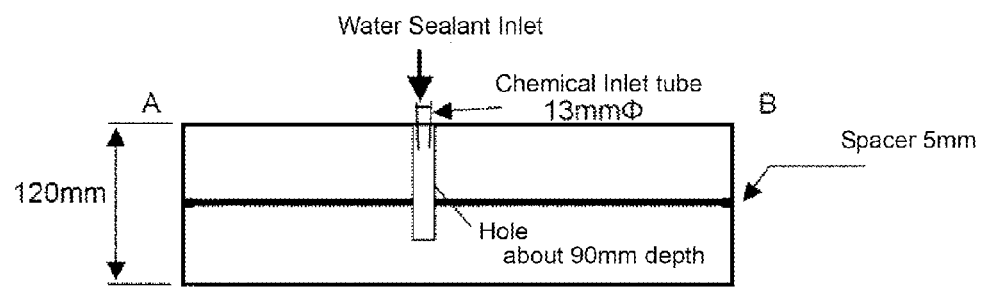
FIG. 2 is a cross-sectional view of the device used in Examples 84 to 88 and Comparative Examples 53 to 60.

Workability as Water Sealant
Test Method and Evaluation Rating
1. The brittle matter and the powdery matter on the surface to be used in the test of a concrete ordinary slab (600 mm width×300 mm length×60 mm thickness) specified in JIS A 5371-2010 were fully removed and the surface was wiped with a soft clean cloth.
2. Spacers (5.0 mm) were set around the entire periphery of the surface of the concrete slab (600 mm width×300 mm length×60 mm thickness), and another concrete slab with the same size was put thereon with a predetermined space (5.0 mm).
3. A water inlet nozzle and a drainage were provided at the edge of the space between the layered two slabs held by the spacers and then fixed with a quick-setting cement (see FIG. 1).
4. Water was injected through the water inlet nozzle to wet the surfaces of the layered two slabs so that the repairing material for inorganic structure (resin) could cure on the wet surface.
5. One of the surfaces of the layered two concrete slabs was drilled by a hammer drill in the cross-sectional (thickness) direction to form a hole (depth: about 90 mm), into which a chemical inlet tube having a diameter of 13 mm was provided.
6. Using a high-pressure injection machine, water was again injected through the water inlet nozzle under a pressure of 0.5 kg/cm$^2$. About 1.5 kg of the water sealant was injected through the chemical inlet tube while keeping the injection of water (see FIG. 2). The injection ability of the water sealant during the above injection procedure was evaluated according to the following ratings.

Evaluation of Injection Ability
A: Good. The water sealant was injected without clogging the inlet tube during the injection.
B: Slightly poor. During injection, the inlet tube was clogged a little, but the water sealant was injected.
C: Poor. During the injection, the injection tube was clogged and the water sealant was difficult to inject.
7. After injecting the water sealant, the water injection was stopped. After leaving to stand for about one hour, the curing of the water sealant was confirmed. Then, water was injected under an increased pressure of 1.0 kg/cm$^2$ continuously for 30 min. The water leaked out through the space between the layered two slabs was collected and its amount by mass (g) was measured. The smaller the amount of leaked water indicates higher the water sealing performance.

Figure 3:
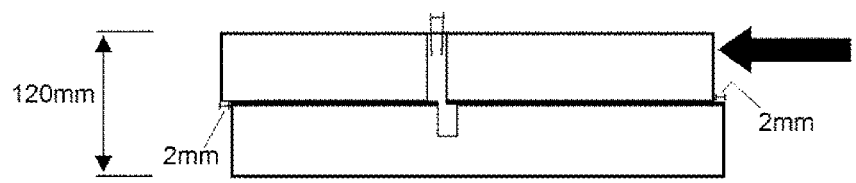
FIG. 3 is a cross-sectional view of the device used in Examples 84 to 88 and Comparative Examples 53 to 60.

Evaluation of Followability
8. After the test of injection ability and water sealing performance, the layered slabs were horizontally slid to each other by 2.0 mm using a jack while applying force in the horizontal direction (see FIG. 3). At this time, tap water was continuously injected through the inlet nozzle for 30 min under a pressure of 1.0 kg/cm$^2$ in the same manner as in 7. In the same manner as in the evaluation of water sealing performance in 7, the water leaked through the space between the two slabs was collected and its amount by mass (g) was measured. The smaller the amount of leaked water indicates higher followability performance. The followability was evaluated according to the following ratings.
A: Good. No leakage of tap water was observed even after sliding by 2.0 mm to show good followability.
B: Slightly poor. When sliding by 2.0 mm and continuously injecting tap water for 30 min, the water dripped because of a slight damage.
C: Poor. The damage occurred immediately after sliding by 2.0 mm, and the injected water was almost all leaked out.
9. After the followability test, finally, the layered two concrete slabs were tried to separate. By checking whether or not easily separated, the adhesion of two concrete slabs was evaluated according to the following ratings.

Evaluation of Adhesion
A: Good: When the top surface (drilled surface) of the slab was hooked and lifted up to a height of 10 cm from the ground, the upper and lower slabs did not separate even after 30 min or more.
B: Slightly poor: When the top of the slab was hooked and lifted up to a height of 10 cm from the ground, the upper slab separated from the lower slab within 10 to 30 min.
C: Poor: When the top of the slab was hooked and lifted up to a height of 10 cm from the ground, the two slabs separated in shorter than 10 min.

TABLE 24

|  |  |  | Elongation | Resin Viscosity (mPa · s) | Example 84 | Example 85 | Example 86 |
|---|---|---|---|---|---|---|---|
|  |  | Repairing Material |  |  | 37 | 38 | 39 |
| Component (C) | Resin | (C-7) | 195.8% | 556 | 100 | 100 | 100 |
| Component (A) | Metal | (A1-1) |  |  | 0.08 |  |  |
|  | Soap | (A1-3) |  |  |  | 0.05 |  |
|  |  | (A1-2) |  |  |  |  | 0.06 |
|  |  | (A1-5) |  |  |  |  |  |
|  |  | (A1-4) |  |  |  |  |  |
| Component (B) | Thiol | (B-1) |  |  | 0.5 | 0.5 | 0.5 |
| Component (F) | Filler | (F-1) |  |  | 50 | 50 | 50 |
|  |  | (F-4) |  |  | 100 | 100 | 100 |
| Wetting Dispersant (2) |  |  |  |  | 0.5 | 0.5 | 0.5 |
| Component (D) | Peroxide | (D-1) |  |  | 1 | 1 | 1 |
|  | Various | Curing | Gelling Time |  | 40 sec | 55 sec | 5 min 40 sec |
|  | Tests | Properties | Curing Time |  | 2 min 30 sec | 1 min 45 sec | 2 min 50 sec |

TABLE 24-continued

|  |  |  | Peak Exothermic Temperature | 92.3° C. | 91.4° C. | 90.6° C. |
|---|---|---|---|---|---|---|
|  |  | Water Sealing Performance | Injectability | A | A | A |
|  |  |  | Mass of Leaked Water (g) | 0 g | 0 g | 0 g |
|  |  |  | Followability | A | A | A |
|  |  |  | Mass of Leaked Water (g) | 0 g | 0 g | 0 g |
|  |  |  | Adhesion | A | A | A |

|  |  |  | Elongation | Resin Viscosity (mPa · s) | Example 87 | Example 88 |
|---|---|---|---|---|---|---|
|  |  | Repairing Material |  |  | 40 | 41 |
| Component (C) Resin | (C-7) |  | 195.8% | 556 | 100 | 100 |
| Component (A) Metal Soap | (A1-1) |  |  |  |  |  |
|  | (A1-3) |  |  |  |  |  |
|  | (A1-2) |  |  |  |  |  |
|  | (A1-5) |  |  |  | 0.05 |  |
|  | (A1-4) |  |  |  |  | 0.02 |
| Component (B) Thiol | (B-1) |  |  |  | 0.5 | 0.5 |
| Component (F) Filler | (F-1) |  |  |  | 50 | 50 |
|  | (F-4) |  |  |  | 100 | 100 |
| Wetting Dispersant (2) |  |  |  |  | 0.5 | 0.5 |
| Component (D) Peroxide | (D-1) |  |  |  | 1 | 1 |
| Various Tests | Curing Properties | Gelling Time |  |  | 1 min 00 sec | 45 sec |
|  |  | Curing Time |  |  | 3 min 15 sec | 2 min 00 sec |
|  |  | Peak Exothermic Temperature |  |  | 98.4° C. | 89.3° C. |
|  | Water Sealing Performance | Injectability |  |  | A | B |
|  |  | Mass of Leaked Water (g) |  |  | 0 g | 0 g |
|  |  | Followability |  |  | B | B |
|  |  | Mass of Leaked Water (g) |  |  | 15 g | 25 g |
|  |  | Adhesion |  |  | B | B |

TABLE 25

|  |  |  | Elongation | Resin Viscosity (mPa · s) | Comparative Example 53 | 54 | 55 | 56 |
|---|---|---|---|---|---|---|---|---|
|  |  | Repairing Material |  |  | 42 | 43 | 44 | 45 |
| Component (C) Resin | (C-7) |  | 195.8% | 556 | 100 | 100 | 100 | 100 |
| Component (A) Metal Soap | (A1-1) |  |  |  | 0.08 | 0.08 | 0.08 | 0.08 |
|  | (A1-3) |  |  |  |  |  |  |  |
|  | (A1-2) |  |  |  |  |  |  |  |
|  | (A1-5) |  |  |  |  |  |  |  |
|  | (A1-4) |  |  |  |  |  |  |  |
| Component (B) Thiol | (B'-1) |  |  |  |  |  | 0.5 |  |
|  | (B'-2) |  |  |  |  |  |  | 0.5 |
| Component (E) Amine | (E-1) |  |  |  |  | 0.2 |  |  |
| Component (F) Filler | (F-1) |  |  |  | 50 | 50 | 50 | 50 |
|  | (F-4) |  |  |  | 100 | 100 | 100 | 100 |
| Component (D) Peroxide | (D-1) |  |  |  | 1 | 1 | 1 | 1 |
| Various Tests | Curing Properties | Gelling Time |  |  | 3 min 50 sec | 3 min 05 sec | 4 min 10 sec | 8 min 00 sec |
|  |  | Curing Time |  |  | 11 min 25 sec | 9 min 00 sec | 11 min 15 sec | 17 min 45 sec |
|  |  | Peak Exothermic Temperature |  |  | 86.3° C. | 88.1° C. | 73.1° C. | 63.5° C. |
|  | Water Sealing Performance | Injectability |  |  | A | A | A | A |
|  |  | Mass of Leaked Water (g) |  |  | 1000 or more | 1000 or more | 1000 or more | 1000 or more |
|  |  | Followability |  |  | C | C | C | C |
|  |  | Mass of Leaked Water (g) |  |  | 1000 or more | 1000 or more | 1000 or more | 1000 or more |
|  |  | Adhesion |  |  | C | C | B | B |

TABLE 25-continued

| | | | Resin Elongation | Viscosity (mPa·s) | Comparative Example 57 | 58 | 59 | 60 |
|---|---|---|---|---|---|---|---|---|
| | | Repairing material | | | 46 | 47 | 48 | 49 |
| Component (C) | Resin | (C-7) | 195.8% | 556 | 100 | 100 | 100 | 100 |
| Component (A) | Metal Soap | (A1-1) | | | | | | |
| | | (A1-3) | | | 0.05 | | | |
| | | (A1-2) | | | | 0.06 | | |
| | | (A1-5) | | | | | 0.05 | |
| | | (A1-4) | | | | | | 0.02 |
| Component (B) | Thiol | (B'-1) | | | 0.5 | 0.5 | 0.5 | 0.5 |
| | | (B'-2) | | | | | | |
| Component (E) | Amine | (E-1) | | | | | | |
| Component (F) | Filler | (F-1) | | | 50 | 50 | 50 | 50 |
| | | (F-4) | | | 100 | 100 | 100 | 100 |
| Component (D) | Peroxide | (D-1) | | | 1 | 1 | 1 | 1 |
| | Various Tests | Curing Properties | Gelling Time | | 2 min 10 sec | 14 min 10 sec | 2 min 10 sec | 1 min 50 sec |
| | | | Curing Time | | 15 min 10 sec | 25 min 55 sec | 14 min 30 sec | 7 min 30 sec |
| | | | Peak Exothermic Temperature | | 67.7° C. | 51.5° C. | 59.8° C. | 64.3° C. |
| | | Water Sealing Performance | Injectability | | B | A | A | B |
| | | | Mass of Leaked Water (g) | | 1000 or more | 1000 or more | 1000 or more | 1000 or more |
| | | | Followability | | B | C | C | C |
| | | | Mass of Leaked Water (g) | | 1000 or more | 1000 or more | 1000 or more | 1000 or more |
| | | | Adhesion | | C | C | C | C |

The materials used in producing the radical-polymerizable coating compositions (hereinafter also referred to as "coating compositions") in Examples 89 to 98 and Comparative Examples 61 to 68 are mentioned below.

Metal Soap (A1)
Metal Soap (A1-1)
Cobalt octylate (Hexoate Cobalt manufactured by Toei Chemical Industry Co., Ltd., cobalt content: 8% by mass in total amount of product, molecular weight: 345.34)

Metal Soap (A1-2)
Manganese octylate (Hexoate Manganese manufactured by Toei Chemical Industry Co., Ltd., manganese content: 8% by mass in total amount of product, molecular weight: 341.35)

Thiol Compound (B)
In the following thiol compounds, "monofunctional" means that the number of the mercapto group in the molecule is 1, and each numeral prefix of "difunctional", "trifunctional" and "tetrafunctional" means the number of the mercapto groups in the molecule.

Secondary Thiol Compound (B1-1)
Difunctional secondary thiol: Karenz MT (registered trademark) BD1 (1,4-bis(3-mercaptobutyryloxy)butane, molecular weight: 299.43) manufactured by Showa Denko K.K.

Tertiary Thiol Compound (B2-1)
Trifunctional tertiary thiol: trimethylolpropane tris(2-mercaptoisobutyrate) (molecular weight: about 440.64) synthesized in Synthesis Example 4 above.

Primary Thiol Compound (B')
Primary Thiol Compound (B'-1)
Monofunctional primary thiol: 3MPA (3-mercaptopropionic acid, molecular weight: 106.14) manufactured by Tokyo Chemical Industry Co., Ltd.

Primary Thiol Compound (B'-2)
Trifunctional primary thiol: TMTP (trimethylolpropane tris(3-mercaptoproionate), molecular weight: 398.50) manufactured by Yodo Kagaku Co., Ltd.

Primary Thiol Compound (B'-3)
Tetrafunctional primary thiol: PEMP (pentaerythritol tetrakis(3-mercaptopropionate), molecular weight: 488.64) manufactured by SC Organic Chemical Co., Ltd.

Radical-Polymerizable Compound (C)
Radical-Polymerizable Compound (C-1)
Vinyl ester resin: Ripoxy (registered trademark) NSR-112 (non-styrene type) manufactured by Showa Denko K.K.

Radical Polymerization Initiator (D)
Radical Polymerization Initiator (D-1)
Curing agent for vinyl ester resin: 328E manufactured by Kayaku Akzo Corporation.

Radical Polymerization Initiator (D-2)
Pasty curing agent with pigment: BPO paste blue D (phthalic acid-free) manufactured by Kayaku Akzo Corporation.

Radical Polymerization Initiator (D-3)
Cumene hydroperoxide: Percumyl 11-80 manufactured by NOF Corporation.

Pigment
Gray
Toner for unsaturated polyester resin: TS Gray KR-8A 1227 manufactured by Kohshin Chemical Corporation.

Polymerization Inhibitor (Phenothiazine)
Phenothiazine manufactured by Wako Pure Chemical Industries, Ltd.

Curing Retardant (4H-TEMPO)
4-Hydroxy-2,2,6,6-tetramethylpiperidin 1-oxyl free radical: Polystop 7200P manufactured by Hakuto Co., Ltd.

Amine-Type Accelerator
Amine-Type Accelerator (PT-2HE)
N,N-di(β-hydroxyethyl)-p-toluidine: PT-2HE (trade name) manufactured by MORIN Chemical Industries, Co., Ltd.

Amine-Type Accelerator (2HE)
N,N-di(β-hydroxyethyl)aniline: 2HE (trade name) manufactured by MORIN Chemical Industries, Co., Ltd.

Amine-Type Accelerator (DMA)
Dimethylaniline: DMA (trade name) manufactured by Tokyo Chemical Industry Co., Ltd.
Aggregate
Silica sand: No. 6 silica sand
Other Components
Polyisocyanate Compound
Hexamethylene diisocyanate (isocyanurate type): Duranate (registered trademark) TPA-100 manufactured by Asahi Kasei Corporation.
Tin Catalyst
Dibutyltin dilaurate: KS-1260 manufactured by Kyodo Chemical Co., Ltd.
Silane Coupling Agent
3-Methacryloxypropyltromethoxysilane: KBM-503 manufactured by Shi-etsu Chemical Industry Co., Ltd.
Surfactant
Sodium dialkylsulfosuccinate Pelex (registered trademark) OT-P (sodium dialkylsulfosuccinate content: 70% by mass) manufactured by Kao Corporation.
Wax
Paraffin wax (125° F.) manufactured by JX Nippon Oil & Energy Corporation.
Thixotropic Agent
Vapor phase silica: Reolosil PM-20L (trade name) manufactured by Tokuyama Corporation.
Coating Composition 1
A radical-polymerizable coating composition was prepared according to the following process.
Step 1
Into 100 parts by mass of the radical-polymerizable compound (C-1), 0.15 part by mass of paraffin wax (manufactured by JX Nippon Oil & Energy Corporation, 125° F.) and 1 part by mass of the thixotropic agent (Reolosil PM-20L (trade name) manufactured by Tokuyama Corporation) were added. After further adding 0.08 part by mass (based on metal element) of the metal soap (A-1), 0.1 part by mass of phenothiazine and 0.02 part by mass of 4H-TEMPO, the resultant mixture was well stirred at room temperature (25° C.) to prepare a liquid mixture (i).
Step 2
The liquid mixture (i) and 0.5 part by mass of the secondary thiol compound (B1-1) were well stirred and then 10 parts by mass of the pigment was added thereto to prepare a liquid mixture (ii).
Step 3
Further, the liquid mixture (ii) and 1 part by mass of the radical polymerization initiator (D-3) were stirred to produce a radical-polymerizable coating composition 1.
Coating Compositions 2 to 18
Radical-polymerizable coating compositions 2 to 18 were produced in the same manner as in the preparation of the coating composition 1 except for mixing each component in the mixing amount (part by mass) shown in Tables 26 and 27 below. Among the components shown in Tables 26 and 27 below, silica sand was added in the last of the step 2, and the other components such as the polyisocyanate compound and so on were added in the last of the step 1.
The mixing amount of the metal-containing compound (A) for each coating composition is not the actual amount but is based on the amount of the metal component in the metal-containing compound (A) (the same applies below).

Examples 89 to 98, Comparative Examples 61 to 68

The resultant radical-polymerizable coating compositions were measured for various properties according to the methods mentioned below. The results are shown in Tables 26 and 27.

Viscosity
The viscosity of the radical-polymerizable resin composition was measured at 25° C. according to a Brookfield viscometer method.
Wet Surface Workability
A concrete paver slab (substrate) having a size of 300 mm×300 mm×60 mm specified in JIS A 5371:2010 was completely immersed in water at 23° C. for 24 h and then taken out of the water. Immediately thereafter, the coating composition kept at 23° C. was applied to the concrete paver slab in an amount of about 0.5 kg/m$^2$ from its one end to the other end by using a short bristle roller at a roller moving speed of 10 to 20 cm/s with the roller being kept at about 45° upward the surface of the paver slab. The short bristle roller used was a small, short bristle roller, Urethane-kun (trade name) 4S-C10 manufactured by Ohtsuka Brush Manufacturing Co., Ltd. The coatability of the coating composition on the substrate and the roller slippage were evaluated by the following ratings.
A: The coating composition was applicable to the substrate and the roller did not slip during coating.
B: The coating composition was applicable to the substrate, but the roller slipped during coating.
C: The coating composition was not applicable to the substrate.
Measurement of Gelling Time, Curing Time, Peak Exothermic Temperature
Measured according to the same methods as in Example 1.
Primary Adhesion
A cement mortar plate having a length of 70 mm, a width of 70 mm and a thickness of 20 mm (manufactured by Nippon Testpanel Co., Ltd.) specified in JIS K 5600 was used. After removing brittle matters and powdery matters from the surface to be used for the adhesion test by using a waterproof abrasive paper No. 150 specified in JIS R 6253: 2006, the surface was wiped with a soft clean cloth.
The cement mortar plate was completely immersed in water at 23° C. for 24 h and then taken out of the water. Immediately thereafter, the coating composition kept at 23° C., which had been prepared according to the above preparation method, was applied to the cement mortar plate in an amount of 50 g/m$^2$ by using a brush. After drying for about 6 h and further drying at 60° C. for 30 min under heating, the cement mortar plate was left to stand at 23° C. and 65% RH for 24 h to prepare a test piece.
The primary adhesion was evaluated in a peeling test according to a cross-cut method using a cellophane tape as defined in JIS K 5400. The result was evaluated by the following ratings.
A: 90</100
B: 50 to 90/100
C: 50>/100
Hot Water-Resistant Adhesion
The same test piece as in the primary adhesion test was immersed in hot water at 50° C. for 5 h and then subjected to the same peeling test using a cellophane tape as in the primary adhesion test. The number of the unpeeled squares was counted and evaluated according to the following ratings.
A: 90</100
B: 50 to 90/100
C: 50>/100
Hot Water Blushing Resistance
The same test piece as in the primary adhesion test was immersed in hot water at 50° C. for 5 h. The appearance was observed and evaluated according to the following ratings.

A: No change.
B: Slightly changed (blushed).
C: Changed (blushed).

Adhesion Strength Test in Air (Dry State) (Adhesion Strength in Air)

As a substrate, a concrete ordinary slab (60 mm×300 mm×300 mm) specified in JIS A 5371:2010 was prepared. The brittle matter and the powdery matter on the surface to be used in the adhesion test were fully removed, and the surface was wiped with a soft clean cloth. By using a rubber plate having a width of 2 mm and a thickness of 1 mm, a formwork was formed on the concrete ordinary slab according to 7.10 of JIS A 6909:2014.

Next, a sample of the radical-polymerizable resin composition for adhesion strength test was prepared according to 7.4 of JIS A 6909:2014. The prepared sample was cast into the formwork and spread by a spatula, a roller and the like into a thickness of about 1 mm, and then aged at 25° C. and a humidity of 50% for 6 h to produce a test piece. Using a Ken-Ken type adhesion strength tester (Technotester Model R-10000ND, a tensile tester certified by Japan Society For Finishings Technology), each test piece was tested for adhesion strength at 5 points, and the result was shown by a mean value of 5 measured values.

After the test, the type of fracture of the test piece was visually observed. The fracture wherein the concrete ordinary slab (substrate) undergone fracture was rated as "substrate fracture." The fracture occurred at the interface between the concrete ordinary slab and the cured coating composition was rated as "interfacial fracture." The fracture wherein the cured coating composition undergone fracture was rated as "cohesion failure." The test piece wherein both the substrate fracture and the interfacial fracture occurred was rated as "substrate/interfacial." In the present invention, "substrate fracture" is preferred.

Adhesion Strength Test in Wet State (Wet Surface Adhesion Strength)

As a substrate, a concrete ordinary slab was prepared in the same manner as in the adhesion strength test in air except for immersing the slab in water for 24 h or longer so as to fully absorb water.

Next, a sample of the radical-polymerizable resin composition for adhesion strength test was prepared in the same manner as in the adhesion strength test in air. Subsequently, the concrete ordinary slab was immersed in water up to 15 mm height from the bottom, thereby allowing the top surface to be exposed at 5 mm height above the water, while referring to the method shown in FIG. 8 of the test procedure after immersion in water in 7.10 of JIS A 6909:2014. Just before applying the coating composition, the surface of the concrete ordinary slab was wiped with a dry cloth to remove bleeding water. Immediately thereafter, a sample of the coating composition was cast into the formwork, spread into a thickness of about 1 mm by a trowel or a spatula, and then aged at 25° C. and a relative humidity of 50% for 6 h to produce a test piece.

Water was adequately added to prevent the water level from being lowered with the lapse of time. The adhesion strength of the test piece was measured and evaluated in the same manner as in the adhesion strength test in air.

TABLE 26

| | | | Example | | | | |
|---|---|---|---|---|---|---|---|
| | | | 89 | 90 | 91 | 92 | 93 |
| Coating Composition | | | 1 | 2 | 3 | 4 | 5 |
| Coating Composition (part by mass) | Component (A) | A-1 | 0.08 | | 0.08 | 0.08 | 0.08 |
| | | A-2 | | 0.06 | | | |
| | Component (B) | B1-1 | 0.5 | 0.5 | | 0.5 | 0.5 |
| | | B2-1 | | | 0.5 | | |
| | Component (C) | C-1 | 100 | 100 | 100 | 100 | 100 |
| | Component (D) | D-1 | | | | | |
| | | D-2 | | | | | |
| | | D-3 | 1 | 1 | 1 | 1 | 1 |
| | Pigment | Gray | 10 | 10 | 10 | 10 | 10 |
| | Polymerization Inhibitor | Phenothiazine | 0.1 | 0.1 | 0.1 | 0.1 | 0.1 |
| | Curing Retardant | 4H-TEMPO | 0.02 | 0.02 | 0.02 | 0.02 | 0.02 |
| | Aggregate | Silica Sand | | | | | |
| | Other Components | Polyisocyanate Compound | | | | 5 | |
| | | Tin Catalyst | | | | 0.15 | |
| | | Silane Coupling Agent | | | | | 0.25 |
| | | Surfactant | | | | | |
| | | Wax | 0.15 | 0.15 | 0.15 | 0.15 | 0.15 |
| | | Thixotropic Agent | 1 | 1 | 1 | 1 | 1 |
| Molar Ratio (B)/(A) | | | 1.2 | 1.5 | 0.8 | 1.2 | 1.2 |
| Curability | | Gelling Time | 14 min 25 sec | 37 min 30 sec | 25 min 00 sec | 13 min 25 sec | 15 min 15 sec |
| | | Curing Time | 22 min 30 sec | 44 min 10 sec | 37 min 10 sec | 21 min 55 sec | 21 min 40 sec |
| | | Peak Exothermic Temperature | 76.4° C. | 82.1° C. | 84.5° C. | 77.4° C. | 81.3° C. |
| Evaluation | | Viscosity (mPa · s) | 450 | 420 | 440 | 540 | 420 |
| | | Wet Surface Workability | A | A | A | A | A |
| | | Primary Adhesion | A | A | A | A | A |
| | | Hot Water-Resistant Adhesion | A | A | A | B | B |
| | | Hot Water Blushing Resistance | A | A | A | B | B |
| | | Adhesion Strength in Air | 3.8 | 3.4 | 3.8 | 3.6 | 3.7 |
| | | Fracture Type | Substrate | Substrate | Substrate | Substrate | Substrate |
| | | Wet Surface Adhesion Strength | 3.5 | 3.3 | 3.5 | 2.5 | 2.3 |
| | | Fracture Type | Substrate | Substrate | Substrate | Substrate | Substrate |

TABLE 26-continued

|  |  |  | Example | | | | |
|---|---|---|---|---|---|---|---|
|  |  |  | 94 | 95 | 96 | 97 | 98 |
| Coating Composition |  |  | 6 | 7 | 8 | 9 | 10 |
| Coating Composition (part by mass) | Component (A) | A-1 | 0.08 | 0.08 | 0.08 |  | 0.08 |
|  |  | A-2 |  |  |  | 0.06 |  |
|  | Component (B) | B1-1 | 0.5 | 0.5 | 0.5 | 0.5 | 0.5 |
|  |  | B2-1 |  |  |  |  |  |
|  | Component (C) | C-1 | 100 | 100 | 100 | 100 | 100 |
|  | Component (D) | D-1 |  |  |  |  |  |
|  |  | D-2 |  |  |  |  | 1.5 |
|  |  | D-3 | 1 | 1 | 1 | 1 |  |
|  | Pigment | Gray | 10 | 10 | 10 | 10 |  |
|  | Polymerization Inhibitor | Phenothiazine | 0.1 | 0.1 | 0.1 | 0.1 | 0.1 |
|  | Curing Retardant | 4H-TEMPO | 0.02 | 0.02 | 0.02 | 0.02 | 0.02 |
|  | Aggregate | Silica Sand |  |  | 30 | 30 |  |
|  | Other Components | Polyisocyanate Compound |  |  |  |  |  |
|  |  | Tin Catalyst |  |  |  |  |  |
|  |  | Silane Coupling Agent |  |  |  |  |  |
|  |  | Surfactant | 0.5 | 1 |  |  |  |
|  |  | Wax | 0.15 | 0.15 | 0.15 | 0.15 | 0.15 |
|  |  | Thixotropic Agent | 1 | 1 | 1 | 1 | 1 |
| Molar Ratio (B)/(A) |  |  | 1.2 | 1.2 | 1.2 | 1.5 | 1.2 |
| Curability | Gelling Time |  | 17 min 30 sec | 18 min 30 sec | 16 min 20 sec | 35 min 15 sec | 18 min 15 sec |
|  | Curing Time |  | 25 min 10 sec | 27 min 30 sec | 24 min 00 sec | 42 min 40 sec | 26 min 10 sec |
|  | Peak Exothermic Temperature |  | 69.8° C. | 67.4° C. | 78.4° C. | 83.5° C. | 78.7° C. |
| Evaluation | Viscosity (mPa · s) |  | 530 | 600 | 680 | 700 | 3890 |
|  | Wet Surface Workability |  | A | A | A | A | A |
|  | Primary Adhesion |  | A | A | A | A | A |
|  | Hot Water-Resistant Adhesion |  | A | B | A | A | A |
|  | Hot Water Blushing Resistance |  | A | B | A | A | A |
|  | Adhesion Strength in Air |  | 3.2 | 2.8 | 4.2 | 4.1 | 3.6 |
|  | Fracture Type |  | Substrate | Substrate | Substrate | Substrate | Substrate |
|  | Wet Surface Adhesion Strength |  | 3 | 2.4 | 3.8 | 3.7 | 2.9 |
|  | Fracture Type |  | Substrate | Substrate | Substrate | Substrate | Substrate |

TABLE 27

|  |  |  | Comparative Example | | | |
|---|---|---|---|---|---|---|
|  |  |  | 61 | 62 | 63 | 64 |
| Coating Composition |  |  | 11 | 12 | 13 | 14 |
| Coating Composition (part by mass) | Component (A) | A-1 | 0.08 | 0.08 | 0.08 | 0.08 |
|  |  | A-2 |  |  |  |  |
|  | Component (B) | B'-1 |  |  |  |  |
|  |  | B'-2 |  |  |  |  |
|  |  | B'-3 |  |  |  |  |
|  | Component (C) | C-1 | 100 | 100 | 100 | 100 |
|  | Component (D) | D-1 | 1 |  |  |  |
|  |  | D-2 |  |  |  |  |
|  |  | D-3 |  | 1 | 1 | 1 |
|  | Pigment | Gray | 10 | 10 | 10 | 10 |
|  | Polymerization Inhibitor | Phenothiazine | 0.1 | 0.1 | 0.1 | 0.1 |
|  | Curing Retardant | 4H-TEMPO | 0.01 | 0.01 | 0.01 | 0.01 |
|  | Amine-type Accelerator | PT-2HE |  |  | 0.5 |  |
|  |  | 2HE |  |  |  | 0.5 |
|  |  | DMA |  | 0.2 |  |  |
|  | Other Components | Wax | 0.15 | 0.15 | 0.15 | 0.15 |
|  |  | Thixotropic Agent | 1 | 1 | 1 | 1 |
| Molar Ratio (B)/(A) |  |  | — | — | — | — |
| Curability | Gelling Time |  | 24 min 55 sec | 14 min 10 sec | 15 min 10 sec | 16 min 50 sec |
|  | Curing Time |  | 38 min 10 sec | 22 min 15 sec | 24 min 10 sec | 23 min 10 sec |
|  | Peak Exothermic Temperature |  | 84.4° C. | 85.5° C. | 87.4° C. | 88.9° C. |
| Evaluation | Viscosity (mPa · s) |  | 500 | 480 | 470 | 480 |
|  | Wet Surface Workability |  | C | A | A | A |
|  | Primary Adhesion |  | C | B | B | B |
|  | Hot Water-Resistant Adhesion |  | C | C | C | C |
|  | Hot Water Blushing Resistance |  | C | C | C | C |
|  | Adhesion Strength in Air |  | 3 | 3.1 | 3.4 | 3.5 |

TABLE 27-continued

|  |  | Fracture Type | Substrate | Substrate | Substrate | Substrate |
|---|---|---|---|---|---|---|
|  |  | Wet Surface Adhesion Strength | 0 | 0.8 | 1.1 | 1 |
|  |  | Fracture Type | Not Adhered | Cohesion Fracture | Interfacial | Interfacial |

|  |  |  | Comparative Example | | | |
|---|---|---|---|---|---|---|
|  |  |  | 65 | 66 | 67 | 68 |
| Coating Composition |  |  | 15 | 16 | 17 | 18 |
| Coating Composition (part by mass) | Component (A) | A-1 | 0.08 | 0.08 | 0.08 | 0.06 |
|  |  | A-2 |  |  |  |  |
|  | Component (B) | B'-1 | 0.25 |  |  |  |
|  |  | B'-2 |  | 0.5 |  |  |
|  |  | B'-3 |  |  | 0.5 |  |
|  | Component (C) | C-1 | 100 | 100 | 100 | 100 |
|  | Component (D) | D-1 |  |  |  |  |
|  |  | D-2 |  |  |  | 1 |
|  |  | D-3 | 1 | 1 | 1 |  |
|  | Pigment | Gray | 10 | 10 | 10 |  |
|  | Polymerization Inhibitor | Phenothiazine | 0.1 | 0.1 | 0.1 | 0.1 |
|  | Curing Retardant | 4H-TEMPO | 0.02 | 0.02 | 0.02 | 0.02 |
|  | Amine-type Accelerator | PT-2HE |  |  |  |  |
|  |  | 2HE |  |  |  |  |
|  |  | DMA |  |  |  | 0.2 |
|  | Other Components | Was | 0.15 | 0.15 | 0.15 | 0.15 |
|  |  | Thixotropic Agent | 1 | 1 | 1 | 1 |
| Molar Ratio (B)/(A) |  |  | 1.7 | 0.9 | 0.8 | — |
| Curability |  | Gelling Time | 12 min 10 sec | 21 min 10 sec | 32 min 10 sec | 20 min 15 sec |
|  |  | Curing Time | 25 min 10 sec | 33 min 25 sec | 48 min 00 sec | 29 min 35 sec |
|  |  | Peak Exothermic Temperature | 68.2° C. | 64.3° C. | 61.5° C. | 81.1° C. |
| Evaluation |  | Viscosity (mPa · s) | 420 | 450 | 440 | 4450 |
|  |  | Wet Surface Workability | A | A | A | A |
|  |  | Primary Adhesion | C | C | C | A |
|  |  | Hot Water-Resistant Adhesion | B | C | C | B |
|  |  | Hot Water Blushing Resistance | B | B | B | C |
|  |  | Adhesion Strength in Air | 2.5 | 2.4 | 2.2 | 3.6 |
|  |  | Fracture Type | Substrate | Substrate | Substrate | Substrate |
|  |  | Wet Surface Adhesion Strength | 0.9 | 0 | 0 | 1.2 |
|  |  | Fracture Type | Cohesion Fracture | Not Adhered | Not Adhered | Interfacial |

From the results in Tables 26 and 27, it can been seen that the curing mechanism of the combination of a secondary or higher-order thiol compound and a metal soap provided a cured product satisfying all the wet surface workability, the primary adhesion (cellophane tape test), the hot water-resistant adhesion, and the hot water blushing resistance.

It was also suggested that the component, such as a polyisocyanate compound, a silane coupling agent, and a surfactant, may partly detract from the hot water blushing resistance and the hot water-resistant adhesion, depending on the type of the selected compound. However, from the results of the adhesion strength test in air (dry) and the adhesion strength test on a wet surface, it can be said that the results indicate that the coating composition is practically usable without problems because the fracture occurred in the concrete substrate, although the water blushing resistance and the hot water-resistant adhesion is partly impaired. That is, the test results show that the radical-polymerizable coating composition exhibits the adhesion strength substantially equal to that in air even on a wet substrate or in a wet environment.

Comparative Example 61 showed that a cured product of an ordinary metal soap and a peroxide was useless for a wet concrete substrate.

In Comparative Examples 62 to 64, an ordinary amine-type accelerator and a cobalt metal soap were combinedly used. The workability on a wet surface is acceptable, but the primary adhesion was slightly poor and the adhesion was not observed in the hot water-resistant adhesion test. In the hot water-resistant test, a blushing peculiar to the amine-type accelerator, so-called amine blushing, was confirmed, showing that the mechanism of accelerating the curing by the bonding between a metal soap and an amine-type accelerator was disrupted by water.

Comparative Examples 65 to 67 wherein a primary thiol was used provided the results suggesting that the bonding ability of the primary thiol to a metal soap is weaker than that of a secondary thiol. As can be seen from the results of the adhesion test on the wet surface, the workability on a wet surface was good, but the primary adhesion was quite poor and the coating compositions did not adhere to the substrate. This suggests that the bonding between the metal soap and the primary thiol was not maintained until the peak exothermic temperature was observed, i.e., during the curing time usually about 10 to 40 min, showing the remarkable superiority of secondary or higher-order thiols.

In Comparative Example 65, some result was acceptable in a wet condition, but the coating composition did not show a strength enough to withstand the adhesion test and caused the cohesion fracture in the wet condition, because the combination a metal soap and a primary thiol was also damaged by water.

In Comparative Example 68, a cobalt-amine-BPO curing system was used. Since amine was used, a good test result was not obtained in the hot water blushing resistance test, and accordingly, the adhesion strength to a wet surface was extremely low as compared with those in the examples. In addition, the interfacial fracture occurred. Thus, the coating composition was really not practically usable.

Examples 99 to 106 and Comparative Examples 69 to 75

Radical-polymerizable resin compositions of the present invention and comparative radical-polymerizable resin compositions were used as repairing materials for evaluating total repairing performance of concrete structures.
Crack Injection Material To examine the limit performance of each crack injection material, a primer generally recommended was not used.

Crack Injection Material (X-1)

The repairing material for inorganic structure 32 of Example 83.

Crack Injection Material (X-2)

The repairing material for inorganic structure 30 of Comparative Example 46.

Crack Injection Material (X-3)

Bond EFLEX (registered trademark) manufactured by Konishi Co., Ltd: one-component, cold-curing modified silicone-epoxy resin adhesive.

Crack Injection Material (X-4)

Tosseal 381 (registered trademark) manufactured by Momentive Performance Materials Japan LLC: one-component deoxime-type silicone sealant for construction use.
Primer Primer (Y-1)

The radical-polymerizable resin composition 34 of Example 38.

Primer (Y-2)

The radical-polymerizable resin composition 45 of Comparative Example 23.

Primer (Y-3)

Bond E810LS (registered trademark) manufactured by Konishi Co., Ltd.: an epoxy resin applicable to wet surface by mixing the base agent and the hardener in 5:2 (by mass).

Primer (Y-4)

Refer Treat manufactured by Sumitomo Osaka Cement Co., Ltd.: a solvent-type primer for concrete under coat applicable to wet surface.
Section Repairing Material Section Repairing Material (Z-1)

The repairing material for inorganic structure 10 of Example 71.

Section Repairing Material (Z-2)

The repairing material for inorganic structure 18 of Comparative Example 38.

Section Repairing Material (Z-3)

Filling adhesive underwater bond E380 for under water and wet surface manufactured by Konishi Co., Ltd.: an epoxy resin-based putty to be used by mixing the base agent and the hardener in 1:1 (by mass).

Section Repairing Material (Z-4)

Figure 4:
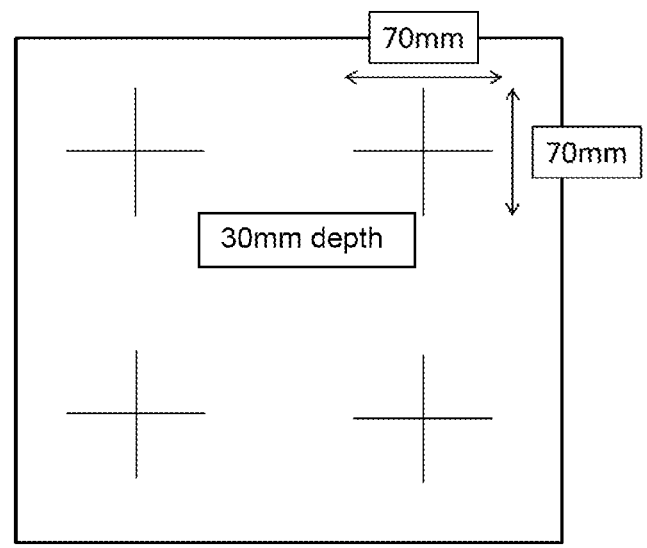
FIG. 4 is a plan view showing cross cuts made on the surface of an ordinary concrete slab used in Examples 99 to 106 and Comparative Examples 69 to 75.

Refer Morset M manufactured by Sumitomo Osaka Cement Co., Ltd.: a polymer cement-type ultra-rapid curing section repairing material to be used by mixing 3.0 kg of water into 20 kg of powdery material.
Production of Test Pieces As a substrate, a concrete ordinary slab (60 mm×300 mm×300 mm) specified in JIS A 5371:2010 was prepared. The surface of the concrete ordinary slab to be used in the repairing test was scraped to remove the brittle part and the laitance layer. As shown in FIG. 4, notches of 10 mm width, 70 mm length, and 30 mm depth were vertically and horizontally formed using a disc grinder, and the grinding fragment, refuse, dust, contaminant and the like were fully removed.

By using a rubber plate having a width of 2 mm and a thickness of 4 mm, a formwork was formed on the concrete ordinary slab according to 7.10 of JIS A 6909:2014, and then, the slab was left to stand at 25° C. and a humidity of 50% for 24 h.

Each material was applied and cured according to the process mentioned below to prepare a test piece.

(1) An adequate amount of each of the above crack injection materials was injected into the notches formed on the concrete ordinary slab using an injection gun described in JP-A 10-237264.

(2) Next, each of the above primers was applied onto the top face of the concrete ordinary slab in an amount of 200 g/m$^2$ for primer treatment by using a brush and then aged for about 4 h.

(3) Then, each of the above section repairing materials was applied and spread into a thickness of 4 to 5 mm by using a trowel and then aged for about 12 h.

(4) Next, a photocurable or thermally curable, spall preventing material was applied onto the section repairing material and cured to produce a test piece in the following manner (4-1) or (4-2).

(4-1)

In a dark room, glass fibers WR-570C (roving cloth manufactured by Nitto Boseki Co., Ltd.) cut into 300 mm×300 mm were superposed into a 3-ply layer, and the photoradical-polymerizable resin composition 46 (Example 46) was applied by using a roller or the like and impregnated thereinto, thereby forming a spall preventing curable material having a fiber content of 30% by weight and a thickness of about 1 mm on the concrete ordinary slab.

Then, the impregnated composition was photocured by irradiating it for 20 min at an irradiation energy of 10 mW/cm$^2$ (380 to 450 nm) by using a metal halide lamp (400 W projector). Subsequently, the irradiated product was aged at 25° C. and a humidity of 50% for 8 h to obtain a test piece.

(4-2)

In a room, glass fibers WR-570C (roving cloth manufactured by Nitto Boseki Co., Ltd.) cut into 300 mm×300 mm were superposed into a 3-ply layer, and the radical-polymerizable resin composition 22 (Example 16) was applied by using a roller or the like and impregnated thereinto, thereby forming a spall preventing curable material having a fiber content of 30% by weight and a thickness of about 1 mm on the concrete ordinary slab.

The curable spall preventing material was cured at 25° C. and then aged at 25° C. and a humidity of 50% for 8 h to prepare a test piece.
Adhesion Strength Test in Air (Dry State)

The adhesion strength of the repaired parts positioned just above the four notches shown in FIG. 4 was measured by using a Ken-Ken type adhesion strength tester (Technotester Model R-10000ND, a tensile tester certified by Japan Society For Finishings Technology). The result was shown by a mean value of 4 measured values.

After the test, the section repairing material and the repaired substrate (concrete ordinary slab) were visually observed to evaluate the type of fracture. The fracture wherein the repaired substrate undergone fracture was rated as "A (substrate fracture)." The case where the substrate fracture and the interfacial fracture both occurred was rated as "B (substrate fracture/interfacial fracture)." The fracture occurred at the interface between the repaired substrate and the section repairing material was rated as "C (interfacial fracture)." The fracture occurred inside the section repairing material was rated as "D (cohesion failure)."

In the present invention, "substrate fracture" is preferred.

Adhesion Strength Test in Wet State

As a substrate, a concrete ordinary slab (60 mm×300 mm×300 mm) specified in JIS A 5371:2010 was prepared. The surface of the concrete ordinary slab to be used in the repairing test was scraped to remove the brittle part and the laitance layer. As shown in FIG. 4, notches of 10 mm width, 70 mm length, and 30 mm depth were vertically and horizontally formed using a disc grinder, and the grinding fragment, refuse, dust, contaminant and the like were fully removed.

By using a rubber plate having a width of 2 mm and a thickness of 4 mm, a formwork was formed on the concrete ordinary slab according to 7.10 of JIS A 6909:2014, and then, the slab was immersed in water for about 24 h so that the concrete ordinary slab fully absorbed water.

Then, the concrete ordinary slab was immersed in water for 24 h or more so that the top surface of the slab was at about 5 cm depth below the water, while referring to the method shown in FIG. 8 of the test procedure after immersion in water in 7.10 of JIS A 6909:2014. Thereafter, just before applying the resin composition, the top surface of the slab was exposed at 5 mm height above the water and the surface was wiped with a dry cloth to remove bleeding water.

Then, the crack injection material, the primer, the section repairing material, and the photocurable or thermally curable, spall preventing material were applied in the same manner as above and aged to produce a test piece. The resultant test piece was tested for the adhesion strength and the fracture type was observed in the same manner as above.

TABLE 28

| | | Example | | | | | | | |
|---|---|---|---|---|---|---|---|---|---|
| | | 99 | 100 | 101 | 102 | 103 | 104 | 105 | 106 |
| Crack | X-1 | ○ | | | ○ | ○ | ○ | ○ | ○ |
| Injection | X-2 | | | | | | | | |
| Material | X-3 | | ○ | | | | | | |
| | X-4 | | | ○ | | | | | |
| Primer | Y-1 | ○ | ○ | ○ | | | ○ | ○ | ○ |
| | Y-2 | | | | | | | | |
| | Y-3 | | | | ○ | | | | |
| | Y-4 | | | | | ○ | | | |
| Section | Z-1 | ○ | ○ | ○ | ○ | ○ | | | ○ |
| Repairing | Z-2 | | | | | | | | |
| Material | Z-3 | | | | | | ○ | | |
| | Z-4 | | | | | | | ○ | |
| Photocurable Spall Prevention | | ○ | ○ | ○ | ○ | ○ | ○ | ○ | |
| Radical-Curable Spall Prevention | | | | | | | | | ○ |
| Adhesion Strength | In Air (dry condition) | A 3.9 | A 3.5 | A 2.8 | B 1.9 | B 1.7 | B 2.1 | A 3.0 | A 3.5 |
| after 24 h | Wet Condition | A 3.6 | A 3.1 | A 2.4 | B 1.7 | C 0.7 | B 2.2 | A 2.2 | A 3.4 |

TABLE 29

| | | Comparative Example | | | | | | |
|---|---|---|---|---|---|---|---|---|
| | | 69 | 70 | 71 | 72 | 73 | 74 | 75 |
| Crack | X-1 | | | | | | | |
| Injection | X-2 | | | | | ○ | ○ | ○ |
| Material | X-3 | ○ | | ○ | | | | |
| | X-4 | | ○ | | ○ | | | |
| Primer | Y-1 | | | | | | | |
| | Y-2 | | | | | ○ | | |
| | Y-3 | ○ | | | ○ | | ○ | |
| | Y-4 | | ○ | ○ | | | | ○ |
| Section | Z-1 | | | | | | | |
| Repairing | Z-2 | | | | | ○ | ○ | ○ |
| Material | Z-3 | ○ | | ○ | | | | |
| | Z-4 | | ○ | | ○ | | | |
| Photocurable Spall Prevention | | ○ | ○ | ○ | ○ | ○ | ○ | ○ |
| Adhesion Strength | In Air (dry condition) | D 0 | D 0 | D 0 | D 0 | A 3.8 | B 1.5 | C 0.7 |
| after 24 h | Wet Condition | D 0 | D 0 | D 0 | D 0 | C 0.8 | C 0.3 | D 0 |

As seen from the results shown in Table 28, in Examples 99 to 106 combinedly using the metal-containing compound (A) and the thiol compound (B), the working operation finished within the predetermined aging time of 24 h, the adhesion strength to the concrete ordinary slab was good both in air (dry condition) and in the wet condition, and the substrate fracture occurred, showing that the multilayered structure of the crack injection material, the primer, the section repairing material, and the spall preventing composition was bonded to the concrete ordinary slab integrally.

In addition, since the radical-curable spall preventing material used in Example 106 is colorless and transparent before and after the curing reaction, the possible cracks that may form in concrete structures or repaired section can be visually inspected.

In Comparative Examples 73 not using the thiol compound (B), the cohesion fracture occurred in the wet condition, showing that a sufficient adhesion strength cannot be obtained in a wet condition in the absence of the thiol compound (B). In Comparative Examples other than Comparative Example 73 in Table 29, an epoxy resin, a silicone-modified epoxy resin or a polymer cement-type section repairing material each being known in the art was used as a part or all of the crack injection material, the primer, and the section repairing material. In any of the combinations of these Comparative Examples, a good adhesion strength and an acceptable fracture were not obtained when aged for the predetermined period of time of 24 h.

INDUSTRIAL APPLICABILITY

The radical-polymerizable resin composition of the present invention cures not only in a dry condition but also in a condition surrounded by much water or in a wet place, and therefore, is useful, for example, for coating, repairing or painting marine structures, concrete hume pipes used in water supply systems, sewerage systems, agricultural irrigation systems, etc., and submerged concrete surfaces in brackish water regions, seawater regions or river regions. In addition, since the curing speed can be controlled, the composition can also be used as a repairing material for water-leaking surface of tunnels, dams, etc.

The invention claimed is:

1. A radical-polymerizable resin composition comprising one or more metal-containing compounds (A) selected from a metal soap (A1) and a β-diketone skeleton-containing metal complex (A2); one or more thiol compounds (B) selected from a secondary thiol compound (B1) and a tertiary thiol compound (B2); and a radical-polymerizable compound (C),
wherein a long-chain fatty acid constituting the metal soap (A1) is a linear or cyclic saturated fatty acid having 6 to 16 carbon atoms or an unsaturated fatty acid having 6 to 16 carbon atoms.

2. The radical-polymerizable resin composition of claim 1, wherein the thiol compound (B) comprises at least one structure represented by formula (Q-1) and comprises two or more mercapto groups bonding to a secondary or tertiary carbon atom in the molecule including the mercapto group in the structure represented by formula (Q-1):

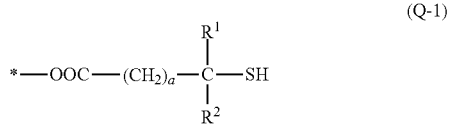

wherein $R^1$ represents a hydrogen atom, an alkyl group having 1 to 10 carbon atoms, or an aromatic group having 6 to 18 carbon atoms; $R^2$ represents an alkyl group having 1 to 10 carbon atoms or an aromatic group having 6 to 18 carbon atoms; * bonds to an organic group; and a represents an integer of 0 to 2.

3. The radical-polymerizable resin composition of claim 2, wherein the thiol compound (B) comprising at least one ester structure represented by formula (Q-1) is a compound derived from a mercapto group-containing carboxylic acid represented by formula (S) and a polyhydric alcohol:

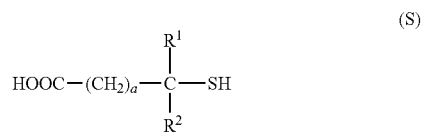

wherein R', $R^2$ and a are as defined in formula (Q-1).

4. The radical-polymerizable resin composition of claim 2, wherein $R^1$ represents a hydrogen atom and the thiol compound (B) is a compound comprising 2 or more mercapto groups bonding to a secondary carbon atom in the molecule.

5. The radical-polymerizable resin composition of claim 1, wherein the total amount of the thiol compound (B) is 0.01 to 10 parts by mass to 100 parts by mass of the radical-polymerizable compound (C).

6. The radical-polymerizable resin composition of claim 1, wherein the molar ratio of the thiol compound (B) to the metal component in the metal-containing compound (A), (B)/(A), is 0.1 to 15.

7. The radical-polymerizable resin composition of claim 1, wherein the radical-polymerizable resin composition comprises a radical polymerization initiator (D).

8. The radical-polymerizable resin composition of claim 7, wherein the radical polymerization initiator (D) is a photoradical polymerization initiator.

9. The radical-polymerizable resin composition of claim 1, wherein the metal soap (A1) is zirconium octylate, manganese octylate, cobalt octylate, or cobalt naphthenate.

10. The radical-polymerizable resin composition of claim 1, wherein the radical-polymerizable compound (C) is one or more selected from a vinyl ester resin, an unsaturated polyester resin, a mixture of a vinyl ester resin and a radical-polymerizable unsaturated monomer, and a mixture of an unsaturated polyester resin and a radical-polymerizable unsaturated monomer.

11. The radical-polymerizable resin composition of claim 10, wherein the radical-polymerizable compound (C) is one or more selected from a mixture of a vinyl ester resin and a radical-polymerizable unsaturated monomer, and a mixture of an unsaturated polyester resin and a radical-polymerizable unsaturated monomer, and wherein the radical-polymerizable unsaturated monomer is styrene and a styrene content in the radical-polymerizable compound (C) is 20% by mass or less.

12. A primer comprising the radical-polymerizable resin composition of claim 1.

13. A repairing material for inorganic structure comprising the radical-polymerizable resin composition of claim 1.

14. The repairing material for inorganic structure of claim 13, wherein the repairing material for inorganic structure comprises a filler (F).

15. The repairing material for inorganic structure of claim 13, wherein the repairing material for inorganic structure is a section repairing material, a crack injection material, or a water sealant.

16. The repairing material for inorganic structure of claim 13, wherein a content of the radical-polymerizable compound (C) in the radical-polymerizable resin composition is 10 to 99.9% by mass.

17. The radical-polymerizable resin composition of claim 1, wherein the metal-containing compound (A) is a metal soap (A1).

18. A radical-polymerizable coating composition comprising the radical-polymerizable resin composition of claim 17.

19. The radical-polymerizable coating composition of claim 18, wherein a content of the radical-polymerizable compound (C) in the radical-polymerizable resin composition is 80 to 99.9% by mass.

20. The radical-polymerizable coating composition of claim 18, wherein the radical-polymerizable coating composition is a two-component curable coating composition comprising a main component and a curing agent, wherein the main component comprises a metal soap (A1), one or more thiol compounds (B) selected from a secondary thiol compound (B1) and a tertiary thiol compound (B2), and a radical-polymerizable compound (C), and the curing agent comprises a radical polymerization initiator (D).

21. A curable material for preventing concrete spalling, comprising the radical-polymerizable resin composition of claim 1.

22. The radical-polymerizable resin composition of claim 1, wherein the radical-polymerizable resin composition comprises a fiber (G).

23. A prepreg sheet produced by prepolymerizing the radical-polymerizable resin composition of claim 22.

24. A reinforcing fiber-containing composite material comprising the radical-polymerizable resin composition of claim 22.

25. A method for producing the radical-polymerizable resin composition of claim 1, wherein the method comprises a step 1 of mixing the metal-containing compound (A) and the radical-polymerizable compound (C) to prepare a liquid mixture (i), and a step 2 of mixing the liquid mixture (i) and the thiol compound (B) to prepare a liquid mixture (ii).

26. The method for producing a radical-polymerizable resin composition of claim 25, wherein the method comprises a step 3 of mixing the liquid mixture (ii) and the radical polymerization initiator (D).

27. A method for repairing a concrete structure, which comprises applying one or more repairing materials for inorganic structure of claim 13 directly or indirectly onto a surface of a damaged part of a concrete structure and curing the applied material for repairing the damaged part.

28. A photocuring method for a radical-polymerizable resin composition, wherein the method comprises a step of irradiating the radical-polymerizable resin composition of claim 8 with a light within a photosensitive wavelength range of the photoradical polymerization initiator to polymerize the radical-polymerizable compound (C).

29. A method for producing a prepreg sheet, wherein the method comprises a step of irradiating the radical-polymerizable resin composition of claim 8 with a light within a photosensitive wavelength range of the photoradical polymerization initiator to prepolymerize the radical-polymerizable compound (C).

30. A method for repairing a concrete structure, which comprises applying one or more radical-polymerizable coating compositions of claim 18 directly or indirectly onto a surface of a damaged part of a concrete structure and curing the applied composition for repairing the damaged part.

31. A method for repairing a concrete structure, which comprises applying one or more curable materials for preventing concrete spalling of claim 21 directly or indirectly onto a surface of a damaged part of a concrete structure and curing the applied material for repairing the damaged part.

32. The radical-polymerizable resin composition of claim 1, wherein the β-diketone skeleton-containing metal complex (A2) is one selected from any one of complexes formed by acetylacetone, ethyl acetoacetate, and benzoyl acetone with a metal.

* * * * *